(12) United States Patent
Takasu

(10) Patent No.: US 11,546,526 B2
(45) Date of Patent: *Jan. 3, 2023

(54) IMAGING APPARATUS, VEHICLE AND IMAGE CAPTURING METHOD

(71) Applicant: Ricoh Company, Ltd., Tokyo (JP)

(72) Inventor: Shusaku Takasu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/367,958

(22) Filed: Jul. 6, 2021

(65) Prior Publication Data

US 2021/0337135 A1    Oct. 28, 2021

Related U.S. Application Data

(63) Continuation of application No. 16/809,780, filed on Mar. 5, 2020, now Pat. No. 11,089,237.

(30) Foreign Application Priority Data

Mar. 19, 2019 (JP) .............................. JP2019-052004

(51) Int. Cl.
*H04N 7/18* (2006.01)
*H04N 5/247* (2006.01)
(Continued)

(52) U.S. Cl.
CPC ........... *H04N 5/247* (2013.01); *H04N 5/2256* (2013.01); *H04N 5/23299* (2018.08)

(58) Field of Classification Search
CPC .. H04N 5/247; H04N 5/2256; H04N 5/23299; H04N 5/23238; G01N 21/954; G03B 37/005; G03B 37/04
(Continued)

(56) References Cited

U.S. PATENT DOCUMENTS 6,433,934 B1    8/2002  Reznichenko et al.
6,615,648 B1    9/2003  Ferguson et al.
(Continued)

FOREIGN PATENT DOCUMENTS

CN          105510350       4/2016
EP            3442213       2/2019
(Continued)

OTHER PUBLICATIONS

Extended European Search Report for 20161031.8 dated Jul. 13, 2020.
(Continued)

*Primary Examiner* — Gims S Philippe
(74) *Attorney, Agent, or Firm* — IPUSA, PLLC

(57) ABSTRACT

An imaging apparatus mountable on a moveable apparatus includes a plurality of lighting-imaging units, each configured to capture an image of a different area on an object in a direction intersecting with a movement direction of the moveable apparatus. The each of the plurality of lighting-imaging units includes a light source unit configured to illuminate a partial area on the object as a lighting area; and an image capture unit configured to capture an image of an image capture area set within the lighting area. The plurality of lighting-imaging units captures an image of a non-overlapped lighting area on the object where the lighting areas of the plurality of lighting-imaging units do not overlap with each other.

19 Claims, 30 Drawing Sheets

(51) Int. Cl.
*H04N 5/232* (2006.01)
*H04N 5/225* (2006.01)

(58) Field of Classification Search
USPC .......................................................... 348/148
See application file for complete search history.

(56) References Cited

U.S. PATENT DOCUMENTS

| | | | |
|---|---|---|---|
| 8,830,324 B2 | 9/2014 | Endo et al. | |
| 9,908,482 B1* | 3/2018 | Falstrup | F16M 11/041 |
| 2011/0221906 A1 | 9/2011 | Xu et al. | |
| 2012/0229645 A1 | 9/2012 | Yamada | |
| 2014/0036031 A1 | 2/2014 | Tanaka et al. | |
| 2014/0071226 A1 | 3/2014 | Satoh et al. | |
| 2014/0071227 A1 | 3/2014 | Takenaka et al. | |
| 2014/0078247 A1 | 3/2014 | Shohara et al. | |
| 2015/0015766 A1 | 1/2015 | Satoh et al. | |
| 2015/0358540 A1* | 12/2015 | Kanter | H04N 5/2256 348/38 |
| 2016/0060824 A1 | 3/2016 | Akashi et al. | |
| 2016/0182825 A1 | 6/2016 | Tanaka et al. | |
| 2016/0223471 A1 | 8/2016 | Akashi et al. | |
| 2016/0227126 A1 | 8/2016 | Akashi et al. | |
| 2016/0297361 A1* | 10/2016 | Drazan | H04N 5/2256 |
| 2016/0313541 A1 | 10/2016 | Satoh et al. | |
| 2017/0083774 A1* | 3/2017 | Solar | H04N 5/2354 |
| 2017/0113613 A1* | 4/2017 | Van Dan Elzen | B60K 35/00 |
| 2017/0270381 A1 | 9/2017 | Itoh et al. | |
| 2017/0347008 A1* | 11/2017 | Griffin | H04N 5/2355 |
| 2018/0024333 A1 | 1/2018 | Satoh et al. | |
| 2019/0086649 A1 | 3/2019 | Satoh et al. | |

FOREIGN PATENT DOCUMENTS

| | | |
|---|---|---|
| JP | 2014-95627 | 5/2014 |
| JP | 2016-31249 | 3/2016 |
| JP | 2016-218555 | 12/2016 |
| JP | 2018-159642 | 10/2018 |
| JP | 2019-033478 | 2/2019 |

OTHER PUBLICATIONS

Srivatsan Varadharajan et al., "Vision for road inspection", Robotics Institute, School of Computer Science Carnegie Mellon University, pp. 115-122, Mar. 24, 2014.

Office Action dated Nov. 22, 2022 issued with respect to the corresponding Japanese Patent Application No. 2019-052004.

* cited by examiner

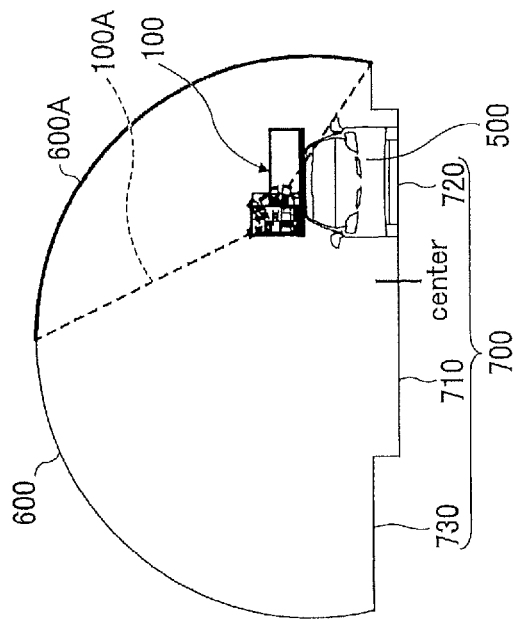
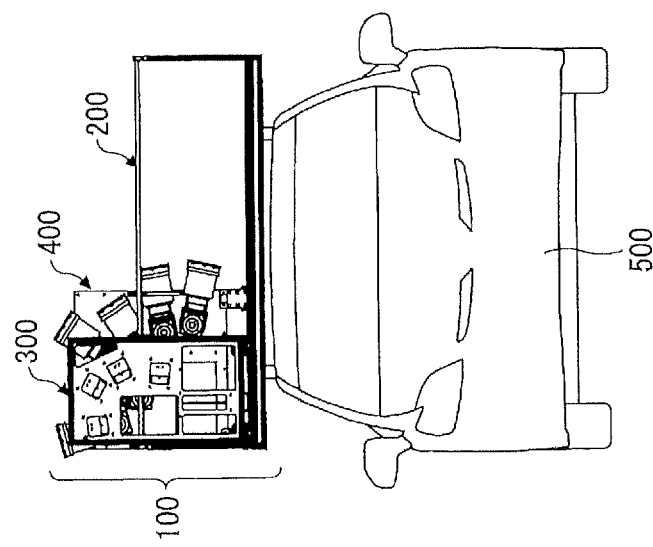
FIG. 5B
FIG. 5A

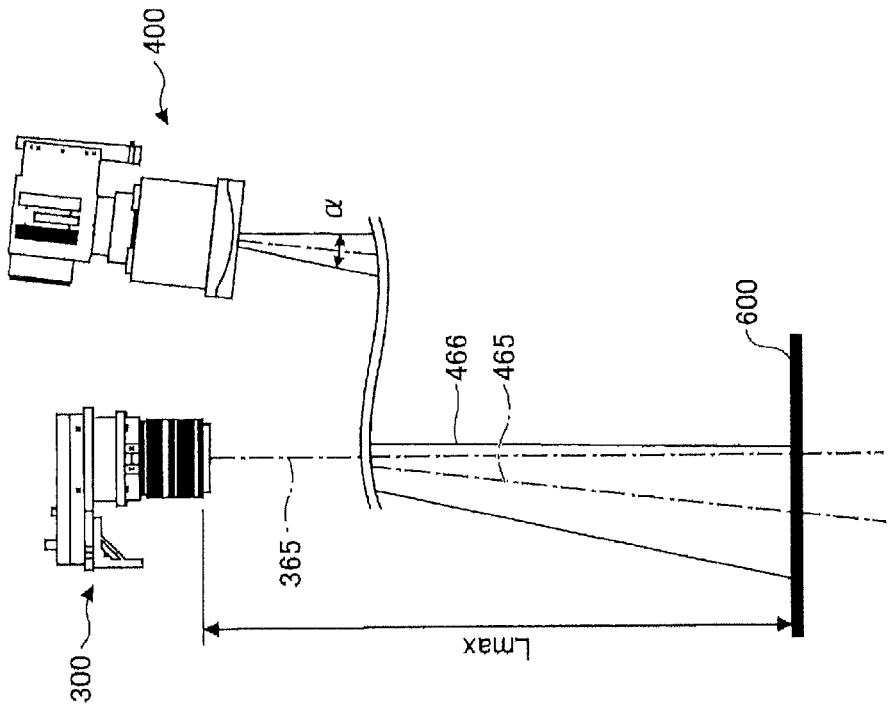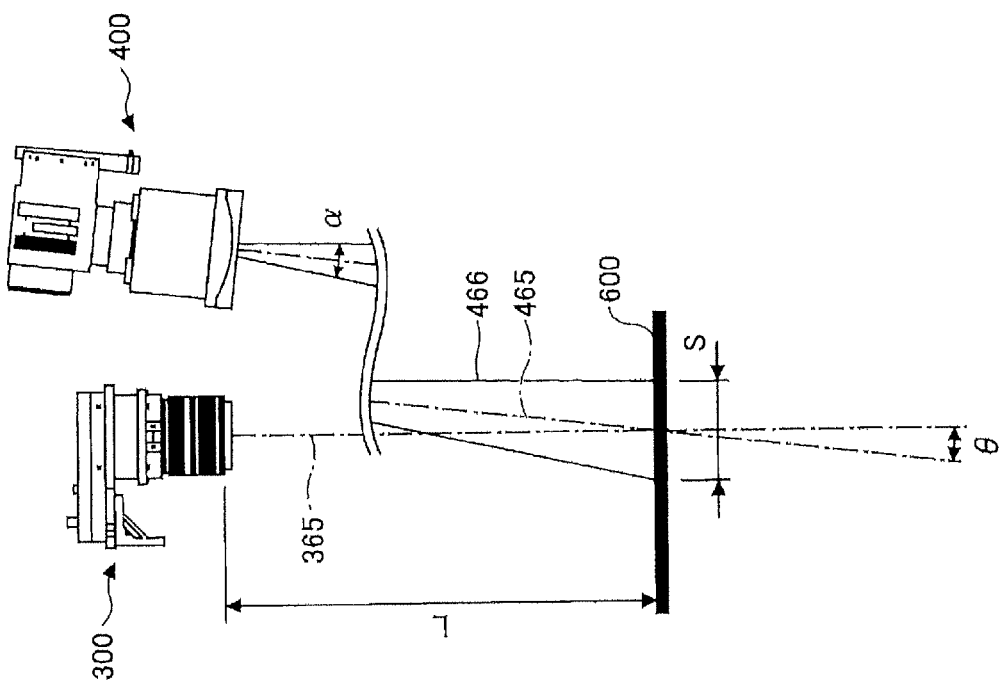

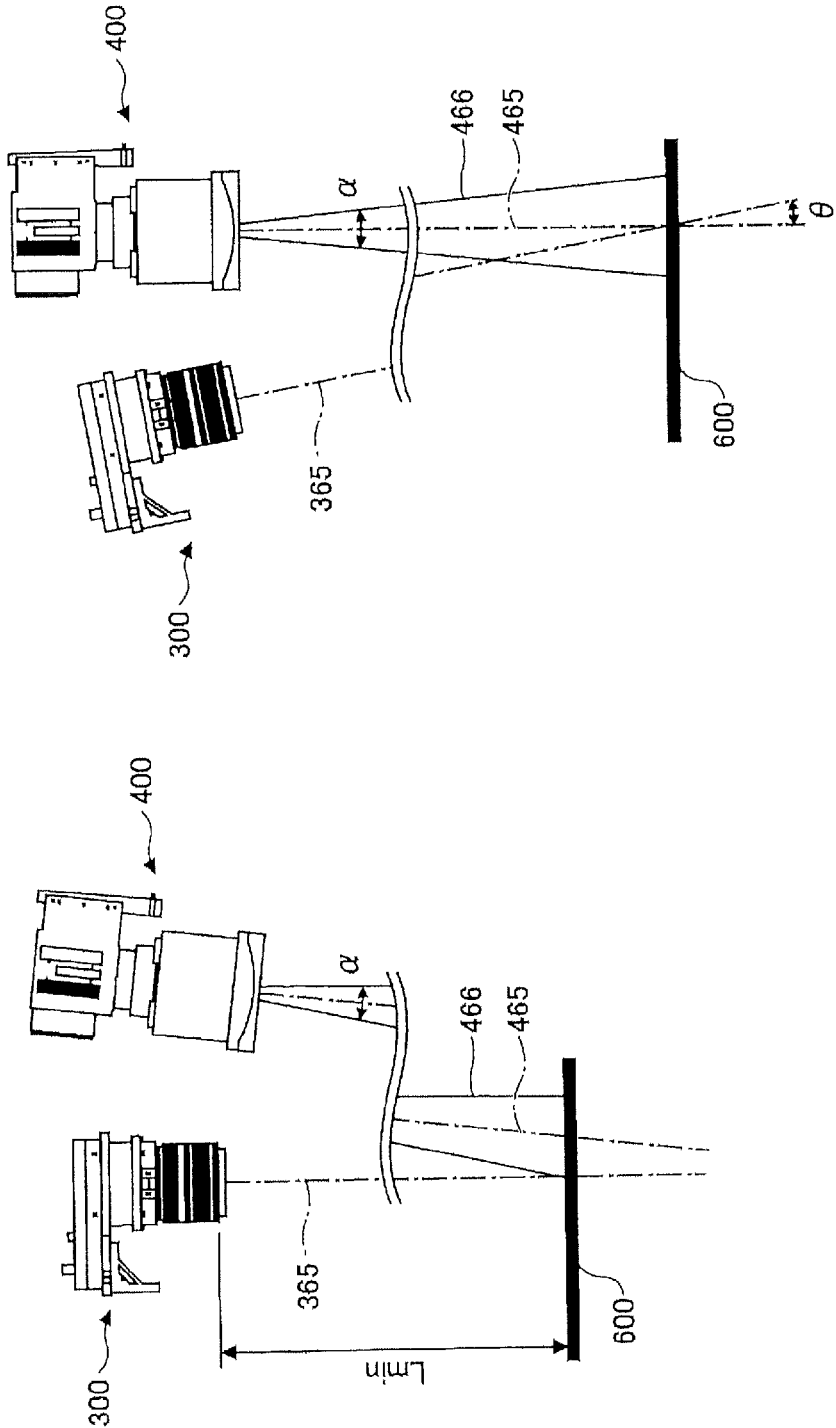

IMAGING APPARATUS, VEHICLE AND IMAGE CAPTURING METHOD

CROSS-REFERENCE TO RELATED APPLICATION

This application is a continuation application of U.S. patent application Ser. No. 16/809,780 filed on Mar. 5, 2020, which is based on and claims priority pursuant to 35 U.S.C. § 119(a) to Japanese Patent Application No. 2019-052004, filed on Mar. 19, 2019 in the Japan Patent Office, the disclosure of which is incorporated by reference herein in its entirety.

BACKGROUND

Technical Field

This disclosure relates to an imaging apparatus, a vehicle, and an image capturing method.

Background Art

Movable apparatuses, such as vehicle, mounted with a camera unit have been used to capture images of an object (e.g., tunnel) while moving the movable apparatuses to diagnose, evaluate or assess deterioration of the object, such as cracks and water leakage on a tunnel wall face.

For example, an imaging apparatus includes a plurality of cameras arranged along a direction intersecting an movement direction of the movable apparatus (hereinafter referred to as "intersecting direction"), in which the plurality of cameras capture images of respective ranges (positions) different in the intersecting direction while the movable apparatus is moving in the movement direction. In this imaging apparatus, two lighting units are provided so as to sandwich the camera in the intersecting direction for each of the plurality of cameras.

When images of objects are captured in a dark scene (e.g., tunnel), a plurality of lighting units is used for lighting the objects with sufficient brightness in the intersecting direction, and the lighting areas of respective lighting units are shifted in the intersecting direction.

However, there may be a case where the difference in brightness becomes greater between an area where the lighting areas overlap with each other, and an area where the lighting areas do not overlap with each other, in which a white area and/or a dark area may occur in the captured images. If the imaging apparatus is operated to reduce the phenomenon of white area and/or dark area in the images captured by the imaging apparatus, the entire object may not be captured with the appropriate brightness and appropriate resolution.

SUMMARY

In one aspect of the present invention, an imaging apparatus mountable on a moveable apparatus is devised. The imaging apparatus includes a plurality of lighting-imaging units, each configured to capture an image of a different area on an object in a direction intersecting with a movement direction of the moveable apparatus. The each of the plurality of lighting-imaging units includes a light source unit configured to illuminate a partial area on the object as a lighting area; and an image capture unit configured to capture an image of an image capture area set within the lighting area. The plurality of lighting-imaging units captures an image of a non-overlapped lighting area on the object where the lighting areas of the plurality of lighting-imaging units do not overlap with each other.

In another aspect of the present invention, a method of capturing an image of an object using an imaging apparatus mountable on a moveable apparatus is devised. The method includes capturing an image of a different area on the object in a direction intersecting with a movement direction of the moveable apparatus using each of a plurality of lighting-imaging units; illuminating a partial area on the object as a lighting area using a light source unit disposed in each of the plurality of lighting-imaging units; capturing an image of an image capture area set within the lighting area using an image capture unit; and capturing an image of a non-overlapped lighting area where the lighting areas of the plurality of lighting-imaging units do not overlap with each other.

As to the above described aspects of the present invention, images of an entire object can be captured with an appropriate brightness and appropriate resolution in a direction intersecting a movement direction of a moveable apparatus.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIGS. 5A and 5B illustrate an example of an image capture operation performed by an imaging apparatus when a distance from the imaging apparatus to a wall of a tunnel is short, where FIG. 5A is a diagram illustrating a vehicle from a movement direction, and FIG. 5B illustrates a state in which the vehicle moves inside the tunnel;

FIG. 6A is a diagram illustrating the vehicle viewed from a movement direction, and FIG. 6B illustrates a state in which the vehicle moves inside the tunnel;

FIG. 7A illustrates one case where there is no variation in the position/posture of the camera unit and the lighting unit, and FIG. 7B illustrates another case where the relative position/posture of the camera unit and the lighting unit fluctuates.

FIGS. 12A and 12B are views illustrating examples of relationship between an inclination angle of an optical axis of a camera unit and an optical axis of a lighting unit, a light distribution angle of projection light, and a lighting area, and FIG. 12A illustrates an example of a relationship between the camera unit, the lighting unit and a wall face of tunnel, and FIG. 12B illustrates another example relationship between the camera unit, the lighting unit and the wall face of tunnel when a vehicle is farthest away from the wall face of tunnel while an image capture area overlaps with a lighting area;

FIGS. 12C and 12D are views illustrating another examples of relationship between an inclination angle of an optical axis of a camera unit and an optical axis of a lighting unit, a light distribution angle of projection light, and a lighting area, and FIG. 12C illustrates another example relationship between the camera unit, the lighting unit and a wall face of tunnel when a vehicle is closest to the wall face of tunnel while an image capture area overlaps with a lighting area, and FIG. 12D illustrates another example relationship between the camera unit, the lighting unit and the wall face of tunnel when an optical axis of the camera unit is inclined with respect to an optical axis of the lighting unit with an inclination angle;

FIG. 15A is a diagram illustrating a vehicle mounted with the imaging apparatus viewed from one side, and FIG. 15B is a diagram illustrating the vehicle mounted with the imaging apparatus viewed from a front side of the vehicle;

FIG. 16A illustrates one case when the lighting areas of the light source units do not overlap, and FIG. 16B illustrates another case when the lighting areas of the light source units overlap;

FIG. 23A illustrates an example configuration of the imaging apparatus of modification example of the second embodiment before the inversion, and FIG. 23B illustrates an example configuration of the imaging apparatus of modification example of the second embodiment after the inversion;

FIG. 24A illustrates an example configuration of the imaging apparatus of modification example of the second embodiment before the inversion, and FIG. 24B illustrates an example configuration of the imaging apparatus of modification example of the second embodiment after the inversion;

Figure 1:
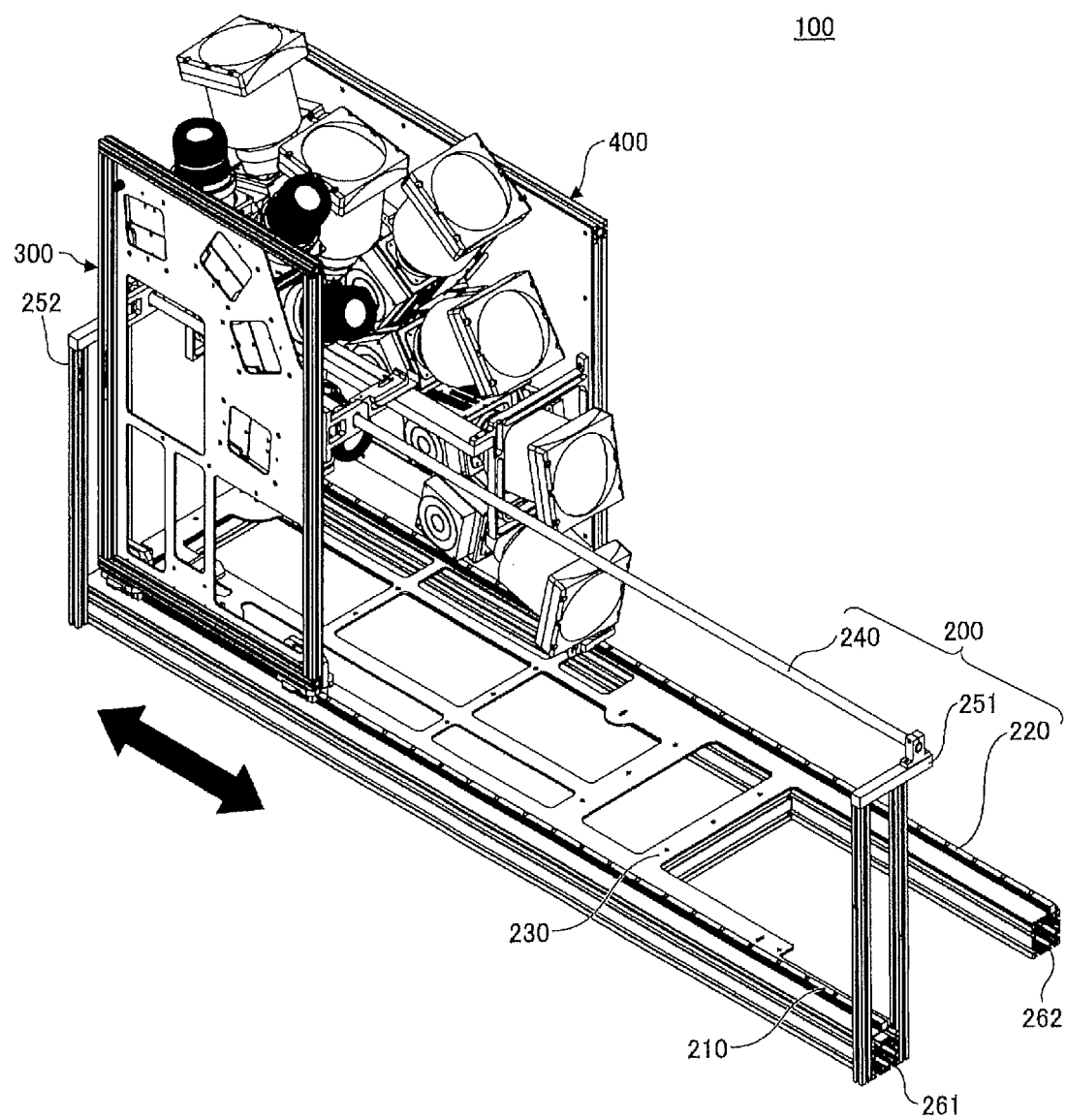
FIG. 1 is a perspective view illustrating an example of a configuration of an imaging apparatus according to an embodiment of this disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

A description is now given of exemplary embodiments of the present disclosures. It should be noted that although such terms as first, second, etc., may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present disclosures.

In addition, it should be noted that the terminology used herein is for the purpose of describing particular embodiments only and is not intended to be limiting of the present disclosures. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of an embodiment with reference to the drawings. In each drawing, the same reference numerals are given to the same components, and redundant explanations may be omitted.

In this disclosure, an imaging apparatus according to an embodiment is an apparatus for capturing images of structure or structural object (e.g., tunnel) used for maintaining and managing the structure. In the embodiment, the imaging apparatus is described as an example of image capture apparatus, which is mounted on a vehicle, and captures images of wall face inside a tunnel while moving the vehicle in the tunnel.

(Configuration of Imaging Apparatus)

FIG. 1 is a perspective view of an example configuration of an imaging apparatus 100 according to an embodiment. The imaging apparatus 100 includes, for example, a slide unit 200, a camera unit 300, and a lighting unit 400.

The camera unit 300 captures images of wall face of a tunnel (i.e., structure or structural object). The lighting unit 400 emits projection light onto the wall face of the tunnel for capturing images of the wall face using the camera unit 300.

The slide unit 200 is used for sliding the camera unit 300 and the lighting unit 400 along a direction indicated by an arrow illustrated in FIG. 1. Positions of the camera unit 300 and the lighting unit 400 can be changed along the arrow direction of FIG. 1 using the slide unit 200. The slide unit 200 is an example of a "horizontal shift mechanism."

The slide unit 200 includes, for example, rails 210 and 220, a base 230, a guide shaft 240, a guide shaft holding members 251 and 252, and frames 261 and 262.

The camera unit 300 slides on the rail 210 fixed to the frame 261 to change the positions along the arrow direction of FIG. 1. Similarly, the lighting unit 400 slides on the rail 220 fixed to the frame 262 to change the positions along the arrow direction illustrated in FIG. 1.

The rails 210 and 220 are respectively fixed to the frames 261 and 262 so that the rail axes of the rails 210 and 220 are substantially parallel to each other. The base 230 is fixed to the frames 261 and 262 to connect the frames 261 and 262, and becomes a base of the imaging apparatus 100.

The guide shaft 240 is a member used to stably slide the camera unit 300 and the lighting unit 400 with higher precision. The guide shaft 240 is made of, for example, a metal round bar. The longitudinal direction of the guide shaft 240 (metal round bar) is disposed along the slide direction of the camera unit 300 and the lighting unit 400.

The guide shaft 240 is held by the guide shaft holding members 251 and 252, in which the guide shaft 240 is inserted into through-holes respectively formed on the guide shaft holding members 251 and 252 to hold the guide shaft 240 using the guide shaft holding members 251 and 252. The configuration and effect of the guide shaft 240 and members in the vicinity of the guide shaft 240 will be described in detail later.

FIG. 1 illustrates one example configuration, in which the slide unit 200 is used to slide both the camera unit 300 and the lighting unit 400, but is not limited to thereto. For example, one unit for sliding the camera unit 300 and another unit for sliding the lighting unit 400 can be set as different units.

The imaging apparatus 100 is attached, for example, a roof of vehicle, by setting the slide direction of the camera unit 300 and the lighting unit 400 to intersect the movement or traveling direction of vehicle. In other words, the arrow direction of FIG. 1 intersects with the movement direction of vehicle mounted with the imaging apparatus 100. By mounting the imaging apparatus 100 with this arrangement, the positions of the camera unit 300 and the lighting unit 400 can be changed on a virtual plane that intersects the movement direction of vehicle.

The portion of vehicle to which the imaging apparatus 100 is mounted is not limited to the roof. The imaging apparatus 100 can be mounted on a front, a rear bonnet, or a truck bed if the vehicle is a truck. Further, when mounting the imaging apparatus 100 to the vehicle roof, a hook or the like can be used similar to a vehicle ski carrier.

(Configuration of Camera Unit)

Figure 2:
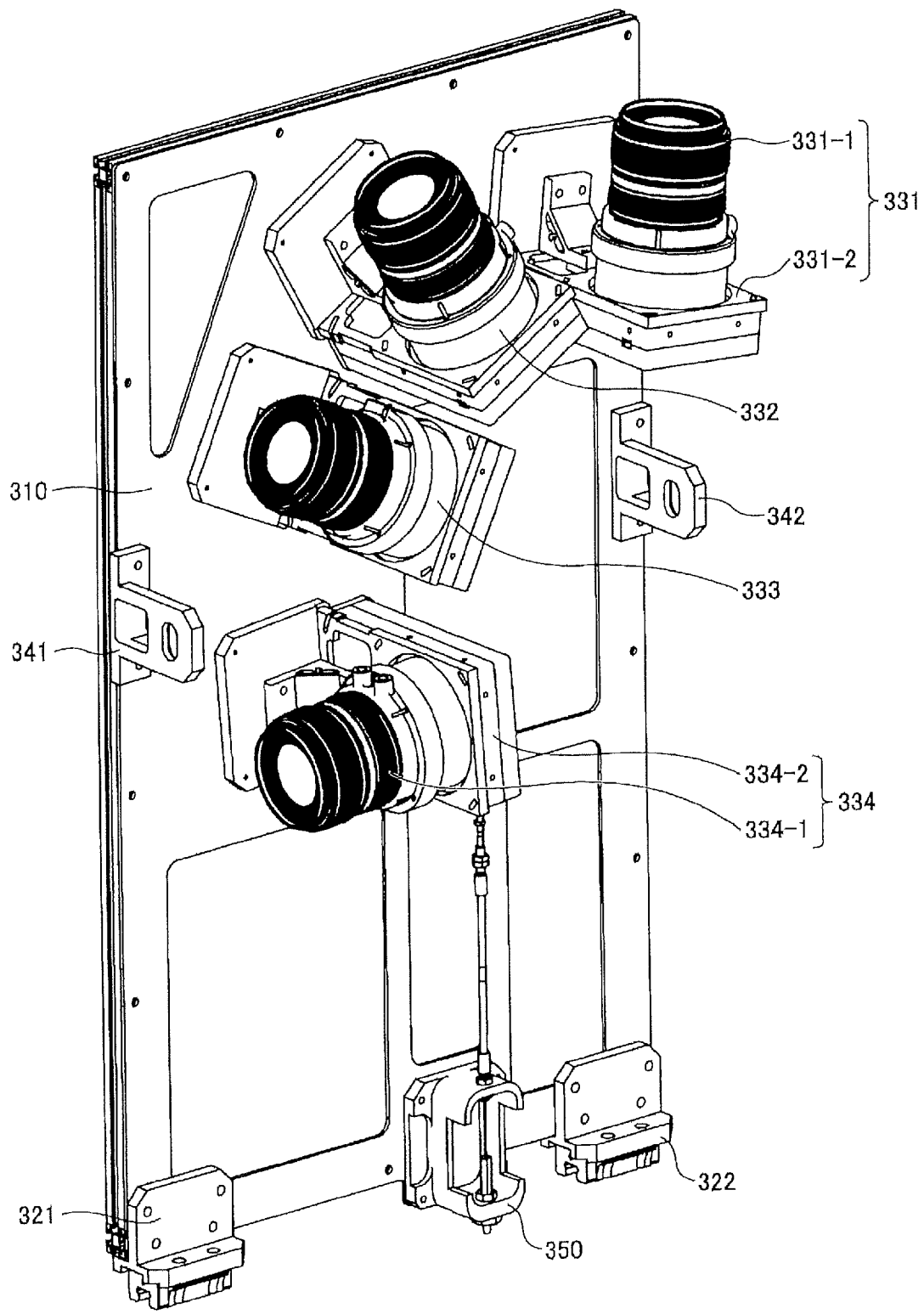
FIG. 2 is a perspective view illustrating an example of a configuration of a camera unit of an imaging apparatus according to an embodiment of this disclosure.

FIG. 2 is a perspective view of an example configuration of the camera unit 300 according to the embodiment.

The camera unit 300 includes, for example, a base plate 310, rail connection members 321 and 322, cameras 331 to 334, shaft connection members 341 and 342, and index plunger 350.

The rail connection members 321 and 322 are used for connecting the base plate 310 and the rail 210. The rail connection members 321 and 322 have a U-shaped shape portion in a cross-section direction perpendicular to the rail axis. If the rail 210 is a double headed rail, the rail connection member 321 and 322 are connected to the rail 210 by covering one head of the double headed rail with the U-shaped portion.

The rail connection members 321 and 322 have the same shape, and are connected to the rail 210 at two positions in the axial direction of the rail 210. By fixing the base plate 310 to the rail connection members 321 and 322, the camera unit 300 is slidable along the direction of the rail axis (the arrow direction in FIG. 1).

The cameras 331 to 334 are fixed to a plane of the base plate 310. The camera 331 has a lens unit 331-1 and a line charge coupled device (CCD) 331-2. The lens unit 331-1 forms an image of object or subject existing in the optical axis direction of the lens unit 331-1 on an imaging face of the line CCD 331-2. The line CCD 331-2 captures the image of object formed by the lens unit 331-1. The lens unit 331-1 is an example of an "imaging optical system."

Further, an aperture 331-1a (see FIG. 4) is provided inside the lens unit 331-1. The aperture 331-1a is an iris diaphragm having a diaphragm blade, and have an opening that can change the diameter variably. The opening diameter can be changed by connecting a drive unit such as a motor to the diaphragm blade and by driving the motor based on the control signal. With this configuration, the amount of light passing through the lens unit 331-1 can be changed, and the brightness of image of object formed by the lens unit 331-1 can be changed.

The line CCD 331-2 is a CCD in which pixels are arranged one dimensional (linear) direction. In the embodiment, the camera 331 is fixed to the base plate 310 so that the arrangement direction of the pixels of the line CCD 331-2 intersects the movement direction of the vehicle. Since the cameras 332 to 334 have the same structure as those of the camera 331, the description thereof will be omitted.

The tunnel has a semicircular-shaped virtual plane when a virtual cross-sectional plane of the tunnel is cut along the top-to-bottom direction, in which the semicircular-shaped virtual plane intersects the movement direction of vehicle. As illustrated in FIG. 2, the cameras 331 to 334 are disposed radially so that the optical axes of the lenses of the cameras 331 to 334 intersect with the wall of tunnel. In other words, the cameras 331 to 334 are radially disposed on the plane of the base plate 310 so as to face the wall of tunnel respectively.

By combining or stitching line images captured respectively by the cameras 331 to 334 along the arrangement direction of the cameras 331 to 334, a line image of the wall face of tunnel can be captured in accordance with the internal shape of tunnel. Then, by capturing the above described line images from the vehicle moving inside the tunnel with a pre-set time interval and by combining or stitching the captured line images along a direction orthogonal to the arrangement direction of the cameras 331 to 334, an area image (two dimensional image) of tunnel wall face can be obtained. The pre-set time interval is an acquisition time interval of line image by the line CCD.

In this example case, the number of cameras is four, but is not limited thereto. The number of cameras may be increased or decreased depending on the conditions such as the size of tunnel. Further, the image magnification, field of view and F-number and the like of the lens unit 331-1 may be determined according to the image capture conditions.

Further, the camera 331 is provided with the line CCD as described above, but is not limited thereto. For example, the camera 331 can be provided with an area CCD in which the pixels are arranged two dimensionally. Further, complementary metal-oxide-semiconductor (CMOS) can be used instead of CCD.

The shaft connection members 341 and 342 are used for connecting with the guide shaft 240. The index plunger 350 is used for fixing the camera unit 300 at a desired position in the slide direction. The configuration and effect of the shaft connection members 341 and 342 and the index plunger 350 will be described in detail later.

(Configuration of Lighting Unit)

Figure 3:
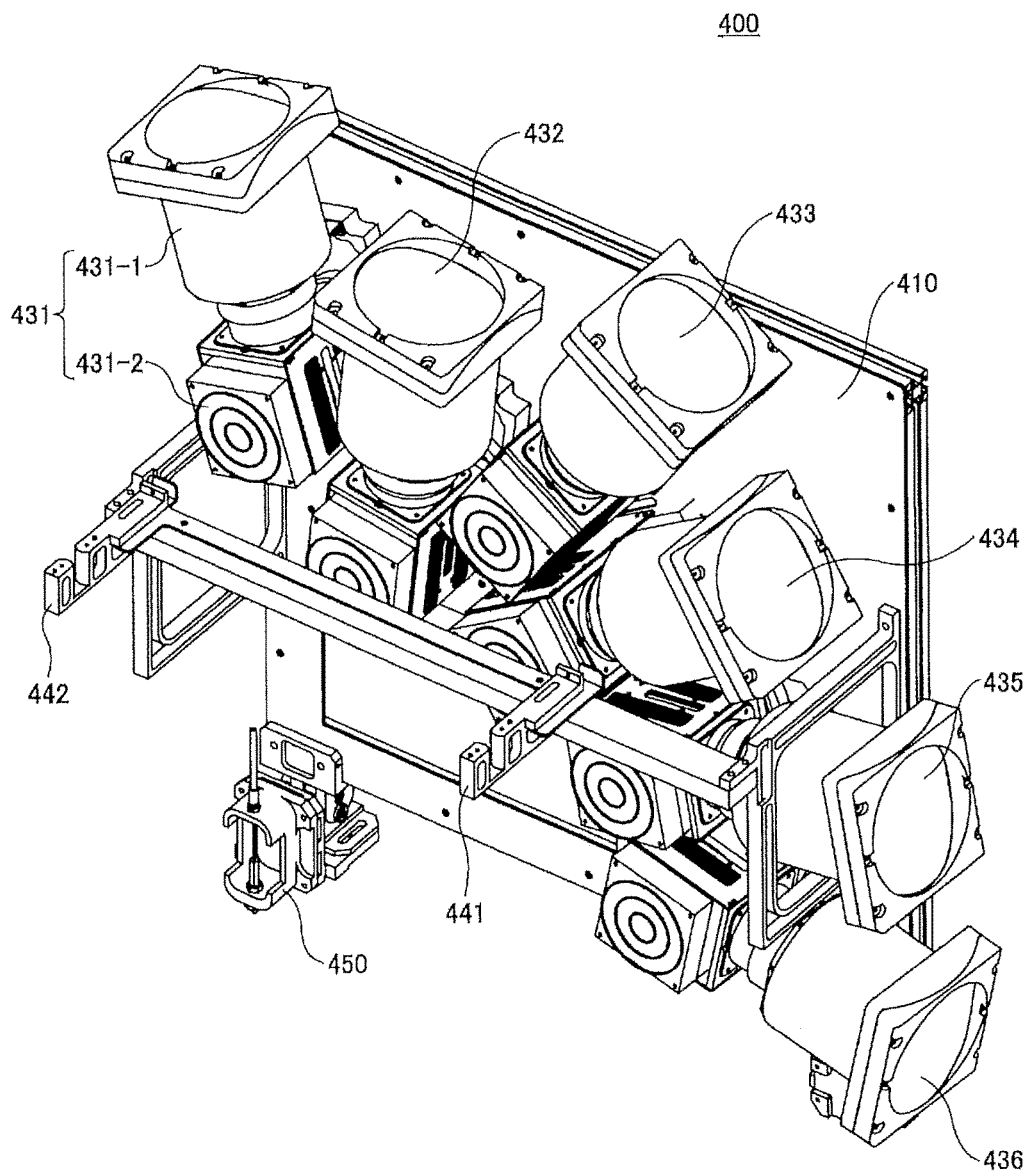
FIG. 3 is a perspective view illustrating an example of a configuration of a lighting unit of an imaging apparatus according to an embodiment of this disclosure.

FIG. 3 is a perspective view of an example configuration of the lighting unit 400 according to the embodiment.

The lighting unit 400 includes, for example, a base plate 410, a rail connection member, light source units 431 to 436, shaft connection members 441 and 442, and an index plunger 450. The relationship between the rail connection member and the rail 220 is similar to the relationship between the rail connection members 321 and 322 and the rail 210 described above.

The light source units 431 to 436 are fixed to a plane of the base plate 410. The light source unit 431 includes a lens unit 431-1 and a light source 431-2.

The light source 431-2 emits projection light onto an object existing in the optical axis direction of the lens unit 431-1 through the lens unit 431-1. Further, an aperture 431-1a is provided inside the lens unit 431-1 (see FIG. 4).

The aperture 431-1a and have an opening that can change the diameter variably. By changing the diameter of opening, the light amount (brightness) of the projection light projected through the lens unit 431-1 can be changed. The light source 431-2 can be a metal halide light, light emitting diode (LED), or the like. Since the light source units 432 to 436 have the same configuration as the light source unit 431, the description thereof will be omitted.

As described above, the tunnel has a semicircular-shaped virtual plane when a virtual cross-sectional plane of the tunnel is cut along the top-to-bottom direction, in which the semicircular-shaped virtual plane intersects the movement direction of vehicle. As illustrated in FIG. 3, the light source units 431 to 436 are disposed radially so that the optical axes of the lenses of the light source units 431 to 436 intersect with the wall of tunnel. In other words, the light source units 431 to 436 are disposed radially on the plane of the base plate 410 so as to face the wall of tunnel. Therefore, the lighting unit 400 can project the line-shaped light onto the wall of tunnel along a direction (the direction in which the pixels of the line CCD are arranged) intersecting the movement direction of vehicle.

In this example case, the number of lighting units is six, but is not limited thereto. The number of lighting units can be increased or decreased. Further, the number of lighting units is not necessarily equal to the number of cameras. The number of lighting units can be determined according to conditions such as brightness. Further, the lens angle of view and F-number can be also determined according to the image capture conditions.

Further, as illustrated in FIG. 3, the respective positions of the light source units 431 to 436 are shifted slightly along the direction of the optical axis of the lens to prevent the physical interference between the light source units 431 to 436.

The shaft connection members 441 and 442 are used for connecting with the guide shaft 240. The index plunger 450 is used for fixing the lighting unit 400 at a desired position in the slide direction. The configuration and effect of the shaft connection members 441 and 442 and the index plunger 450 will be described in detail later.

(Hardware Configuration of Imaging Apparatus)

Figure 4:
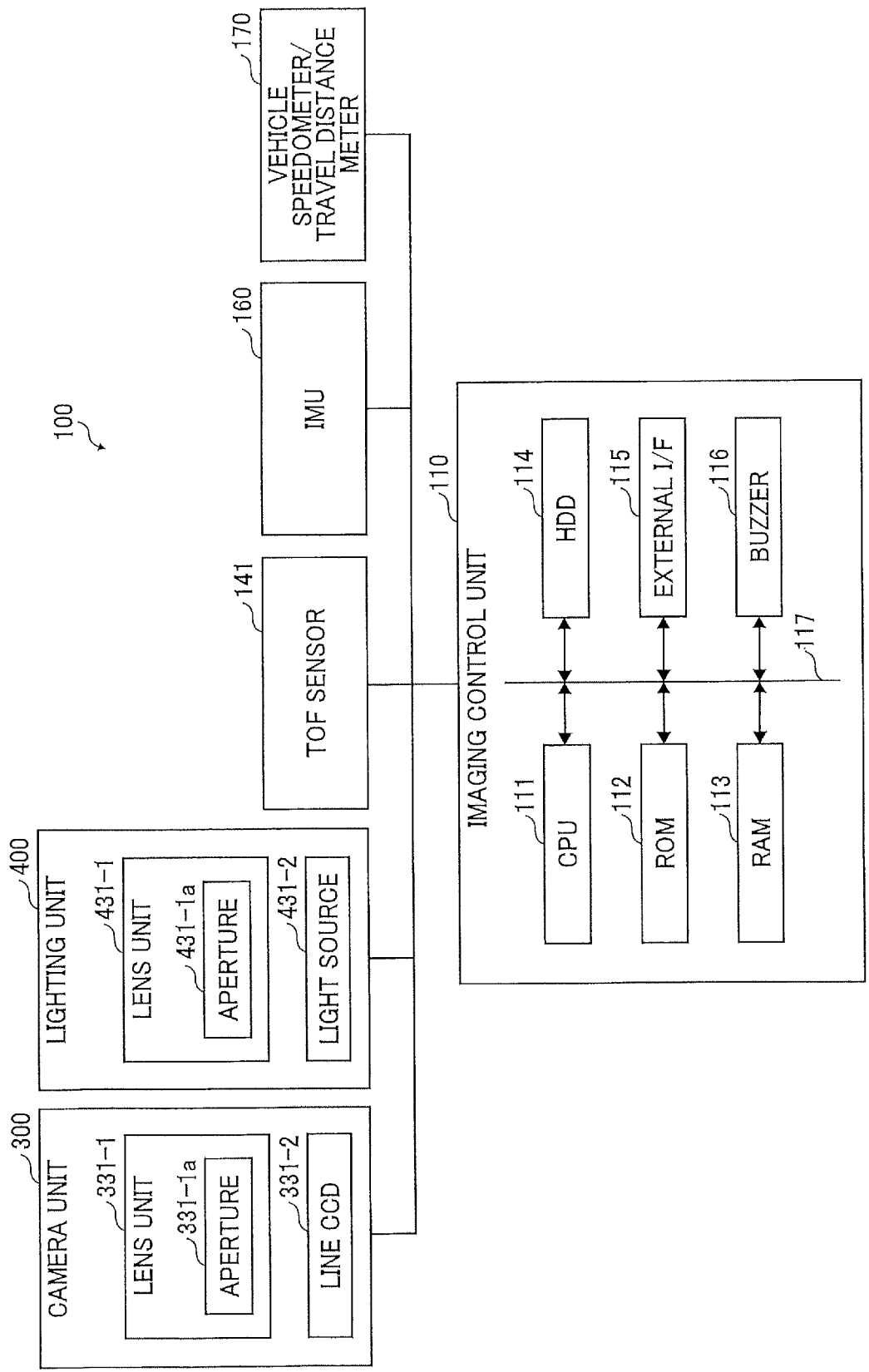
FIG. 4 is an example of a hardware block diagram of an imaging apparatus according to an embodiment of this disclosure.

FIG. 4 is an example of a hardware block diagram of the imaging apparatus 100. The imaging apparatus 100 includes, for example, the camera unit 300, the lighting unit 400, an imaging control unit 110, a time-of-flight (TOF) sensor 141, an inertial measurement unit (IMU) 160, and a vehicle speedometer/travel distance meter 170.

The TOF sensor 141 measures a distance from a wall face of a tunnel 600 to the TOF sensor 141. Specifically, the distance to the wall face of the tunnel 600 is measured based on the time difference between a start time of projecting the light from the lighting unit 400 to the wall of the tunnel 600 and a time of receiving the light by the TOF sensor 141. If the TOF sensor 141 employs an area sensor as the light receiving element, two dimensional contour image having a different display color depending on the distance can be obtained.

The IMU 160 measures the angle, angular velocity, and acceleration with respect to the three axes used for controlling the motion or movement of the vehicle 500, and the vehicle speedometer/travel distance meter 170 measures the speed and travel distance of the vehicle 500.

The data measured by the IMU 160 and the vehicle speedometer/travel distance meter 170 are stored in the HDD 114 via the imaging control unit 110, and are used to perform the geometric correction of the size and inclination of image of the wall face when performing the image processing.

The camera units 300 includes, for example, lens units 331-1, 332-1, 333-1 and 334-1, and the line CCDs 331-2, 332-2, 333-2 and 334-2. Further, the lens unit 331-1 is provided with an aperture 331-1a, the lens unit 332-1 is provided with an aperture 332-1a, the lens unit 333-1 is provided with an aperture 333-1a, and the lens unit 334-1 is provided with an aperture 334-1a. In FIG. 4, for simplifying the description of drawing, the lens unit 331-1, aperture 331-1a and line CCD 331-2 alone are illustrated, and other lenses, aperture and line CCD are omitted.

The lighting unit 400 includes, for example, lens units 431-1, 432-1, 433-1, 434-1, 435-1 and 436-1, and light sources 431-2, 432-2, 433-2, 434-2, 435-2, and 436-2. Further, the lens unit 431-1 is provided with an aperture 431-1a, the lens unit 432-1 is provided with an aperture 432-1a, the lens unit 433-1 is provided with an aperture 433-1a, the lens unit 434-1 is provided with an aperture 434-1a, the lens unit 435-1 is provided with an aperture 435-1a, and the lens unit 436-1 is provided with an aperture 436-1a. In FIG. 4, for simplifying the description of drawing, the lens unit 431-1, aperture 431-1a and light source 431-2 alone are illustrated, and other the lens, aperture and light sources are omitted.

As illustrated in FIG. 4, the imaging control unit 110 includes, for example, a central processing unit (CPU) 111, a read only memory (ROM) 112, a random access memory (RAM) 113, a hard disk drive (HDD) 114, an external interface (I/F) 115, and a buzzer 116, which are electrically connected to each other by a system bus 117.

The ROM 112 stores various programs, data and setting information, and the RAM 113 temporarily stores programs and data.

The CPU 111 reads the various programs, data and setting information from the ROM 112 onto the RAM 113, and executes the various programs, data and setting information to implement controlling of the entire imaging apparatus 100 and processing of image data. The processing of image data includes, for example, processing of combining or stitching the line images captured respectively by the cameras 331 to 334, and processing of combining or stitching the line images captured by the cameras 331 to 334 from the vehicle moving inside the tunnel with a pre-set time interval along the movement direction of vehicle. Further, the CPU 111 can implement various functions.

Some or all of the controlling, processing of image data, and various functions implemented by the CPU 111 can be implemented by field-programmable gate array (FPGA), and application specific integrated circuit (ASIC).

The HDD 114 stores image data input from the camera unit 300, and sensor data input from the TOF sensor 141, the IMU 160 and the vehicle speedometer/travel distance meter 170.

The external I/F 115 implements a function of user interface for operating the imaging apparatus 100, and a function of interface for the imaging apparatus 100 to communicate data and signals with external devices, such as personal computer (PC).

The buzzer 116 generates a beep sound to notify a warning to a user.

(Image Capturing Method, Operation, Effect)

Hereinafter, a description is given of the operation and effect of the imaging apparatus 100 according to the embodiment.

In the imaging apparatus 100, the camera unit 300 and the lighting unit 400 are slidable using the slide unit 200, and then fixed at two positions determined based on a length of a given road structure in the direction intersecting the movement direction of vehicle.

The length of given road structure is a width of sidewalk in the direction intersecting the movement direction of vehicle.

The sidewalk is a road for pedestrians to pass, which is constructed with the road, and is a part of the road that is structurally partitioned to allow pedestrians to pass. The width of sidewalk varies depending on the pedestrian traffic, such as about 1.5 to 3 m.

If the width of sidewalk is 1.5 m, the spacing between two positions can be set as 1.5 m based on the width of sidewalk. Alternatively, if the width of sidewalk is equal to or greater than 3 m and exceeds the width of vehicle, the spacing between two positions determined based on the width of sidewalk can be set to the maximum width of vehicle.

If there is an audit path or a road-side strip in addition to the sidewalk, the spacing between two positions determined based on the width of sidewalk can be determined as a length of difference between the width of the sidewalk and the width of audit path or between the width of the sidewalk and the width of road-side strip.

When images are acquired at the two positions, the camera unit 300 and the lighting unit 400 are fixed at one of the two positions determined based on the width of sidewalk in the direction intersecting the movement direction of vehicle to acquire an area image of tunnel in a desired region. Then, the camera unit 300 and the lighting unit 400 are fixed at the other position of the two positions to acquire an area image of tunnel in a desired region.

Hereinafter, a description is given of a method of capturing images of the wall face of the tunnel 600 from the two positions with reference to FIGS. 5 and 6. FIGS. 5A and 5B illustrate an example of an image capture operation performed by the imaging apparatus 100 when a distance from the imaging apparatus 100 to the wall of the tunnel 600 is short. FIG. 5A is a diagram illustrating the vehicle 500 viewed from the movement direction. FIG. 5B illustrates a state in which the vehicle 500 moves or travels inside the tunnel 600.

As illustrated in FIG. 5A, the imaging apparatus 100 is fixed on a roof of the vehicle 500. The camera unit 300 and the lighting unit 400 are moved toward the right end of the slide unit 200 when viewed along the movement direction, and are fixed to the slide unit 200 by the index plungers 350 and 450 (see FIGS. 2 and 3), respectively. The index plunger 350 and 450 are an example of "fixing unit."

As illustrated in FIG. 5B, a traffic lane 710 is on the left side of a road 700, and a traffic lane 720 is on the right side of the road 700. In the traffic lane 720, the vehicle 500 moves in one direction.

In this example case, a sidewalk 730 is provided on a side of the traffic lane 710 (the opposite lane of the vehicle 500). Since there is no sidewalk on a side of the traffic lane 720, the vehicle 500 moves at positions closer to the wall face of the tunnel 600 compared to when the vehicle 500 moves on the traffic lane 710 having the sidewalk 730.

The camera unit 300 and the lighting unit 400 are disposed at the position away from the wall face of the tunnel 600 that the left side of the vehicle 500 faces, in which the camera unit 300 and the lighting unit 400 are set at the right end of the slide unit 200 along the movement direction of the vehicle 500. In this example case, the positions of the camera units 300 and the lighting unit 400 are hereinafter referred to as position A.

The dashed line 100A in FIG. 5B represents an image capture area of the imaging apparatus 100. In other words, the imaging apparatus 100 captures images of a first area 600A (indicated by a thick line) corresponding to the image capture area indicated by the dashed line 100A among the entire wall face of the tunnel 600. As indicated by the first area 600A (thick line), the imaging apparatus 100 captures images from the upper wall face to the lower wall face of the tunnel 600 (i.e., a boundary between the tunnel wall end and the ground).

By performing the image capturing operation using the imaging apparatus 100 while moving the vehicle 500, the images of the wall face at the right half of the tunnel 600 (see FIG. 5B) are captured from the entrance to the exit of the tunnel 600.

Figure 6B:
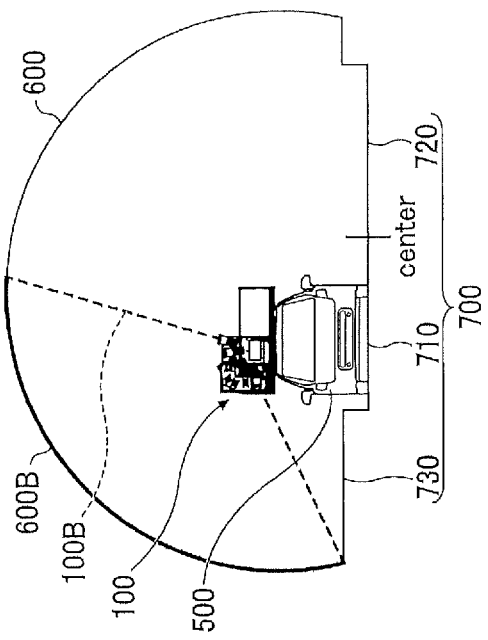
FIGS. 6A and 6B illustrate an example of an image capture operation performed by the imaging apparatus when a distance from the imaging apparatus to a wall of a tunnel is long, where
Figure 6A:
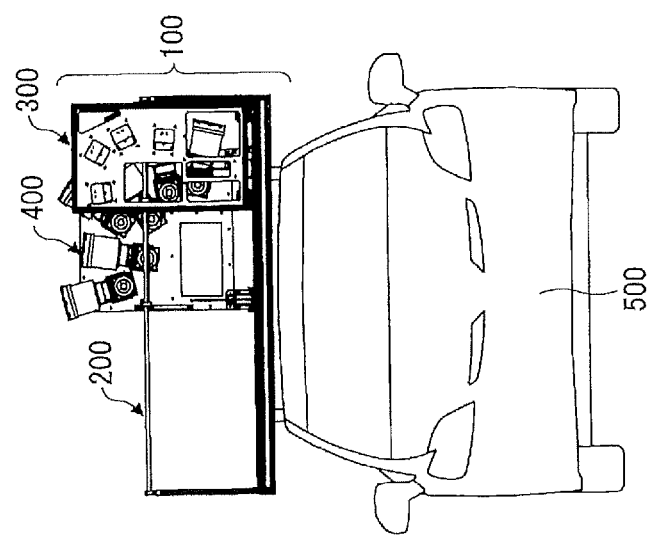

FIGS. 6A and 6B illustrate an example of an image capture operation performed by the imaging apparatus 100 when a distance from the imaging apparatus 100 to the wall of the tunnel 600 is long. FIG. 6A is a diagram illustrating the vehicle 500 viewed from the movement direction. FIG. 6B illustrates a state in which the vehicle 500 moves or travels inside the tunnel 600. The portions same as FIGS. 5A and 5B are omitted, and differences alone are described for FIGS. 6A and 6B.

In an example case of FIGS. 6A and 6B, the camera unit 300 and the lighting unit 400 are moved toward the left end of the slide unit 200 when viewed along the movement direction, and are fixed to the slide unit 200 by the index plungers 350 and 450 (see FIGS. 2 and 3), respectively.

In an example case of FIG. 6B, the vehicle 500 moves on the traffic lane 710 along the movement direction of the vehicle 500, in which the vehicle 500 is viewed the rear side.

In this example case of FIG. 6B, there is the sidewalk 730 on a side of the traffic lane 710, which is the lane where the vehicle 500 moves on. That is, the vehicle 500 moves on the traffic lane opposite to the traffic lane illustrated in FIG. 5B along the reverse direction. In this example case of FIG. 6B, compared to the case where there is no sidewalk on the side of the traffic lane 720 (FIG. 5B), the vehicle 500 moves at the positions away from the wall face of the tunnel 600 when viewed from the vehicle 500.

In this example case of FIG. 6B, the camera unit 300 and the lighting unit 400 are disposed at the positions closer to the wall face of the tunnel 600 that the left side of the vehicle 500 faces, in which the camera unit 300 and the lighting unit 400 are set at the left end of the slide unit 200 along the movement direction of the vehicle 500. In this example case, the positions of the camera units 300 and the lighting unit 400 are hereinafter referred to as position B.

The dashed line 100B in FIG. 6B represents an image capture area of the imaging apparatus 100. In other words, the imaging apparatus 100 captures images of a second area 600B (indicated by a thick line) corresponding to the image capture area indicated by the dashed line 100B among the entire wall face of the tunnel 600. As indicated by the second area 600B (thick line), the imaging apparatus 100 captures the images from the upper wall face to the lower wall face of the tunnel 600 (i.e., a boundary between the tunnel wall end and the ground).

By performing the image capturing operation using the imaging apparatus 100 while moving the vehicle 500, the images of the wall face at the right half of the tunnel 600 (see FIG. 6B) are captured from the entrance to the exit of the tunnel 600.

By combining or stitching the images of wall face captured in the state of FIGS. 5A and 5B and the images of the wall face captured in the state illustrated in FIGS. 6A and 6B, an image of the entire wall face of the tunnel 600 from the entrance to the exit of the tunnel 600 can be captured and acquired.

In the above described configuration, it is desirable that each camera of the camera unit 300 captures the image by overlapping the image capture area of each camera of the camera unit 300. In order to create one development-view image by combining or stitching the images, it is desirable that the image on one side without the sidewalk (see FIGS. 5A and 5B) and the image on another side with the sidewalk (FIGS. 6A and 6B) are captured by overlapping the images at a ceiling portion. In other words, when the images of the wall face of the tunnel 600 are captured by moving the vehicle 500 along one direction and then the opposite direction, it is desirable to overlap the image capture area of one direction and the image capture area of the opposite direction in the direction intersecting the movement direction of the vehicle 500 when capturing the images so as to prevent the missing of images of the wall face of the tunnel 600.

In the embodiment, the positions of the camera unit 300 and the lighting unit 400 can be switched to the positions A or B in accordance with the presence and absence of the sidewalk and then fixed, with which the distance from the wall face close to the vehicle 500 to the imaging apparatus 100 (i.e., the distance from the imaging apparatus 100 to a target object) can be set substantially at a constant value. As a result, the image capturing operation setting the common image capturing operation conditions for focusing, image magnification and brightness of lighting unit can be performed regardless of the presence or absence of sidewalk. Further, since the image of the right half wall and the image of the left half wall of the tunnel 600 can be captured under the common image capturing operation conditions, the image processing of combining or stitching the two image can be easily performed.

Accordingly, the images of the wall face of the tunnel 600 can be captured appropriately without complex workloads, such as focus adjustment of camera and the measurement of cross-sectional shape of the structure.

Further, the following effects can be also attained. For example, if the camera focus adjustment is performed while the vehicle is moving, the adjustment mechanism may fail due to the vibration of moving vehicle, and irregular movement such as sudden braking, rapid acceleration, or the like.

Further, if the adjustment mechanism employs a cam mechanism having a cam groove and a cam follower, the cam follower may move the cam groove gradually due to the vibration caused by the movement of the vehicle, and then the focus condition may change. Further, if dust in the tunnel enters inside the cam mechanism, malfunction may occur.

As to the embodiment, since the focus adjustment of camera is not performed while the vehicle is moving, the probability of these failures can be reduced. Further, the device cost can be reduced because the slide mechanism is simple. Further, the computing cost can be reduced because the complex image processing, such as detecting the contrast of texture of object for adjusting the focusing, is not required.

Further, when moving inside the tunnel that is dark and has lesser feature values, it is difficult to detect the contrast of image. If the contrast detection is to be performed with sufficient accuracy, the imaging element having higher sensitivity and higher cost is required. According to the embodiment, these technical difficulty and the cost of imaging element can be reduced.

Further, when the camera unit uses the line imaging element, only one line image is obtained, causing difficulty to adjust the focusing using the captured image. According to the embodiment, since the focus adjustment does not use the captured image, the line imaging element can be used for the camera unit. With this configuration, the image capturing operation can be performed with higher lighting efficiency to be described later.

Further, the following effects can be also attained in addition to the above effects. For example, it is assumed one case that the camera unit 300 and the lighting unit 400 are placed at a position relatively displaced from the center of the tunnel 600 when performing the image capturing operation. The center of the tunnel 600 refers to the approximate center of the half circle in the semicircular cross-sectional shape of the tunnel 600.

In this assumed case, the difference in the imaging condition, such as the image magnification becomes, becomes greater between the image of the wall face near the ceiling of the tunnel 600 (the image acquired by the camera 331 in FIG. 2) and the image of the wall face near the ground of the tunnel 600 (the image acquired by the camera 334 in FIG. 2). As a result, there is a problem that the resolution of the image fluctuates greatly between the ceiling of the tunnel 600 and the vicinity of ground.

This problem may be solved by performing one method described in JP-2011-095222-A, in which a vehicle moves along the center of a road by ignoring the traffic lane to capture images of the wall face of tunnel by setting the substantially same distance to the wall face of tunnel However, this method may be inconvenient because the image capturing operation is performed at night when the number of vehicles is small, or performed by blocking the road traffic due to a concern of collision with an oncoming vehicle during the image capturing operation. Further, if a median strip is provided on a road in the tunnel, the image capturing operation using the vehicle moving along the center of road cannot be performed.

By contrast, as to the embodiment, the camera unit 300 and the lighting unit 400 can be set closer to the center of the tunnel 600 when the vehicle 500 is near or far from the wall face of the tunnel 600, so that a difference in the image capturing operation conditions in each area of the tunnel can be reduced. Therefore, without blocking the road traffic of vehicles on the traffic lane, the image capturing operation can be performed with less troubles, such as a difference in image resolution between the vicinity of ceiling of the tunnel 600 and the vicinity of ground of the tunnel 600, while moving the vehicle on the traffic lane.

In the embodiment, the slide unit 200 is used to change the positions along the arrow direction illustrated in FIG. 1, but is not limited thereto. For example, the slide unit 200 can be used to change the positions along any direction on a virtual plane intersecting the movement direction of vehicle.

In the embodiment, the camera units 300 and the lighting units 400 are fixed at different two positions along the arrow direction illustrated in FIG. 1 using the slide unit 200, but is not limited thereto. For example, the camera units 300 and the lighting unit 400 can be fixed at different two positions, in a direction extending from the wall face of tunnel, on a virtual plane intersecting the movement direction of vehicle.

Hereinafter, the "direction extending from the wall face of tunnel" is described. As described above, the tunnel has a semicircular-shaped virtual plane when a virtual cross-sectional plane of the tunnel is cut along the top-to-bottom direction, in which the semicircular-shaped virtual plane intersects the movement direction of vehicle. Therefore, as to the wall face of tunnel, the wall face near the ground faces the horizontal direction while the wall face in the vicinity of the ceiling faces the substantially vertical downward direction. The "direction extending from the wall face of tunnel" refers to a direction that becomes different depending on the positions on the wall face of tunnel. The "direction extending from the wall face of tunnel" in the vicinity of ground is substantially the horizontal direction. On the other hand, the "direction extending from the wall face of tunnel" in the vicinity of the ceiling" is substantially the vertical downward direction.

Hereinafter, a description is given of configuration and effect of the guide shaft 240 with reference to FIGS. 7A and 7B.

The camera units 300 and the lighting unit 400 are separate components and slide independently. Therefore, when the guide shaft 240 is not applied, there is a possibility that the pitching, yawing, rolling, and the like may occur randomly at the time of sliding of the camera units 300 and the lighting unit 400, respectively.

Further, when the imaging apparatus 100 is to be detached from the vehicle 500, the relative positions and/or postures of the camera unit 300 and the lighting unit 400 (hereinafter referred to as "relative position/posture") may vary. Further, the relative position/posture of the camera unit 300 and the lighting unit 400 may vary due to the vibration of the moving vehicle, and the relative position/posture of the camera unit 300 and the lighting unit 400 may vary due to deformation of members, such as the frames 261 and 262, and the base plates 310 and 410 caused by the temperature effect.

If such fluctuation occurs, the projection light may not hit the image capture area of the camera unit 300, and the image cannot be captured due to insufficient brightness.

Figure 7A:
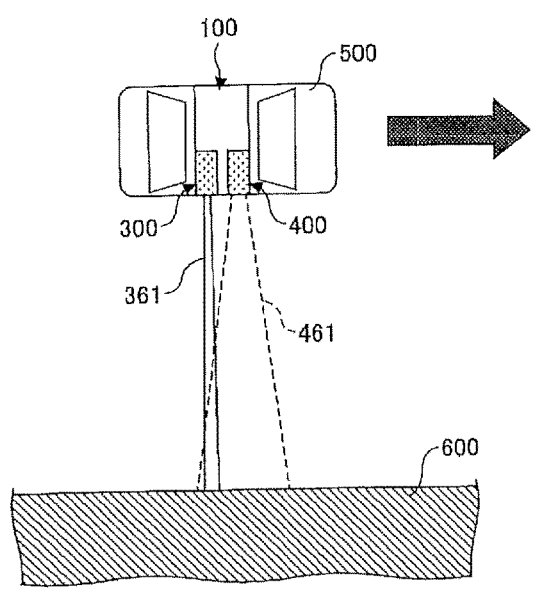
FIGS. 7A and 7B illustrate an influence of a relative position/posture of a camera unit and a lighting unit, where
Figure 7B:
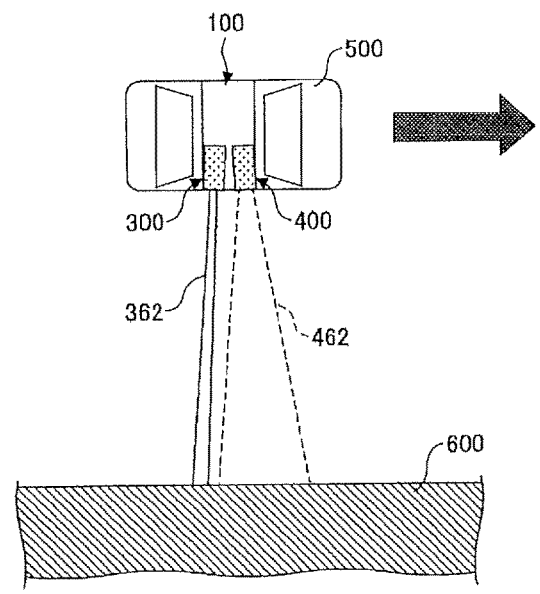

FIGS. 7A and 7B illustrate an example case when the relative position/posture of the camera unit 300 and the lighting unit 400 fluctuates and thereby the projection light does not appropriately hit the image capture area of the camera unit 300. FIG. 7A illustrates one case where there is no fluctuation in the position/posture of the camera unit 300 and the lighting unit 400. FIG. 7B illustrates another case where the relative position/posture of the camera unit 300 and the lighting unit 400 fluctuates.

In this specification, the vehicle travels in accordance with the rule of left-side traffic. Accordingly, the imaging apparatus is arranged so as to capture the left side of the movement direction of the vehicle. In a case of countries where the vehicle travels in accordance with the rule of right-side traffic, the imaging apparatus is arranged so as to capture the right side of the movement direction of the vehicle. FIGS. 7A and 7B illustrates an example in which the right side of the movement direction of the vehicle is captured. Further, the imaging apparatus can capture the left side of the movement direction of the vehicle. In this case, the camera unit 300 and the lighting unit 400 are rotated by 180 degrees and mounted on the vehicle 500.

FIG. 7A illustrates a view of the vehicle 500 moving along a direction indicated by of an arrow viewed from above. The tunnel 600 has a wall face. An image capture area 361 represents the image capture area of the camera unit 300, and a portion of the wall face of the tunnel 600 overlapping with the image capture area 361 becomes the image capture area of the camera unit 300 on the wall face. The lighting area 461 represents a lighting area of the lighting unit 400, and a portion of the wall face of the tunnel 600 overlapping with the lighting area 461 becomes the lighting area of the lighting unit 400 on the wall face.

In an example case of FIG. 7A, since there is no fluctuation in the position/posture between the camera unit 300 and the lighting unit 400, the image capture area of the camera unit 300 overlaps with the lighting area of the lighting unit 400. In other words, the projection light appropriately lights or illuminates the image capture area.

On the other hand, in an example case of FIG. 7B, the position/posture between the camera unit 300 and the lighting unit 400 independently vary, in which the image capture area 362 and the lighting area 462 change from the state of FIG. 7A, and the image capture area and the lighting area on the wall face of the tunnel 600 do not overlap with each other in FIG. 7B. In other words, due to fluctuations of the position/posture between the camera unit 300 and the lighting unit 400, the projection light does not appropriately illuminate the image capture area.

In particular, in the embodiment, the line CCD is used as the imaging element to narrow the image capture area (region) in the movement direction of the vehicle 500. In this case, the projection light is concentrated in a narrow range, so that the lighting efficiency becomes higher, which is preferable inside a dark tunnel that requires sufficient amount of projection light.

On the other hand, since the image capture area along the movement direction of vehicle 500 is set narrower, when the relative position/posture of the camera unit 300 and the lighting unit 400 fluctuates, the projection light may not appropriately illuminate the image capture area of the camera unit 300.

Figure 8:
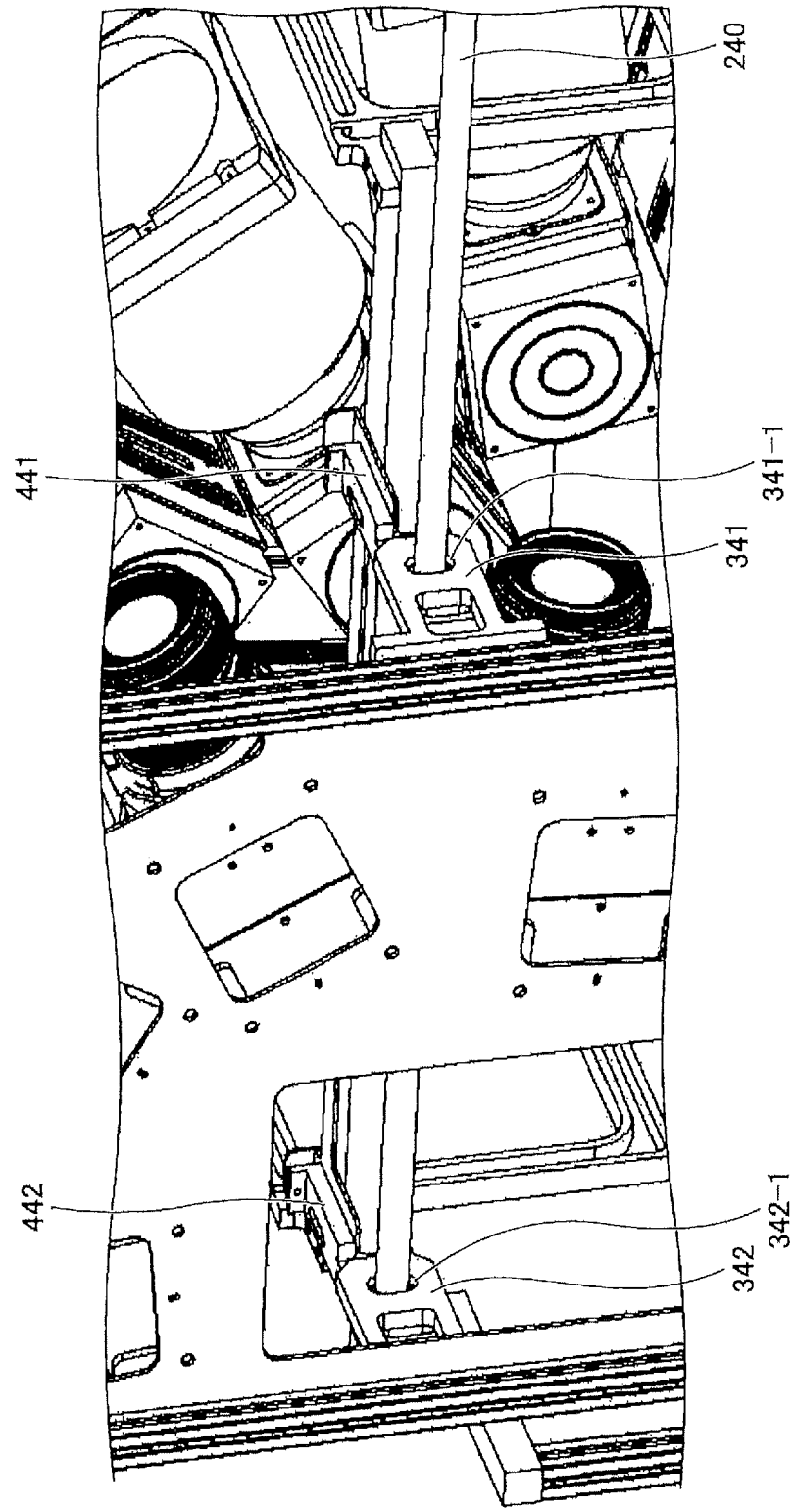
FIG. 8 illustrates an example configuration of a guide shaft and a guide shaft holding member.

Therefore, in order to prevent inappropriate illumination of the image capture area by the projection light, the imaging apparatus 100 includes the guide shaft 240. Hereinafter, a description is given of the guide shaft 240 with reference to FIG. 8. FIG. 8 illustrates an example configuration of the guide shaft and the guide shaft holding member according to an embodiment.

In FIG. 8, the guide shaft 240 is held by the guide shaft holding members 251 and 252. The shaft connection members 341 and 342 are fixed to the base plate 310 of the camera unit 300.

Further, the shaft connection members 341 and 342 are respectively provided with through-holes 341-1 and 342-1. By inserting the guide shaft 240 through the through-holes 341-1 and 342-1, the guide shaft 240 and the camera units 300 are connected to each other. Similarly, by inserting the guide shaft 240 through the through-holes provided to the shaft connection members 441 and 442, the guide shaft 240 and the lighting unit 400 are connected to each other.

The camera units 300 and the lighting unit 400 can slide while being connected to the guide shaft 240. In other words, the common member can be used as a guide for sliding.

Therefore, when any one of the relative position/posture of the camera unit 300 and the lighting unit 400 fluctuates, the other changes accordingly. That is, the camera unit 300 and the lighting unit 400 are slidable and stoppable while maintaining the relative position/posture of the camera unit 300 and the lighting unit 400. Thus, the fluctuation of the relative position/posture of the camera unit 300 and the lighting unit 400 can be reduced, and the problem that the projection light does not adequately illuminate the image capture area can be prevented.

Figure 9:
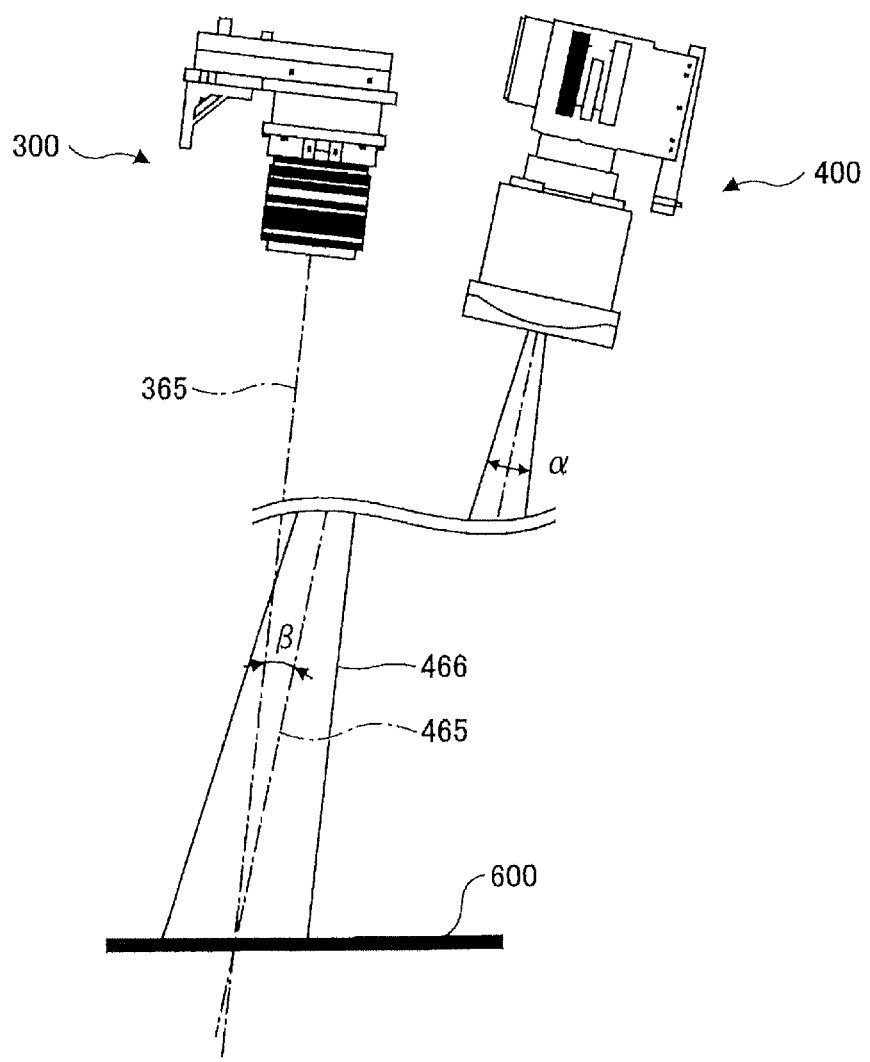
FIG. 9 illustrates an example of a relationship between an image capture area and a lighting area inclined with respect to a wall face of tunnel.

FIG. 9 illustrates an example of an image capture area of the camera unit 300 when the camera unit 300 is inclined with respect to the wall face of tunnel, and an example of a lighting area of the lighting unit 400 when the lighting unit 400 is inclined with respect to the wall face of tunnel.

In an example case of FIG. 9, the lighting unit 400 irradiates the wall face of the tunnel 600 with an projection light 466 that is a divergent light having an optical axis 465. A light distribution angle (divergence angle) a of the projection light 466 is about 1.65 degrees. The camera unit 300 captures images of the wall face of the tunnel 600. The camera unit 300 has an optical axis 365 as a first optical axis or a second optical axis.

When the relative position of the camera unit 300 and the lighting unit 400 fluctuates due to a meandering operation of the vehicle 500 (e.g., course change), as illustrated in FIG. 9, the camera unit 300 and the lighting unit 400 may inclined with respect to the wall face of tunnel 600, respectively. In this case, since the relative position/posture of the camera unit 300 and the lighting unit 400 is maintained, as illustrated in FIG. 9, a state in which the image capture area of the camera unit 300 overlaps with the lighting area of the lighting unit 400 can be maintained.

With this configuration, even when the positions of the camera unit 300 and the lighting unit 400 fluctuate by the meandering operation of the vehicle 500, the image capture area of the camera unit 300 can be appropriately illuminated by the lighting unit 400. In the embodiment, the line CCD is used, but the same effect can be attained even when the area CCD or the like is used.

Figure 10:
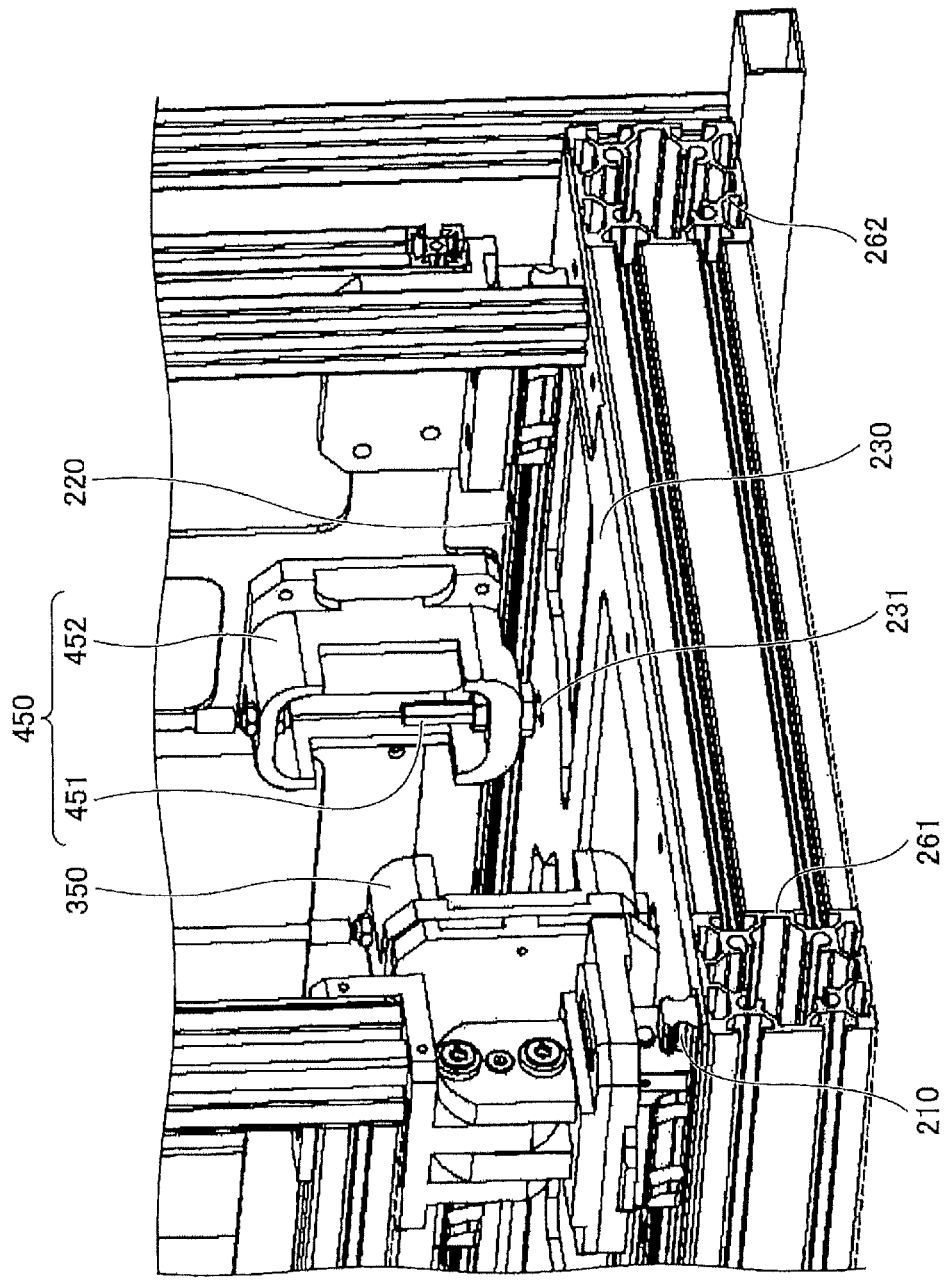
FIG. 10 illustrates an example configuration of an index plunger.

Hereinafter, a description is given of configuration and the operation of the index plunger 350 and 450 with reference to FIG. 10. FIG. 10 illustrates an example configuration of the index plungers 350 and 450.

In an example case of FIG. 10, the index plunger 350 is fixed to a plane of the base plate 310 of the camera unit 300, and the index plunger 450 is fixed to a plane of the base plate 410 of the lighting unit 400.

As described above, the camera unit 300 slides on the rail 210 and the lighting unit 400 slides on the rails 220. Since the index plunger 350 and 450 have similar configuration and effect, the index plunger 450 alone is described.

The index plunger 450 includes, for example, a plunger 451 and a plunger holding member 452. The plunger 451 has a pin having a round bar shape projecting toward a ground side, a spring having a biasing force applied to the pin toward the ground side, and a spring pressing member to press the pin and the spring. The plunger holding member 452 holds the plunger 451.

The base 230 of the slide unit 200 is provided a fitting hole 231 for fitting the pin to a position where the lighting unit 400 is to be fixed, in the sliding direction of the lighting unit 400. Therefore, when the index plunger 450 moves as the lighting unit 400 slides over the base 230, and the pin of the plunger 451 exists in any position where the fitting hole 231 does not exist, the pin of the plunger 451 contacts the base 230 but does not act to fix the lighting unit 400.

When the index plunger 450 moves as the lighting unit 400 slides over the base 230, and the pin of the plunger 451 comes to a position where the fitting hole 231 exists, the pin of the plunger 451 projects into the fitting hole 231 by the biasing force of the spring, and engages with the fitting hole 231. With this configuration, the lighting unit 400 cannot be slide, and thereby the lighting unit 400 is fixed. When the fixing state is to be released or canceled to enable the lighting unit 400 to slide again, a manual release mechanism is operated manually to release or cancel the fixing state.

In the embodiment, the base 230 has a fitting hole at a position corresponding to the position A and a fitting hole at a position corresponding to the position B in the slide direction, respectively. With this configuration, the lighting unit 400 can be fixed at different two positions on the plane intersecting the movement direction of vehicle. Similarly, the camera unit 300 can be fixed at different two positions on a virtual plane intersecting the movement direction of vehicle using the index plunger 350.

In the embodiment, the index plunger 450 is fitted into the fitting hole 231 provided on the base 230 to fix the lighting unit 400, but is not limited thereto. For example, the pin can be fitted and fixed into a fitting hole provided on the frame 262 and the rail 220 to fix the lighting unit 400, or the lighting unit 400 can be fixed by contacting with the base 230 to set the position of the lighting unit 400 on the base 230 and then fixing the lighting unit 400 on the base 230 using bolts or the like as the clamping member.

Hereinafter, a description is given of an example of an effect of inclining the projection direction of projection light emitted from the lighting unit 400 with respect to the image capture direction of the camera unit 300 with reference to FIG. 11.

Figure 11:
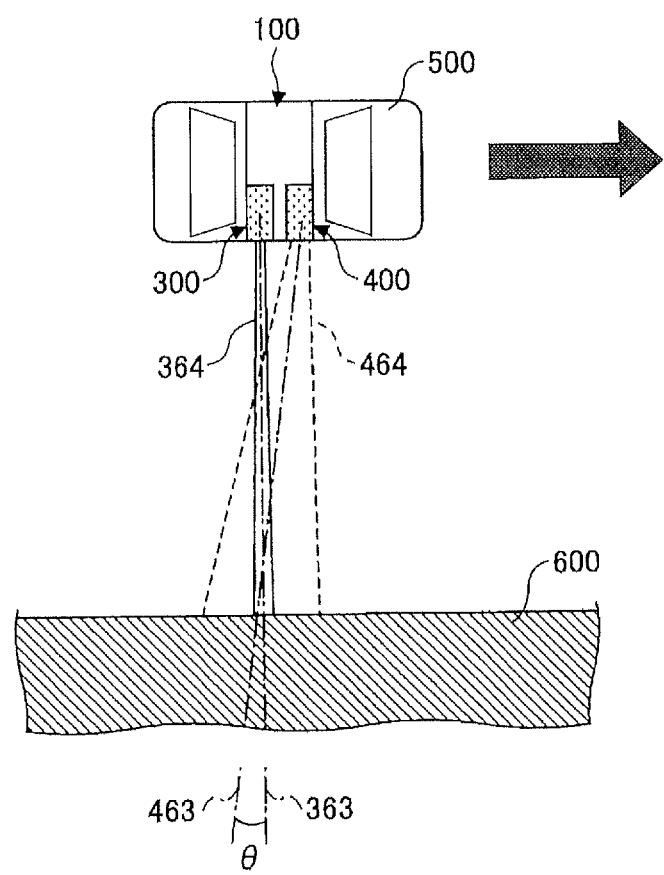
FIG. 11 illustrates an example of an effect of inclining a projection direction of a lighting unit with respect to an image capture direction of a camera unit.

FIG. 11 illustrates the vehicle 500 moving in the direction indicated by an arrow when viewed from above, as similar to FIGS. 7A and 7B. The image capture direction 363 is an image capture direction of the camera unit 300, and is synonymous with the optical axis direction of the lens of the camera unit 300. An image capture area 364 represents an area or range captured by the camera unit 300. A portion where the wall face of the tunnel 600 and the image capture area 364 overlap with each other corresponds to an image capture area of the camera unit 300 on the wall face.

A projection direction 463 is an projection direction of the lighting unit 400 and is synonymous with the optical axis direction of the lens of the lighting unit 400. A lighting area 464 represents an area that is illuminated by the projection light emitted from the lighting unit 400. The area (i.e., a portion) on the wall face of the tunnel 600 that is illuminated by the projection light emitted from the lighting unit 400 becomes the lighting area 464 on the wall face of the tunnel 600.

As described above, when the relative position/posture of the camera unit 300 and the lighting unit 400 fluctuates due to the vibration during the movement of the vehicle 500, the projection direction of the lighting unit 400 does not properly hit the image capture area of the camera unit 300, causing a problem that the image cannot be captured due to insufficient brightness.

Therefore, in the embodiment, the projection direction of the lighting unit 400 is inclined with respect to the image capture direction of the camera unit 300 to illuminate the image capture area on the wall face of the tunnel 600. In an example case of FIG. 11, a state of illuminating the image capture area on the wall face of the tunnel 600 using the projection light having an inclination angle θ is illustrated.

As above described, by inclining the projection direction of the lighting unit 400 to set the image capture area at the vicinity of the center of the lighting area in the movement direction of the vehicle, a problem that the projection light does not adequately illuminate the image capture area can be prevented.

FIGS. 12A, 12B, 12C, and 12D are views illustrating examples of relationship between the inclination angle θ of the optical axis 365 of the camera unit 300 and the optical axis 465 of the lighting unit 400, the light distribution angle α of the projection light, a distance L from the camera unit 300 to the wall face of the tunnel 600, and a lighting area S.

FIG. 12A illustrates one example relationship between the camera unit 300, the lighting unit 400 and the wall face of the tunnel 600. In FIG. 12A, the optical axis 365 of the camera unit 300 is perpendicular to the wall face of the tunnel 600, and the optical axis 465 of the projection light 466 emitted from the lighting unit 400 is inclined with respect to the optical axis 365 of the camera unit 300 with the inclination angle θ. This "perpendicular" does not mean exactly 90 degrees, but may be slightly offset from 90 degrees to some degree depending on the inclination of the wall face of the tunnel 600 and the meandering of the vehicle 500. This "perpendicular" is the same in the following description.

The projection light 466 illuminates the wall face of the tunnel 600 with the light distribution angle α. It is assumed that the distance L from the camera unit 300 to the wall face of the tunnel 600 fluctuates or varies from "Lmin" to "Lmax" by the meandering operation of the vehicle 500 or the like. The lighting area S is a lighting area of the projection light 466 on the wall face of the tunnel 600. The projection light is the light illuminating a circular region, and the lighting area S indicates a diameter of the circular region. However, the projection light is not limited to the light illuminating the circular region, but may be a light that illuminates a rectangular region and an elliptical region.

FIG. 12B illustrates another example relationship between the camera unit 300, the lighting unit 400 and the wall face of the tunnel 600 when the vehicle 500 is farthest away from the wall face of the tunnel 600 while the image capture area of the camera unit 300 overlaps with the lighting area of the lighting unit 400.

As one example, when the inclination angle θ is 2.5 degrees and the light distribution angle α is 1.65 degrees, the lighting area S becomes 330 mm. In this case, when the distance from the camera unit 300 to the wall face of the tunnel 600 is 5200 mm, the optical axis 365 of the camera unit 300 on the wall face of the tunnel 600 is positioned at the most end point of the lighting area S (the most right end in FIG. 12B). Accordingly, the distance 5200 mm from the camera unit 300 to the wall face of the tunnel 600 represents an example of the maximum distance "Lmax," which can maintain the state that the image capture area of the camera unit 300 overlaps with the lighting area of the lighting unit 400.

FIG. 12C illustrates another example relationship between the camera unit 300, the lighting unit 400 and the wall face of the tunnel 600 when the vehicle 500 is closest to the wall face of the tunnel 600 while the image capture area of the camera unit 300 overlaps with the lighting area of the lighting unit 400.

As one example, when the inclination angle θ is 2.5 degrees and the light distribution angle α is 1.65 degrees, the lighting area S becomes 330 mm. In this case, when the distance from the camera unit 300 to the wall face of the tunnel 600 is 2600 mm, the optical axis 365 of the camera unit 300 on the wall face of the tunnel 600 is positioned at the most end point of the lighting area S (the most left end of FIG. 12C). Therefore, the distance 2600 mm from the camera unit 300 to the wall face of the tunnel 600 is an example of a minimum distance "Lmin," which can maintain the state that the image capture area of the camera unit 300 overlaps with the lighting area of the lighting unit 400.

In the above, the lighting unit 400 projects the projection light on the wall face of the tunnel 600 by illuminating the divergent light having the light distribution angle α, but is not limited thereto, and the parallel light can be used.

When emitting or projecting the divergent light, the image capture area on the wall face of the tunnel 600 can be changed in accordance with the distance from the lighting unit 400 to the wall face of the tunnel 600. The longer the distance L from the lighting unit 400 to the wall face of the tunnel 600, the wider area on the wall face of the tunnel 600 can be illuminated.

When the parallel light is emitted or projected, a certain area or region on the wall face of the tunnel 600 can be illuminated regardless of the distance L from the lighting unit 400 to the wall face of the tunnel 600.

In the above, the direction of the optical axis 365 of the camera unit 300 is set perpendicular to the wall face of the tunnel 600 and the optical axis 465 of the lighting unit 400 is inclined with respect to the optical axis 365 of the camera unit 300, but not limited thereto. For example, as illustrated in FIG. 12D, the direction of the optical axis 465 of the lighting unit 400 can be set perpendicular to the wall face of the tunnel 600 and the optical axis 365 of the camera unit 300 can be inclined with respect to the optical axis 465 of the lighting unit 400. FIG. 12D illustrates another example relationship between the camera unit 300, the lighting unit 400 and the wall face of the tunnel 600 when the optical axis 365 of the camera unit 300 is inclined with respect to the optical axis 465 of the lighting unit 400 with the inclination angle θ. In other words, the optical axis 465 of the lighting unit 400 and the optical axis 365 of the camera unit 300 can be inclined with each other by the inclination angle θ.

By inclining the optical axis 465 of the lighting unit 400 and the optical axis 365 of the camera unit 300 as above described, the projection light can be directed to the image capture area of the camera unit 300. Even if the horizontal image capture area (horizontal field of view for image capturing operation) on the wall face of the tunnel 600 is narrower, the image capture area of the camera unit 300 can be appropriately illuminated with the projection light emitted from the lighting unit 400.

Further, when the guide shaft 240 is used to combine one structure of maintaining the relationship between the relative position/posture of the camera unit 300 and the lighting unit 400 and another structure of illuminating the projection light by inclining the projection direction, the image capture area of the camera unit 300 can be appropriately illuminated with the light emitted from the lighting unit 400. In other words, when the line CCD is used as the imaging element and the image capturing operation is performed with a state of higher illumination efficiency, a problem that the projection light emitted by the lighting unit 400 does not adequately illuminate the image capture area of the camera unit 300 can be prevented.

Further, even if the distance to the wall face of tunnel fluctuates due to the meandering of the vehicle and the different tunnel size, a problem that the projection light emitted by the lighting unit 400 does not adequately illuminate the image capture area of the camera unit 300 can be prevented.

Figure 13:
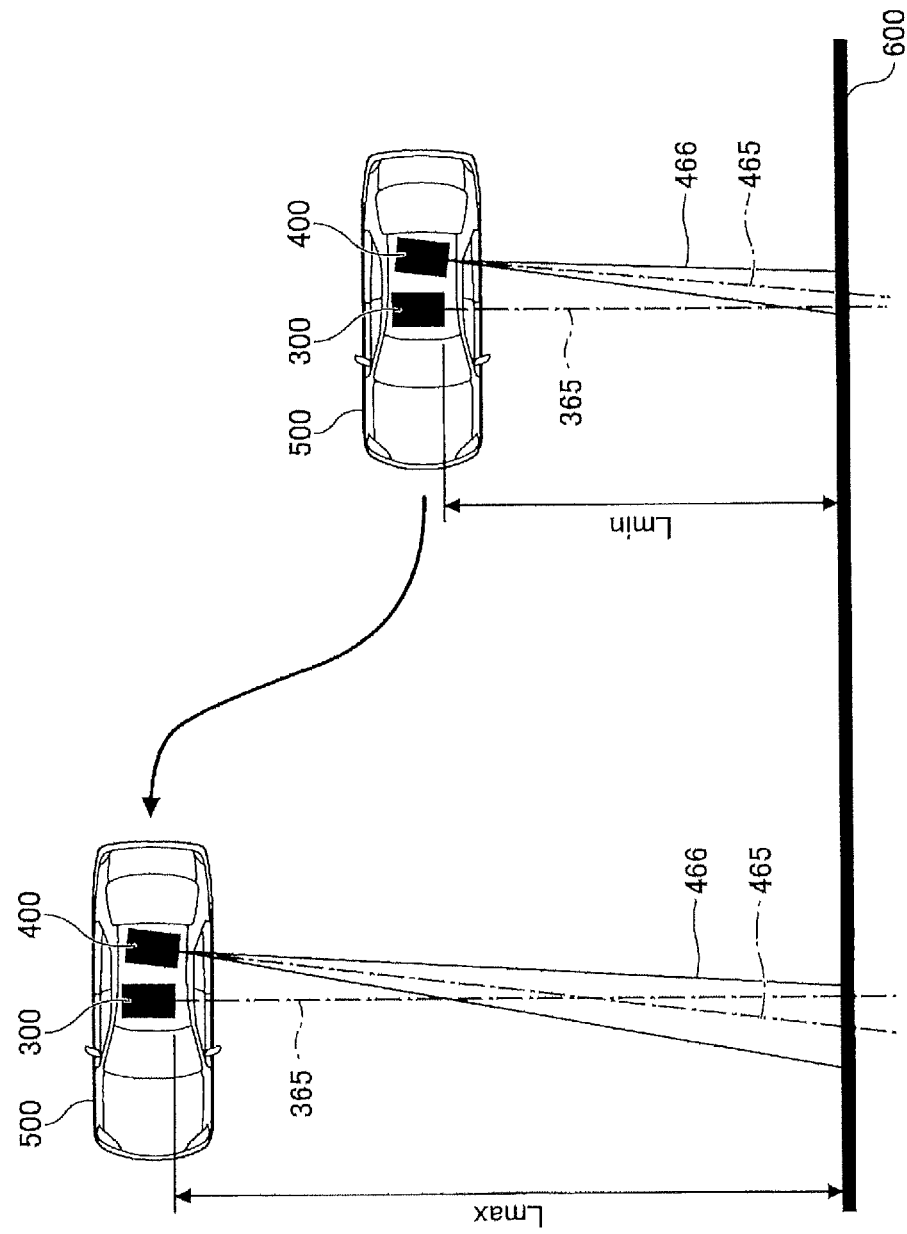
FIG. 13 is a diagram illustrating an example relationship between meandering of a vehicle and an image capture area and a lighting area.

FIG. 13 is a diagram illustrating an example relationship between the meandering of the vehicle 500 and the image capture area of the camera unit 300 and the lighting area of the lighting unit 400. In an example case of FIG. 13, the camera unit 300 and the lighting unit 400 are arranged so as to capture images of the left side of the movement direction of the vehicle 500. In a case when the vehicle 500 travel on the right side of road, the camera unit 300 and the lighting unit 400 can be arranged by rotating the directions of the camera unit 300 and the lighting unit 400 by 180 degrees. The vehicle 500 moves while meandering in a direction indicated by an arrow in FIG. 13.

As illustrated on the left side in FIG. 13, when the maximum distance "Lmax" from the camera unit 300 to the wall face of the tunnel 600 is 5200 mm, the optical axis 365 of the camera unit 300 on the wall face of the tunnel 600 is positioned at the most end point of the lighting area S (the most right end in FIG. 13). That is, the optical axis 365 of the camera unit 300 on the wall face of the tunnel 600 is positioned at one limit position that can maintain the state that the image capture area of the camera unit 300 overlaps with the lighting area of the lighting unit 400.

On the other hand, as illustrated on the right side of FIG. 13, when the minimum distance "Lmin" from the camera unit 300 to the wall face of the tunnel 600 is 2600 mm, the optical axis 365 of the camera unit 300 on the wall face of the tunnel 600 is positioned at the most end point of the lighting area S (the most left end of FIG. 13). That is, the optical axis 365 of the camera unit 300 on the wall face of the tunnel 600 is positioned at another limit position that can maintain the state that the image capture area of the camera unit 300 overlaps with the lighting area of the lighting unit 400.

In the condition of the inclination angle θ of 2.5 degrees and the light distribution angle α of 1.65 degrees (see FIG. 12A), the meandering of the vehicle 500 is allowed when the distance L from the camera unit 300 to the wall face of the tunnel 600 is within a range from 2600 mm to 5200 mm.

(Operation of Imaging Apparatus)

Figure 14:
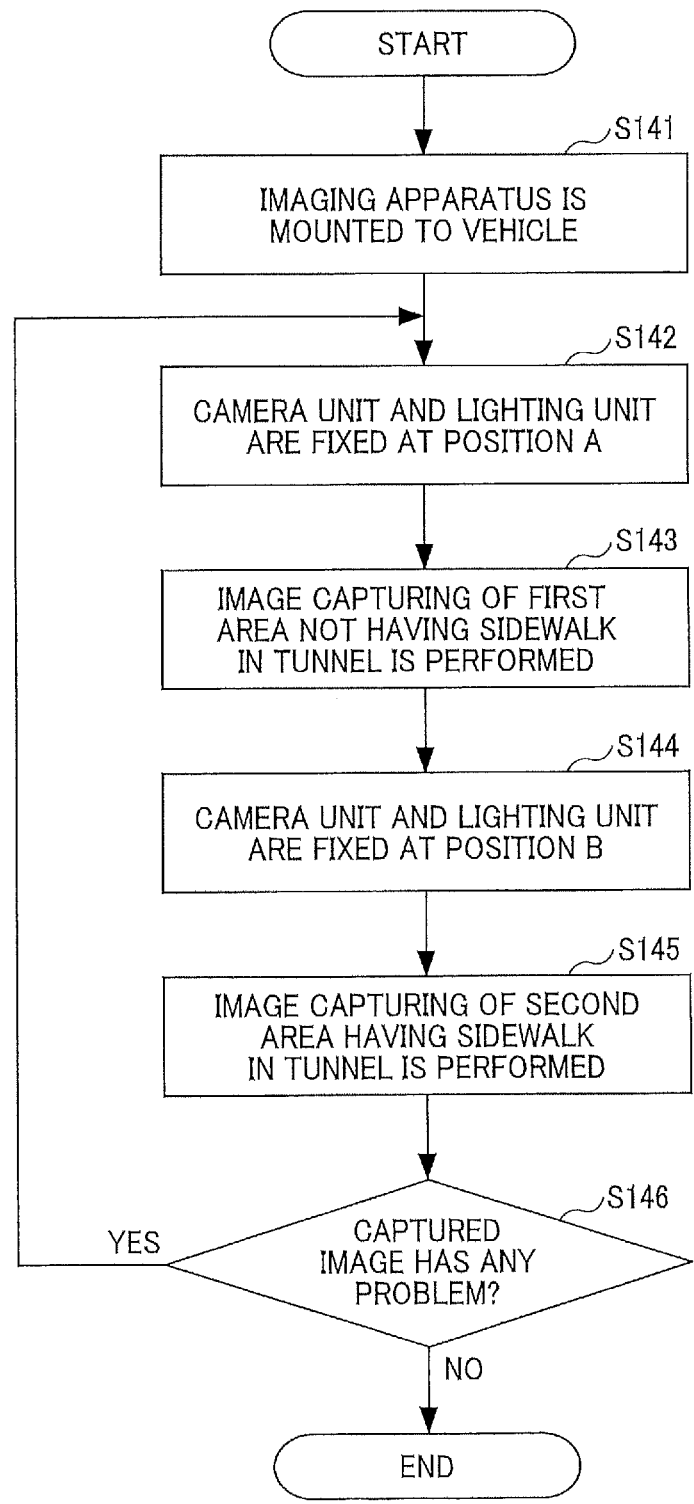
FIG. 14 is an example of a flowchart illustrating an operation of an imaging apparatus according to an embodiment.

Hereinafter, a description is given of operation of the imaging apparatus 100 with reference to FIG. 14. FIG. 14 is an example of a flowchart illustrating an operation of the imaging apparatus 100.

At first, in step S141, the imaging apparatus 100 is mounted on the vehicle 500.

Then, in step S142, the camera unit 300 and the lighting unit 400 are fixed to the position A using the slide unit 200. In step S142, the sliding of the camera unit 300 and the lighting unit 400 and the fixation of the camera unit 300 and the lighting unit 400 at the position A can be performed manually by a user.

Then, in step S143, an image capturing operation of the first area 600A not having the sidewalk 730 in the tunnel 600 is performed while moving the vehicle 500 from the entrance to the exit of the tunnel 600. In step S143, the image capturing operation is started when the vehicle 500 enters the entrance of the tunnel 600. The instruction to start the image capturing operation can be performed by the user.

When the vehicle 500 reaches the exit of the tunnel 600, the image capturing operation is stopped or terminated. The instruction to stop the image capturing operation can be performed by the user. At this stage, the image data of a half of the wall face of the tunnel 600 is stored in the HDD 114.

Then, in step S144, the camera unit 300 and the lighting unit 400 are fixed to the position B using the slide unit 200. In step S144, the sliding of the camera unit 300 and the lighting unit 400 and the fixation of the camera unit 300 and the lighting unit 400 at the position B can be performed manually by the user.

Then, in step S145, while moving the vehicle 500 from the exit to the entrance of the tunnel 600 in a direction opposite to the movement direction in step S143, an image capturing operation of the second area 600B having the sidewalk 730 in the tunnel 600 is performed. Similar to the above, the start and stop instruction of image capturing operation can be performed manually by the user. In this way, the remaining half of the entire wall face of the tunnel 600 is captured and stored in the HDD 114.

Then, in step S146, the user confirms whether the captured image has any problem. If there is no problem (step S146: No), the image capturing operation is completed. On the other hand, if the captured image has a problem (step S146: Yes), the sequence returns to step S142, and the image capturing operation is performed again.

As a result, the image of the wall face of the structure (e.g., tunnel) can be captured appropriately without complex workloads, such as focus adjustment of the camera and the measurement of cross-sectional shape of the structure during the image capturing operation.

In the embodiment, the fixation of the camera unit 300 and the lighting unit 400 at the positions A and B is performed with respect to the slide unit 200, but the fixation can be performed with respect to the vehicle 500. Hereinafter, a description is given of the fixation of the camera unit 300 and the lighting unit 400 to the vehicle 500.

The camera unit 300 and the lighting unit 400 are attached to a vehicle-fixing base plate. In a case of the position A, the vehicle-fixing base plate is fixed at the right end of the roof of the vehicle 500 along the movement direction by using a hook to fix the camera unit 300 and the lighting unit 400.

In a case of the position B, the vehicle-fixing base plate is fixed at the left end of the roof of the vehicle 500 along the movement direction by using a hook to fix the camera unit 300 and the lighting unit 400.

Further, the members similar to the guide shaft 240 and the guide shaft holding members 251 and 252 are provided on the vehicle fixing base plate to connect the shaft connection members 341 and 342, and the shaft connection members 441 and 442 and the guide shaft 240 each other. With this configuration, the influence of fluctuation of the relative relationship between the relative position/posture of the camera unit 300 and the lighting unit 400 can be reduced.

In this example case, the imaging apparatus 100 may not have the slide unit 200. Further, the camera units 300 and the lighting unit 400 may not have the index plungers 350 and 450, respectively.

As described above, even when the camera unit 300 and the lighting unit 400 is fixed to the vehicle 500, the same effect of fixing the camera unit 300 and the lighting unit 400 at the position A and B of slide unit 200 can be attained.

First Embodiment

When the image capturing operation is performed in the dark scene, such as the tunnel 600, the light amount can be ensured using the lighting unit. Further, to capture images of the entire wall face (i.e., inner peripheral face) of the tunnel 600, the lighting area of light source included in each of a plurality of light source units included in the lighting unit 400 is shifted slightly in a direction intersecting the movement direction of the vehicle 500 so that the lighting areas of the light source units are arranged linearly along the inner peripheral face of the tunnel 600.

However, there may be a case that a difference in brightness becomes larger between one area where the lighting areas overlaps and another area where the lighting areas do not overlap on the wall face of the tunnel 600. In this case, if the image capturing operation by the imaging apparatus is performed without causing a white area and/or dark area in the captured images, the images of the entire wall face of the tunnel 600 may not be captured with the resolution under the appropriate brightness.

In other words, if the exposure of each of a plurality of imaging units (cameras) such as the camera unit 300 is adjusted so that the area where the lighting areas are overlapped can be captured with the resolution under the appropriate brightness, the area where the lighting areas do not overlap may become the dark area in the captured image.

On the other hand, if the exposure of each of the plurality of imaging units (cameras) such as the camera unit 300 is adjusted so that the area where the lighting areas do not overlap can be captured with the resolution under the appropriate brightness, the areas where the lighting areas overlap may become the white area in the captured image.

In order to prevent such white area and dark area, the dynamic range of each image capture unit needs to be widened, and as a result, the difference in brightness in the captured image cannot be recognized with the higher resolution, and the image capturing operation cannot be performed with the resolution under the appropriate brightness.

Therefore, the imaging apparatus 100a according to the first embodiment includes, for example, a plurality of lighting-imaging units. Each of the plurality of lighting-imaging units captures an image of different area on the wall face of the tunnel 600 (an example of object) in a direction intersecting the movement direction of the vehicle 500 (an example of movable apparatus). Each of the plurality of lighting-imaging units includes, at least one light source unit and an image capture unit. The light source unit projects the projection light onto on the wall face of the tunnel 600 by overlapping at least a part of the lighting area. The image capture unit captures images of image capture area within the lighting area, and captures images of area where the lighting areas of the plurality of lighting-imaging units do not overlap on the wall face of the tunnel 600. This prevents the difference in brightness from being increased in the captured image. Hereinafter, a description is given of the details with reference to FIGS. 15A and 15B.

(Configuration of Imaging Apparatus of First Embodiment)

Figure 15A:
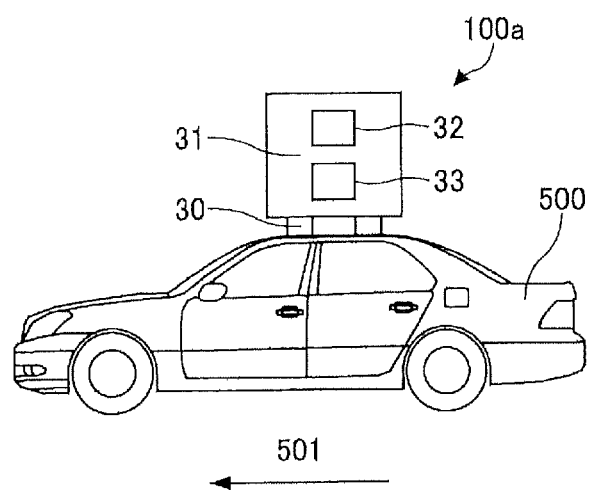
FIGS. 15A and 15B illustrate an example configuration of an imaging apparatus according to a first embodiment, where
Figure 15B:
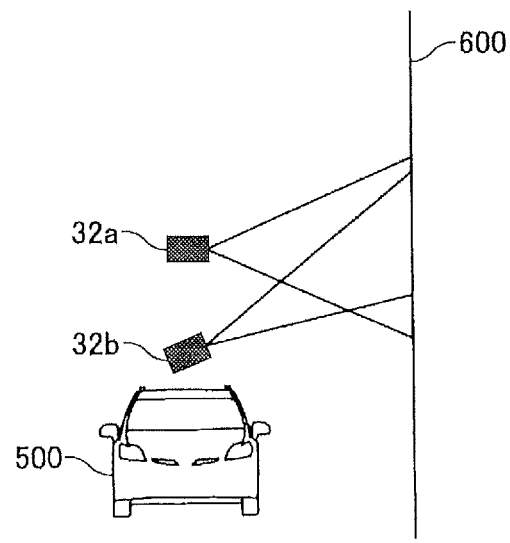

FIGS. 15A and 15B illustrate an example configuration of the imaging apparatus 100a according to the first embodiment. FIG. 15A is a diagram illustrating the vehicle 500 mounted with the imaging apparatus 100a viewed from one side of the vehicle 500. FIG. 15B is a diagram illustrating the vehicle 500 mounted with the imaging apparatus 100a viewed from the front side of the vehicle 500. FIGS. 15A and 15B illustrate one example configuration, in which lighting-imaging units 32 and 33 are disposed to capture images of an object on the left side of the movement direction of vehicle. When the vehicle 500 moves on the right side of road, the direction of the lighting-imaging units 32 and 33 can be rotated by 180 degrees to capture images of an object on the right side of the movement direction of vehicle.

As illustrated in FIG. 15A, the imaging apparatus 100a includes, for example, the lighting-imaging unit 32 and the lighting-imaging unit 33 fixed to the base plate 31. The lighting-imaging units 32 and 33 can be fixed to the frame 30 via the base plate 31. By fixing the frame 30 on the ceiling of the vehicle 500, the imaging apparatus 100a is mounted on the vehicle 500.

As illustrated in FIG. 15A, the lighting-imaging units 32 and 33, fixed to the base plate 31, are arranged along the vertical direction (the height direction based on the road surface). However, the direction in which the lighting-imaging units 32 and 33 are arranged is not limited to the vertical direction, but can be any direction intersecting a movement direction 501 of the vehicle 500. More specifically, since the cross-sectional shape of the tunnel 600 intersecting the movement direction 501 is a semicircular shape, the wall face of the tunnel 600 becomes a semicircular curved face along the direction intersecting the movement direction 501. The lighting-imaging units 32 and 33 are arranged along the circumferential direction of the semicircular shape of the tunnel 600 (the inner circumferential direction of the tunnel 600).

Further, each of the lighting-imaging units 32 and 33 is a unit combining the image capture unit and at least one light source unit. In the first embodiment, as illustrated in FIG. 15B, the lighting-imaging unit 32 includes, for example, a light source unit 32a, and an image capture unit 32b. In FIG. 15B, the lighting-imaging unit 32 (including the light source unit 32a and the image capture unit 32b) alone is illustrated, and the lighting-imaging unit 33 is omitted because the lighting-imaging unit 33 employs the same configuration of the lighting-imaging unit 32.

The light source unit 32a and the image capture unit 32b are adjusted so that the lighting area of the light source unit 32a and the image capture area of the image capture unit 32b satisfy a given relationship, and the lighting area and the image capture area are in a corresponding relationship.

Although omitted in FIG. 15B, the lighting-imaging unit 33 includes, for example, a light source unit 33a and an image capture unit 33b as similar to the lighting-imaging unit 32. The light source unit 33a and the image capture unit 33b are adjusted so that the lighting area of the light source unit 33a and the image capture area of the image capture unit 33*b* satisfy a given relationship, and the lighting area and the image capture area are in a corresponding relationship.

The positional adjustment of the lighting area and the image capture area can be performed by adjusting the projection direction of the light source unit 32*a* and the image capture direction of the image capture unit 32*b*, or by adjusting the positions of the light source unit 32*a* and the image capture unit 32*b*.

Further, it is assumed that the light source units 32*a* and 33*a* have the same structure and functions of the above described light source unit 431. Similarly, it is assumed that the image capture units 32*b* and 33*b* have the same structure and functions of the above described camera 331. This is the same in the following description in cases where the lighting unit and the image capture unit are described by changing the part number.

Figure 16A:
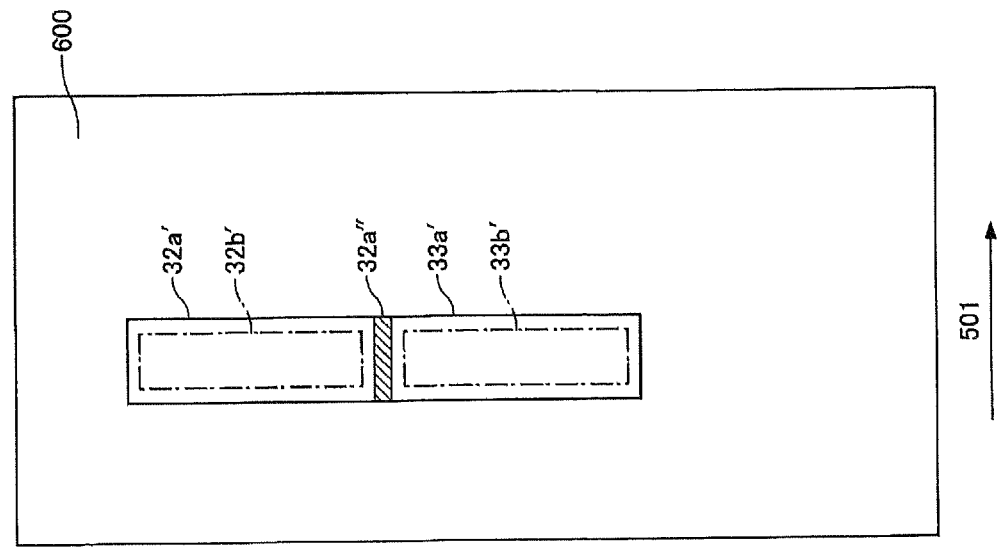
FIGS. 16A and 16B illustrate an example of a relationship between image capture areas of image capture units and lighting areas of lighting units on a wall face of tunnel according to the first embodiment, where
Figure 16B:
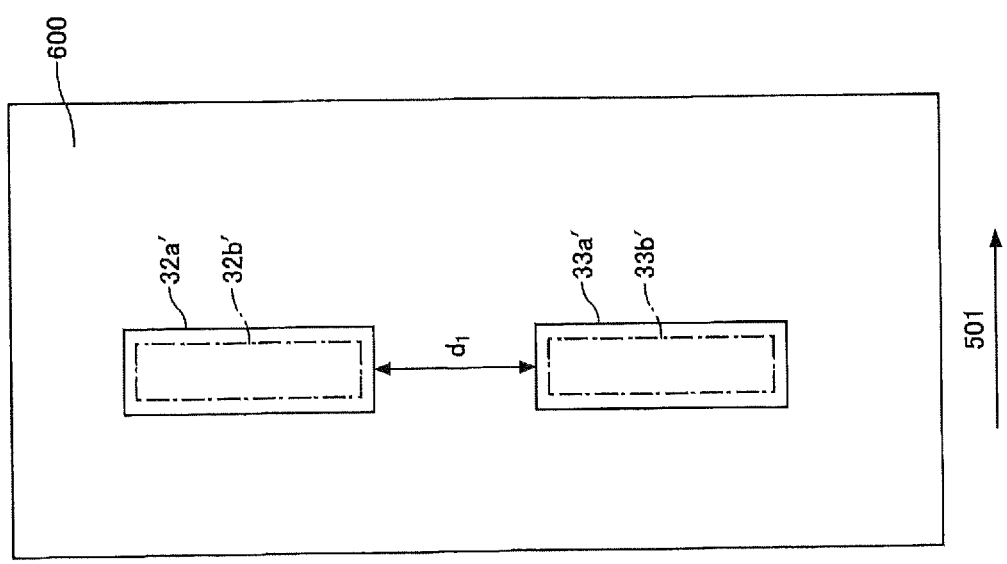

FIGS. 16A and 16B illustrate an example relationship between the image capture areas of the image capture units and the lighting areas of the lighting units on the wall face of the tunnel 600 according to the first embodiment. FIG. 16A illustrates one case when the lighting areas of the light source units do not overlap with each other. FIG. 16B illustrates another case when the lighting areas of the light source units partially overlap with each other.

As illustrated in FIGS. 16A and 16B, the light source unit 32*a* and the image capture unit 32*b* are adjusted so that the image capture area 32*b'* of the image capture unit 32*b* is included within the lighting area 32*a'* of the light source unit 32*a* on the wall face of the tunnel 600. Similarly, the light source unit 33*a* and the image capture unit 33*b* are adjusted so that the image capture area 33*b'* of the image capture unit 33*b* is included within the lighting area 33*a'* of the light source unit 33*a*.

Further, the image capture unit 32*b* is adjusted so that the image capture area 32*b'* of the image capture unit 32*b* is set in an area where the lighting area 32*a'* and the lighting area 33*a'* do not overlap with each other. Similarly, the image capture unit 33*b* is adjusted so that the image capture area 33*b'* of the image capture unit 33*b* is set in an area where the lighting area 32*a'* and the lighting area 33*a'* do not overlap with each other.

The area where the lighting area 32*a'* and the lighting area 33*a'* do not overlap with each other is a particular area other than the area where the lighting area 32*a'* and the lighting area 33*a'* overlap with each other. In the following description, the particular area where the lighting area 32*a'* and the lighting area 33*a'* do not overlap with each other is referred to as "non-overlapped lighting area." In an case of FIG. 16A, each of the lighting area 32*a'* and the lighting area 33*a'* becomes the non-overlapped lighting area, and in an case of FIG. 16B, each of the lighting area 32*a'* and the lighting area 33*a'* has the non-overlapped lighting area except an overlapped lighting area 32*a"*.

In FIG. 16A, the projection direction is adjusted so that the lighting area 32*a'* and the lighting area 33*a'* are arranged along the direction intersecting the movement direction 51 of the vehicle 500 with an interval space "$d_1$." In this case of FIG. 16A, since the lighting area 32*a'* and the lighting area 33*a'* do not overlap with each other, the adjustment operation of the image capture units 32*b* and 33*b* to arrange the image capture areas 32*b'* and 33*b'* in the non-overlapped lighting area can be performed easily.

On the other hand, in a case of FIG. 16B, the overlapped lighting area 32*a"* (hatching area) is an area where the lighting area 32*a'* and the lighting area 33*a'* partially overlap with each other. In this case too, as illustrated in FIG. 16B, by arranging the image capture areas 32*b'* and 33*b'* in the areas other than the overlapped lighting areas 32*a"*, the non-overlapped lighting area alone can be captured by using the image capture units 32*b* and 33*b*.

In respective example cases of FIGS. 16A and 16B, the area other than the overlapped lighting area 32*a"* is an example of the "non-overlapped lighting area" for the lighting area 32*a'* and the lighting area 33*a'*.

In the overlapped lighting area 32*a"*, the projection light emitted from both of the light source units 32*a* and 33*a* overlap with other and are added together, so that the projection light becomes brighter compared to the projection light in the non-overlapped lighting area. Therefore, if both of the overlapped lighting area 32*a"* and the non-overlapped lighting area are included in the image capture area of the image capture unit 32*b* or in the image capture area of the image capture unit 33*b*, the difference in brightness becomes greater as described above, and the image capturing operation cannot be performed with the resolution under the appropriate brightness.

As illustrated in FIGS. 16A and 16B, the difference in brightness within the image capture areas 32*b'* and 33*b'* can be reduced by capturing the non-overlapped lighting area alone using the image capture units 32*b* and 33*b*. Therefore, the dynamic range can be set narrower, so that the image capturing operation can be performed with the resolution under the appropriate brightness.

Hereinafter, a description is given of conditions for arranging the image capture areas 32*b'* and 33*b'* in the non-overlapped lighting area with reference to FIG. 17.

Figure 17:
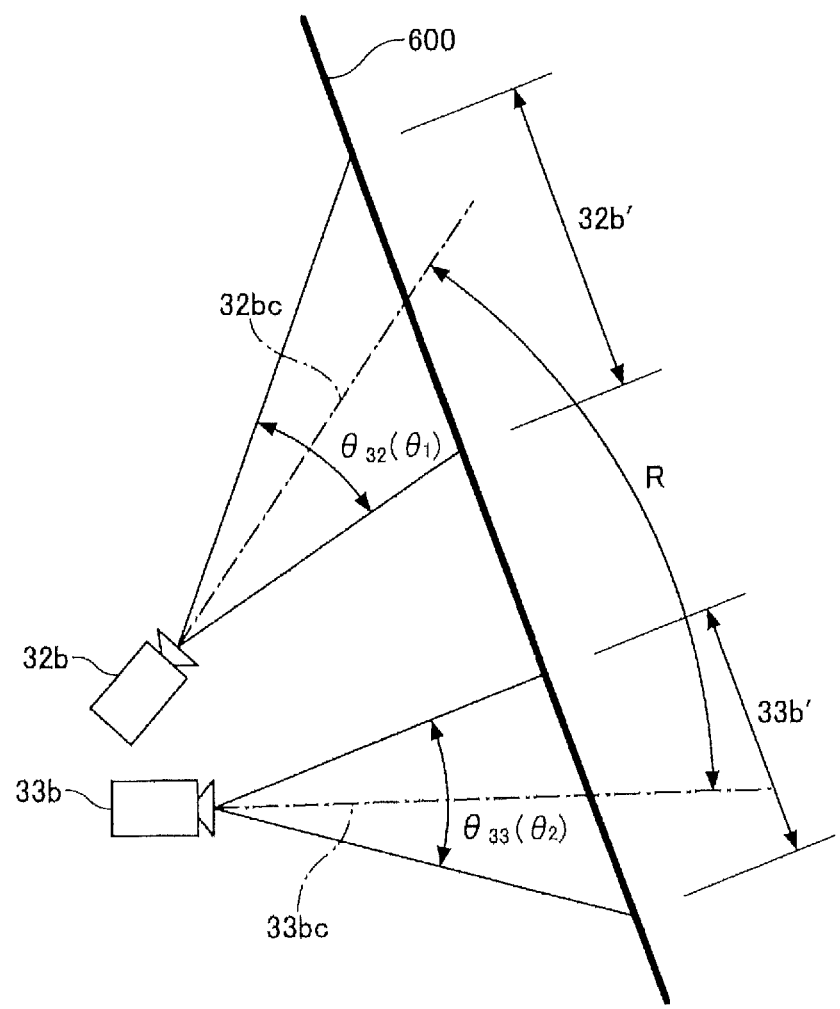
FIG. 17 is a diagram illustrating an image capture condition used for arranging image capture areas by setting a non-overlapped lighting area.

FIG. 17 is a diagram illustrating an image capture condition used for arranging the image capture areas by setting the non-overlapped lighting area. In an example case of FIG. 17, the image capture unit 32*b* captures an image capture area 32*b'* on the wall face of the tunnel 600, and the image capture unit 33*b* captures an image capture area 33*b'* on the wall face of the tunnel 600.

In an example case of FIG. 17, an optical axis 32*bc* (a single-dot chain line) represents an optical axis of an imaging optical system (e.g., lens) included in the image capture unit 32*b* of the lighting-imaging unit 32 (a first optical axis of a first imaging optical system of a first lighting-imaging unit), and an optical axis 33*bc* (a single-dot chain line) represents an optical axis of an imaging optical system (e.g., lens) included in the image capture unit 33*b* (a second optical axis of a second imaging optical system of a second lighting-imaging unit). An angle "R" is an angle formed by the optical axis 32*bc* and the optical axis 33*bc*. Further, an angle of view "$\theta_{32}(\theta_1)$" is an angle of view of the imaging optical system included in the image capture unit 32*b* (the first imaging optical system of the first lighting-imaging unit), and an angle of view "$\theta_{33}(\theta_2)$" is an angle of view of the imaging optical system included in the image capture unit 33*b* (the second imaging optical system of the second lighting-imaging unit).

In this example case of FIG. 17, the image capture directions of the image capture units 32*b* and 33*b* are adjusted to satisfy a following formula (1) in the direction intersecting the movement direction of the movable apparatus.

$$R \geq \theta_1/2 + \theta_2/2 \tag{1}$$

The lighting-imaging unit 32 is an example of "first lighting-imaging unit" having the angle of view $\theta_1$, and the lighting-imaging unit 33 is an example of "second lighting-imaging unit" being adjacent to the first lighting-imaging unit and having the angle of view $\theta_2$.

By adjusting the image capture directions of the image capture units 32b and 33b to satisfy the formula (1), a given interval space can be set between the image capture area 32b' and the image capture area 33b' on the wall face of the tunnel 600. In this state of setting the given interval space, by performing the lighting using the light source units 32a and 33a without overlapping the lighting areas in the image capture area 32b' and the image capture area 33b', as illustrated in FIG. 16A or 16 B, the image capture areas 32b' and 33b' can be arranged in the areas where the lighting area 32a' and the lighting area 33a' do not overlap with each other.

The given interval space can be set between the image capture area 32b' and the image capture area 33b' on the wall face of the tunnel 600 by arranging the image capture unit 32b and the image capture unit 33b by setting a given interval between the image capture unit 32b and the image capture unit 33b. However, if the interval between the image capture unit 32b and the image capture unit 33b increases, the size of the imaging apparatus 100a becomes larger.

By adjusting the angle of the image capture direction while satisfying the above formula (1), the image capture area 32b' and the image capture area 33b' can be arranged in the areas where the lighting area 32a' and the lighting area 33a' do not overlap with each other, without increasing the size of the imaging apparatus 100a.

Hereinafter, a description is given of the lighting condition used for arranging the image capture area in the non-overlapped lighting area with reference to FIG. 18. FIGS. 18A and 18B is a diagram illustrating a lighting condition when the image capture area is set in the non-overlapped lighting area. Hereinafter, the lighting using the light source unit 32a is described as one example (the lighting using the other light source unit can be performed similarly).

The lighting condition of the light source unit 32a preferably satisfies that the lighting area 32a' covers the image capture area 32b' of the corresponding image capture unit 32b while the lighting area 32a' does not enter the image capture area 33b' of the image capture unit 33b that is disposed adjacently to the image capture unit 32b. In other words, the lighting condition of the light source unit 32a preferably satisfies that the lighting area 32a' is set larger than the image capture area 32b' while the lighting area 32a' does not overlap with the image capture area 33b' on a target object or target structure object, such as the wall face of the tunnel 600. In FIGS. 18A and 18B, the lighting area 32a' is defined between two end points "e1" and "e2," the image capture area 32b' is defined between two end points "f1" and "f2," the lighting area 33a' is defined between two end points "g1" and "g2," and the image capture area 33b' is defined between two end points "h1" and "h2" on the target object, such as the wall face of the tunnel 600, in which the lighting area 32a' is set larger than the image capture area 32b' and the lighting area 33a' is set larger than the image capture area 33b'.

Figure 18A:
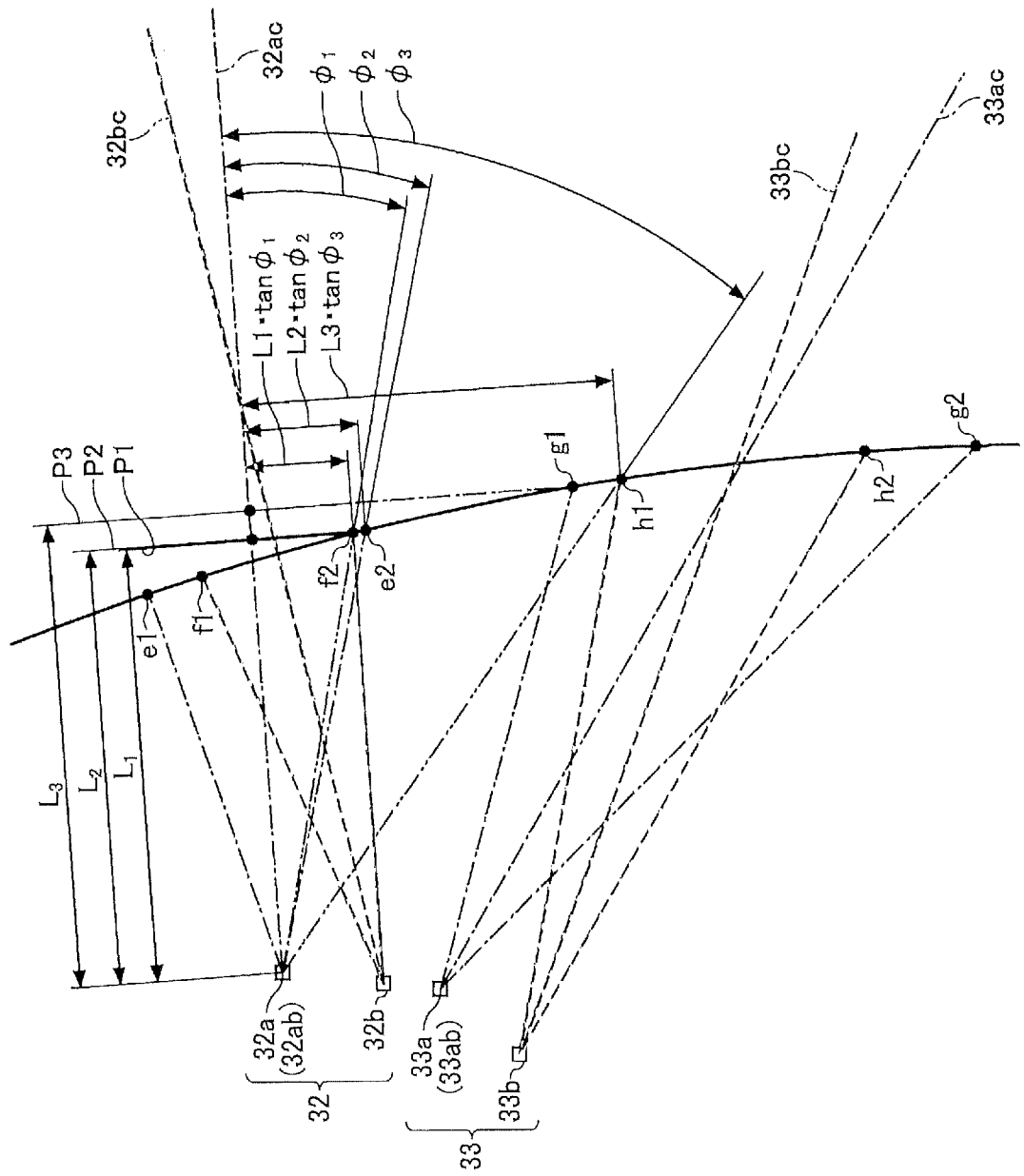
FIGS. 18A and 18B is a diagram illustrating a lighting condition when an image capture area is set in a non-overlapped lighting area.
Figure 18B:
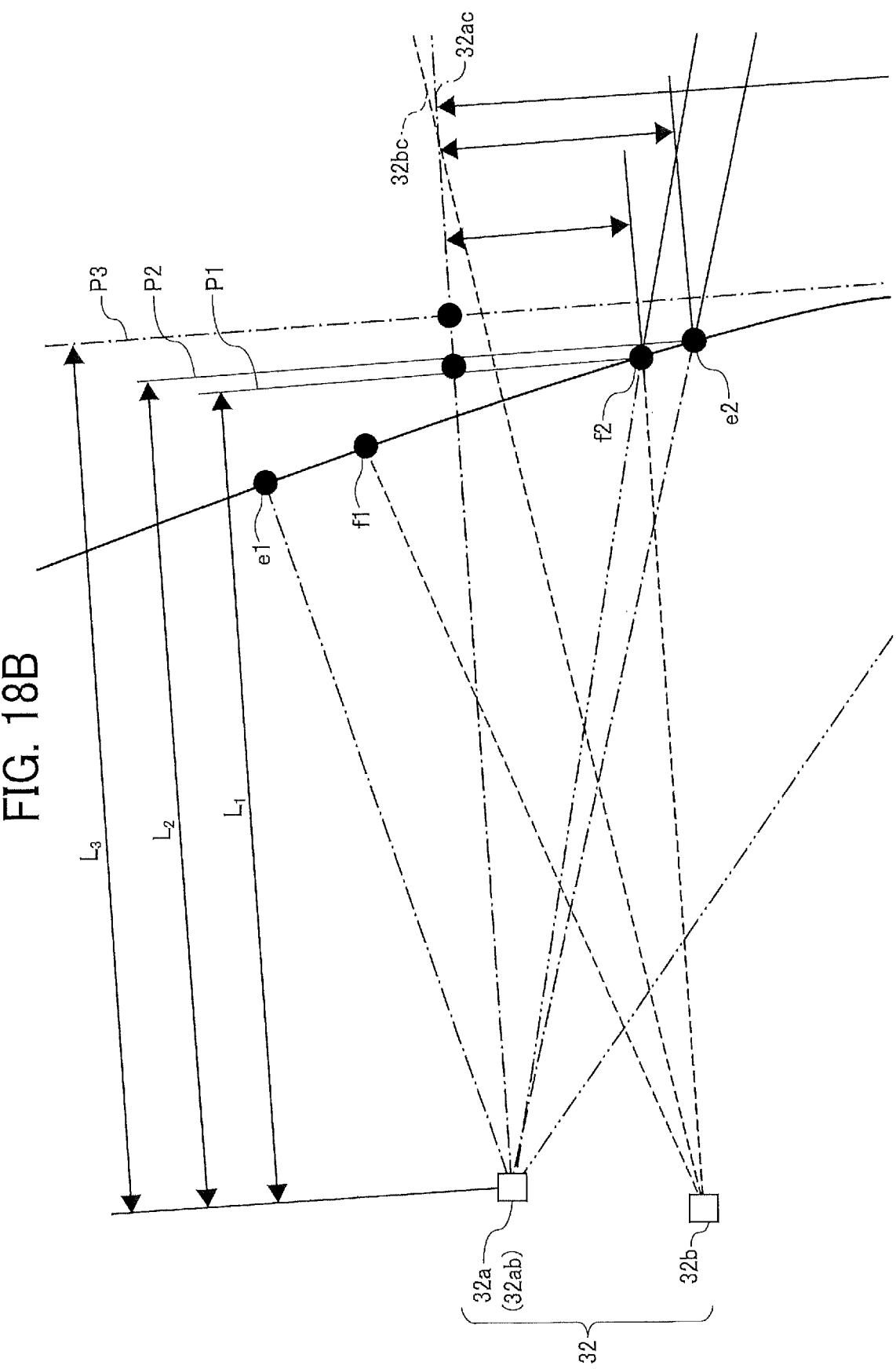

In this example case of FIGS. 18A and 18B, the projection direction of the light source unit 32a is adjusted to satisfy following formulas (2) and (3) in the direction intersecting the movement direction of the movable apparatus.

$$L1 \times \tan \varphi1 < L2 \times \tan \varphi2 < L3 \times \tan \varphi3 \quad (2)$$

$$L1 \times \tan \varphi1 < L2 \times \tan \varphi2 \quad (3)$$

As illustrated in FIG. 18A, the angle φ1 is an angle between an optical axis 32ac of a lighting optical system (e.g., lens) included in the light source unit 32a and one line connecting a lighting origin point 32ab of the lighting optical system included in the light source unit 32a and the one end point "f2" of the image capture area 32b'. The lighting origin point 32ab of the lighting optical system included in the light source unit 32a is set as an optical center (center of angle of view) of the lighting optical system.

As illustrated in FIG. 18A, the angle φ2 is a half of the angle of view of the lighting optical system included in the light source unit 32a (the angle φ2 is an angle between the optical axis 32ac of the lighting optical system included in the light source unit 32a and one line connecting the lighting origin point 32ab of the lighting optical system included in the light source unit 32a and the one end point "e2" of the lighting area 32a' of the light source unit 32a).

As illustrated in FIG. 18A, the angle φ3 is an angle between the optical axis 32ac of the lighting optical system included in the light source unit 32a and a line connecting the lighting origin point 32ab of the light source unit 32a and the one end point "h1" of the image capture area 33b' of the image capture unit 33b.

"L1" represents a distance from the lighting origin point 32ab of the light source unit 32a to a first virtual plane P1 perpendicular to the optical axis 32ac of the lighting optical system included in the light source unit 32a and including the one end point "f2" of the image capture area 32b' (see FIGS. 18A and 18 B).

"L2" represents a distance from the lighting origin point 32ab of the light source unit 32a to a second virtual plane P2 perpendicular to the optical axis 32ac of the lighting optical system included in the light source unit 32a and including the one end point "e2" of the lighting area 32a' (see FIGS. 18A and 18 B).

"L3" represents a distance from the lighting origin point 32ab of the light source unit 32a to a third virtual plane P3 perpendicular to the optical axis 32ac of the lighting optical system included in the light source unit 32a and including the one end point "g1" of the image capture area 33b' (see FIG. 18A).

The formula (2) is used for one configuration when a lighting-imaging unit exists adjacent to the lighting-imaging unit 32 and the lighting areas of the adjacent lighting-imaging unit and the lighting-imaging unit 32 do not overlap with each other.

The formula (3) is used for another configuration when a lighting-imaging unit does not exist adjacent to the lighting-imaging unit 32.

Since the lighting-imaging unit 33, adjacent to the lighting-imaging unit 32, exists at a position that the lighting areas of the lighting-imaging unit 33 and the adjacent lighting-imaging unit 32 do not overlap with each other in the imaging apparatus 100a, the formula (3) can be applied. Therefore, in the imaging apparatus 100a, by determining the projection direction of the light source unit 32a to satisfy the formula (3), the lighting area 32a' can cover the image capture area 32b' of the corresponding image capture unit 32b and does not enter the image capture area 33b' of the image capture unit 33b that is disposed adjacently to the image capture unit 32b As described above, the imaging apparatus 100a according to the first embodiment includes the lighting-imaging units 32 and 33. The lighting-imaging units 32 and 33 capture images on the different areas on the wall face of the tunnel 600 in the direction intersecting the movement direction of the vehicle 500.

The lighting-imaging unit 32 includes at least one light source unit such as the light source unit 32a that illuminates the lighting area 32a' on the wall face of the tunnel 600 and the image capture unit 32b that captures an image in the image capture area 32b' included in the lighting area 32a', in which the lighting area 32a' of the light source unit 32a does not overlap with the lighting area of another light source unit.

Further, the lighting-imaging unit 33 includes at least one light source unit such as the light source unit 33a that illuminates of the lighting area 33a' on the wall face of the tunnel 600, and the image capture unit 33b that captures an image in the image capture area 33b' included in the lighting area 33a', in which the lighting area 33a' of the light source unit 33a does not overlap with the lighting area of another light source unit.

The lighting-imaging units 32 and 33 can capture images of the non-overlapped lighting area where the lighting areas 32a' and 33a' do not overlap with each other on the wall face of the tunnel 600.

Thus, the difference in brightness within the image capture areas 32b' and 33b' can be reduced. Then, by performing the image capturing operation by setting the narrower dynamic range, the image capturing operation of the entire wall face (inner periphery face) of the tunnel 600 can be performed with the resolution under the appropriate brightness.

In the first embodiment, the two lighting-imaging units 32 and 33 are used, but the number of the lighting-imaging units is not limited thereto. For example, three of more lighting-imaging units can be arranged in the direction intersecting the movement direction 501 of the vehicle 500. With this configuration, a wider area of the wall face (inner periphery face) of the tunnel 600 can be captured by one image capturing operation. In this case, since each one of the image capture areas can be set narrower in the movement direction 501, the projection light emitted from the light source unit 32a can be concentrated in a narrower range, and thereby the light amount of projection light can be efficiently used. Accordingly, in the first embodiment, the wider area of the wall face (inner periphery face) of the tunnel 600 can be captured with the resolution under the appropriate brightness while effectively using the light amount of projection light.

In one example case of FIG. 13, the camera unit 300 and the lighting unit 400 are arranged along the movement direction of the vehicle 500. In this arrangement, the projection direction of the lighting unit 400 with respect to the image capture direction of the camera unit 300 is required to be inclined in the horizontal virtual plane (plane parallel to the ground) to project the projection light toward the image capture area of the camera unit 300 on the wall face of the tunnel 600. Therefore, if the distance from the vehicle 500 to the wall face of the tunnel 600 fluctuates due to meandering of the vehicle 500 and the uneven shape (i.e., concave and convex portions) of the wall face of the tunnel 600, the lighting position by the lighting unit 400 on the wall face of the tunnel 600 is displaced or deviated, and thereby the projection light emitted from the lighting unit 400 may not appropriately illuminate the image capture area of the camera unit 300 using the projection light.

Figure 19:
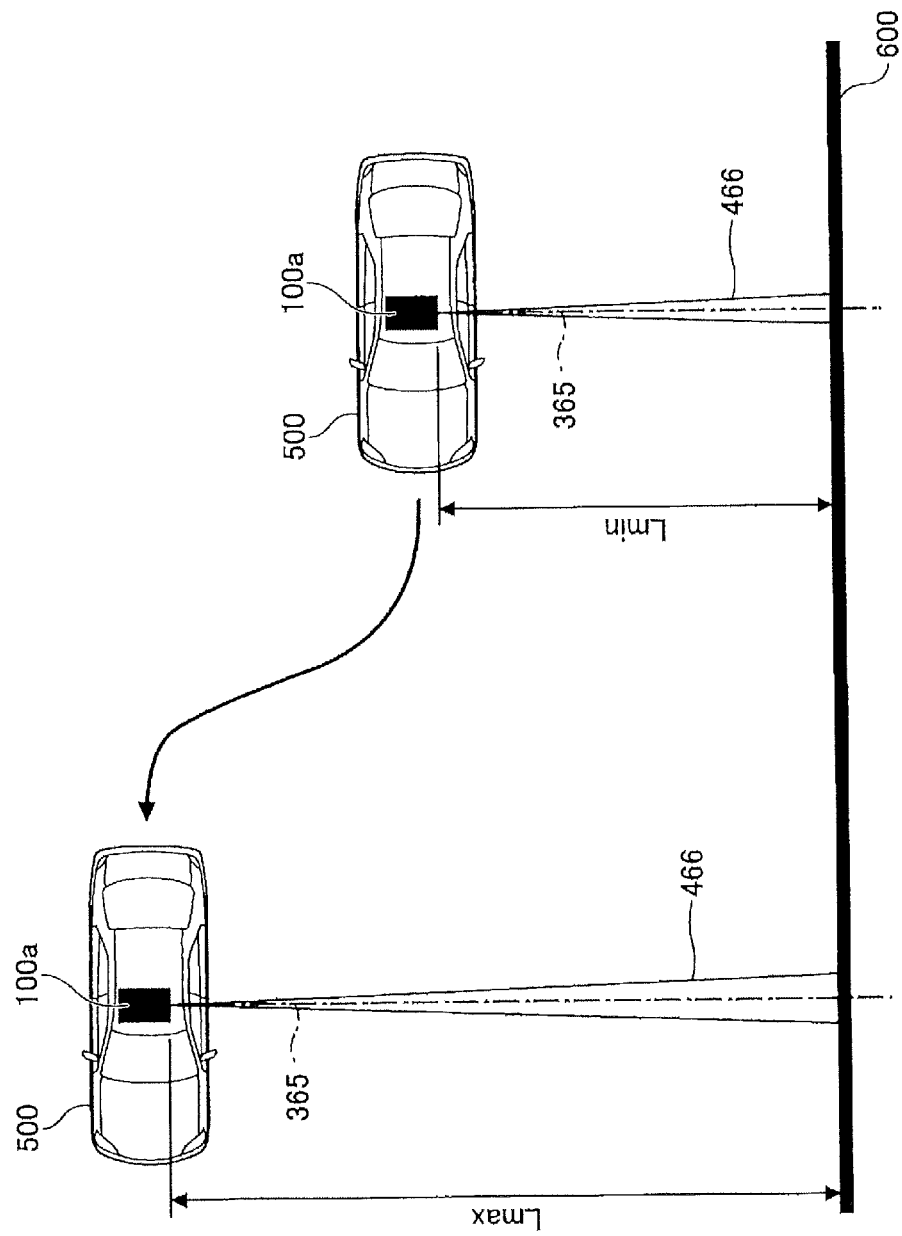
FIG. 19 illustrates an example of a relationship between an image capture area and an lighting area of an imaging apparatus according to the first embodiment.

By contrast, as described in FIG. 15B, in the first embodiment, the image capture unit 32b and the light source unit 32a are arranged in the direction intersecting the movement direction of the vehicle 500, such as the vertical direction. Thus, as illustrated in FIG. 19, the projection direction of the light source unit 32a can be set in the direction aligned to the image capture direction of the image capture unit 32b in the horizontal plane. The direction aligned to the image capture direction of the image capture unit 32b means, for example, that the projection direction and the image capture direction are set parallel. For example, the projection direction of the light source unit 32a is set parallel to the image capture direction of the image capture unit 32b in the horizontal plane in an example case of FIG. 19. FIG. 19 illustrates an example relationship between the image capture area and the lighting area of the imaging apparatus 100a according to the first embodiment, illustrated as similar to FIG. 13.

Thus, in the first embodiment, even if the distance from the vehicle 500 to the wall face of the tunnel 600 fluctuates due to the meandering of the vehicle 500 and the uneven shape of the wall face of the tunnel 600, the lighting area or position by the lighting unit 400 on the wall face of the tunnel 600 does not deviate with respect to the image capture area of the camera unit 300, with which the image capture area of the camera unit 300 can be illuminated appropriately using the projection light emitted from the lighting unit 400.

Further, the imaging apparatus 100a can be mounted on the slide unit 200 described above used as an example of the horizontal shift mechanism. With this configuration, even when the image capturing distance fluctuates due to the presence or absence of the sidewalk when capturing images of the wall face of the tunnel 600, the distance fluctuation between the imaging apparatus 100a and the wall face of the tunnel 600 can be reduced, with which the images having uniform quality can be obtained.

Further, the imaging apparatus 100a mounted on the slide unit 200 can be fixed at two positions in the horizontal direction using the index plunger 350 described above as an example of the fixing unit. With this configuration, the positions of the imaging apparatus 100a can be uniquely determined, with which the adjustment workload of the imaging apparatus 100a can be reduced, and the adjustment time of the imaging apparatus 100a can be shortened.

Modification Example of First Embodiment

Figure 20:
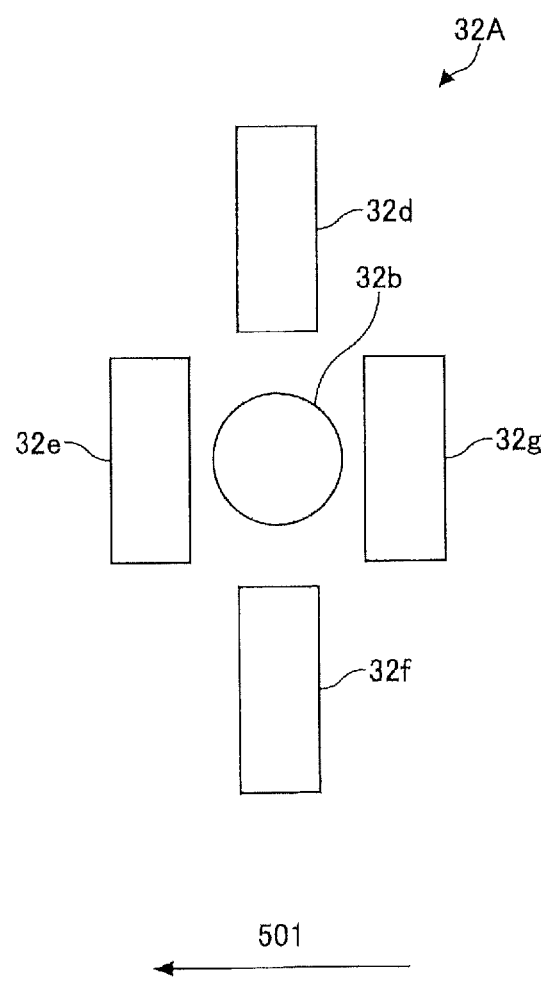
FIG. 20 illustrates an example configuration of a lighting-imaging unit according to modification example of the first embodiment.

Hereinafter, a description is given of modification example of the first embodiment with reference to FIG. 20. FIG. 20 illustrates an example configuration of a lighting-imaging unit 32A according to the modification example of the first embodiment. As illustrated in FIG. 20, the lighting-imaging unit 32A includes, for example, an image capture unit 32b and light source units 32d to 32g disposed around the image capture unit 32b.

As to the light source units 32d to 32g, the light source units 32e and 32g are disposed on each side of the image capture unit 32b in the movement direction 501 of the vehicle 500, and the light source units 32d and 32f are disposed on another each side of the image capture unit 32b in the direction intersecting the movement direction 501 (vertical direction).

The lighting areas of the light source units 32d to 32g overlap on the wall face of the tunnel 600 at substantially the same position. The image capture unit 32b captures the lighting areas of the light source units 32d to 32g overlapped at substantially the same position.

With this configuration, the difference in brightness within the image capture area of the image capture unit 32b can be reduced, and the image of the wall face of the tunnel 600 can be captured under the brighter condition because the brightness is added and increased by overlapping the four projection lights.

When a plurality of lighting-imaging units included in the imaging apparatus 100a employ the lighting-imaging unit 32A having multiple light source units, and the positional relationship between the image capture unit and the light source unit changes in each of the plurality of lighting-imaging units, a shadow portion (i.e., not illuminated by light) caused by the uneven shape on the wall face of the tunnel 600 varies for each of the lighting-imaging units, and the uneven brightness may occur in the captured image. Accordingly, it is preferable that the positional relationship between the image capture unit and the light source unit be equal to each other in each of the plurality of lighting-imaging units. With this configuration, the uneven brightness in the captured image caused by the shadow portion that occurs due to the uneven shape on the wall face of the tunnel 600, can be reduced.

In an example case of FIG. 20, the four light source units 32d to 32g are disposed around the image capture unit 32b, but is not limited thereto. For example, the light source units can be disposed on each side of the image capture unit 32b in the movement direction, or at least one side of the image capture unit 32b in the direction intersecting the movement direction.

Second Embodiment

Hereinafter, a description is given of an imaging apparatus 100b according to a second embodiment with reference to FIG. 21. The description of the same components as those of the first embodiment described above may be omitted.

Figure 21:
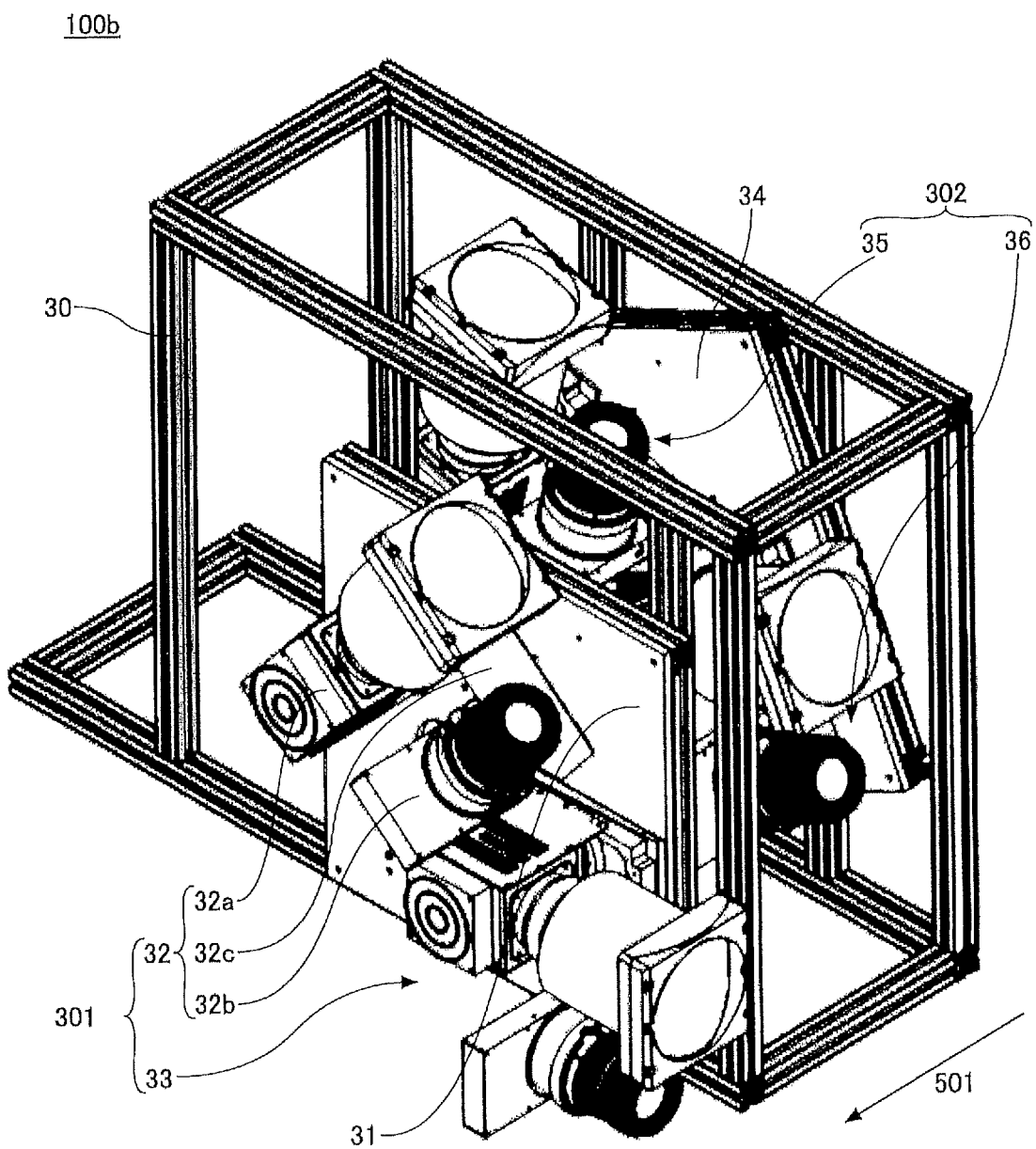
FIG. 21 is a perspective view illustrating an example of a configuration of an imaging apparatus according to a second embodiment.

FIG. 21 is a perspective view illustrating an example configuration of the imaging apparatus 100b according to the second embodiment. As illustrated in FIG. 21, the imaging apparatus 100b includes, for example, a first lighting-imaging unit group 301 including lighting-imaging units 32 and 33, and a second lighting-imaging unit group 302 including lighting-imaging units 35 and 36.

The lighting-imaging units 32 and 33 are fixed to the frame 30 via the base plate 31. Further, the lighting-imaging units 35 and 36 are fixed to the frame 30 via the base plate 34. In a state illustrated in FIG. 21, by fixing the frame 30 to the ceiling of the vehicle 500, the imaging apparatus 100b can be mounted on the vehicle 500.

Further, the lighting-imaging unit 32 includes the light source unit 32a and the image capture unit 32b. The light source unit 32a and the image capture unit 32b are arranged to set a given positional relationship, and fixed to a unit base 32c. Similarly, the light source unit 33a and the image capture unit 33b included in the lighting-imaging unit 33 are fixed to a unit base 33c, the light source unit 35a and the image capture unit 35b included in the lighting-imaging unit 35 are fixed to a unit base 35c, and the light source unit 36a and the image capture unit 36b included in the lighting-imaging unit 36 are fixed to a unit base 36c. In order to avoid the complication of drawing in FIG. 21, except the lighting-imaging unit 32, the image capture unit, light source unit, and unit base, and part numbers of the other lighting-imaging units are omitted.

Figure 22:
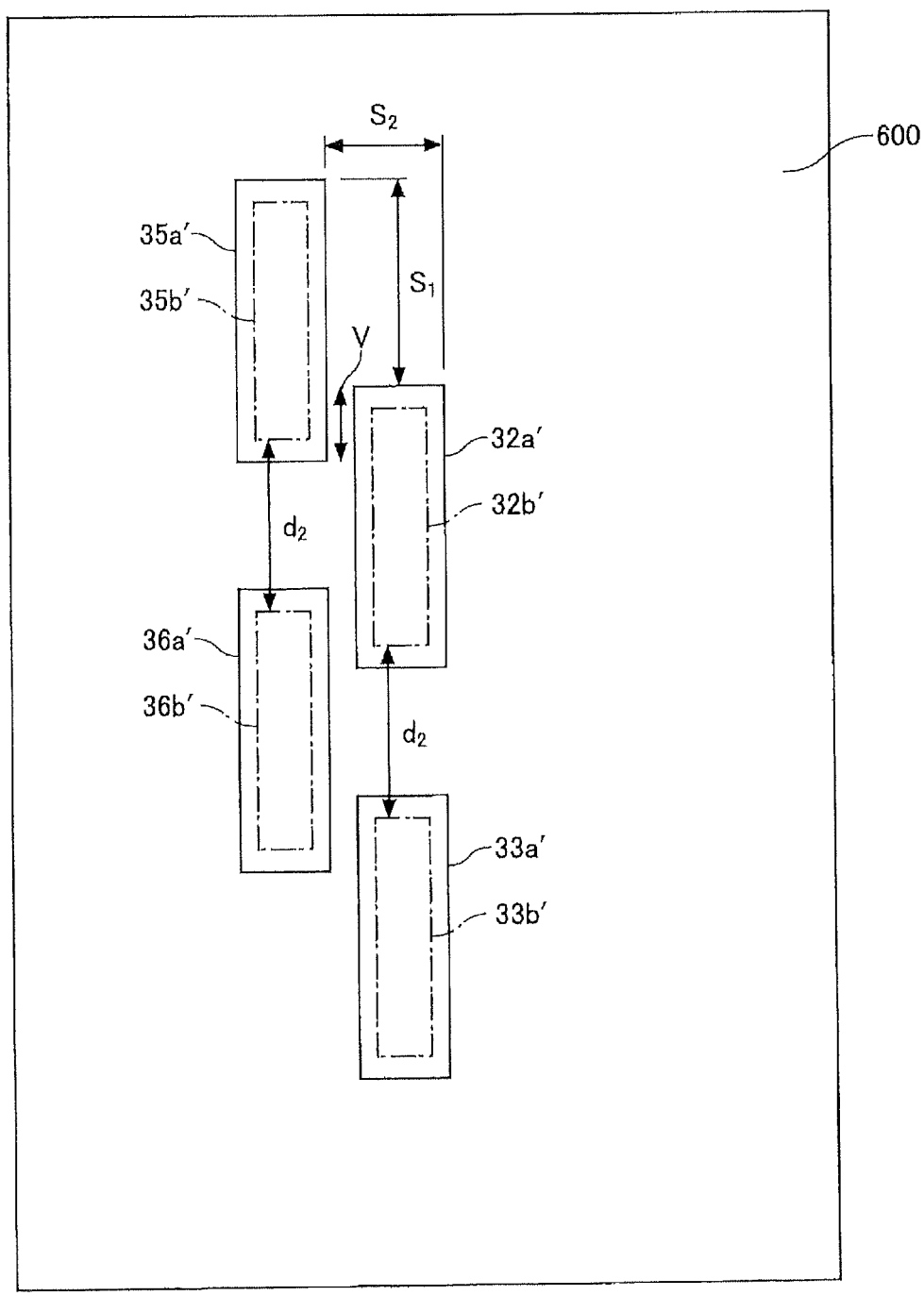
FIG. 22 illustrates an example of a relationship between lighting areas of light source units and image capture areas of image capture units on a wall face of tunnel according to the second embodiment.

FIG. 22 illustrates an example relationship between the lighting area of the lighting units and the image capture area of the image capture units on the wall face of the tunnel 600 according to the second embodiment.

As illustrated in FIG. 22, the light source unit 32a and the image capture unit 32b are adjusted so that the image capture area 32b' of the image capture unit 32b is included within the lighting area 32a' of the light source unit 32a on the wall face of the tunnel 600. Similarly, the light source unit 33a and the image capture unit 33b are adjusted so that the image capture area 33b' of the image capture unit 33b is included within the lighting area 33a' of the light source unit 33a.

These are the lighting areas and the image capture areas of the first lighting-imaging unit group 301.

Further, the light source unit 35a and the image capture unit 35b are adjusted so that the image capture area 35b' of the image capture unit 35b is included within the lighting area 35a' of the light source unit 35a. Similarly, the light source unit 36a and the image capture unit 36b are adjusted so that the image capture area 36b' of the image capture unit 36b is included within the lighting area 36a' of the light source unit 36a. These are the lighting areas and the image capture areas of the second lighting-imaging unit group 302.

As illustrated in FIG. 22, the image capture unit 32b is adjusted so that the image capture area 32b' is set in the area where the lighting area 32a' and the lighting area 33a' do not overlap with each other. Similarly, the image capture unit 33b is adjusted so that the image capture area 33b' is set in the area where the lighting area 32a' and the lighting area 33a' do not overlap with each other.

With this configuration, the lighting-imaging units 32 and 33 included in the first lighting-imaging unit group 301 can capture images in the non-overlapped lighting area where the lighting areas 32a' and 33a' do not overlap with each other on the wall face of the tunnel 600.

Further, the image capture unit 35b is adjusted so that the image capture area 35b' is set in the area where the lighting area 35a' and the lighting area 36a' do not overlap with each other. Similarly, the image capture unit 36b is adjusted so that the image capture area 36b' is set in the area where the lighting area 35a' and the lighting area 36a' do not overlap with each other.

With this configuration, the lighting-imaging units 35 and 36 included in the second lighting-imaging unit group 302 can capture images in the non-overlapped lighting area where the lighting areas 35a' and 36a' do not overlap with each other on the wall face of the tunnel 600.

If the lighting-imaging units 32 and 33 are to capture images in the non-overlapped lighting area in the above configuration, an interval space "$d_2$" is set between the image capture area 32b' and the image capture area 33b' in the direction intersecting the movement direction 501. Therefore, the image of the wall face of the tunnel 600 in the range of the interval space "$d_2$" cannot be captured by the lighting-imaging units 32 and 33, and thereby the image data in the interval space "$d_2$" is missing or lost. This image data missing also occurs to the image capture operation performed by the lighting-imaging units 35 and 36.

Therefore, the first lighting-imaging unit group 301 and the second lighting-imaging unit group 302 are adjusted so that the image capture area 35b' is shifted from the image capture area 32b' with a shift amount "$S_1$" in the direction intersecting the movement direction 501, and the image capture area 35b' overlaps with the image capture area 32b' with an overlapping amount V. In other words, the first lighting-imaging unit group 301 is adjusted so that a part of the image capture area 35b' overlaps with the image capture area 32b' by the overlapping amount V.

Similarly, the first lighting-imaging unit group 301 and the second lighting-imaging unit group 302 are adjusted so that the image capture area 36b' is shifted from the image capture area 33b' with the shift amount "$S_1$" in the direction intersecting the movement direction 501, and the image capture area 36b' overlaps with the image capture area 33b' with the overlapping amount V. In other words, the second lighting-imaging unit group 302 is adjusted so that a part of the image capture area 36b' overlaps with the image capture area 33b' by the overlapping amount V.

The shift amount of the image capture area 36b' with respect to the image capture area 33b' does not need to be the shift amount "$S_1$," but can be any shift amount. Further, the overlapping amount of the image capture area 36b' with respect to the image capture area 33b' is not limited to the overlapping amount V, but can be any overlapping amount.

With this configuration, the image data of the wall face of the tunnel 600 missing in the interval space "$d_2$" set between the image capture area 32b' and the image capture area 33b' can be interpolated by performing an image capturing operation using the image capture area 36b'. Further, the image data of the wall face of the tunnel 600 missing in the interval space "$d_2$" set between the image capture area 35b' and the image capture area 36b' can be interpolated by performing an image capturing operation using the image capture area 32b'.

Further, the shift amount "$S_1$" is determined in advance so that images of the wall face of the tunnel 600 in the interval space "$d_2$" can be captured using the image capture area 36b'.

When the imaging apparatus 100b captures the images of the wall face of the tunnel 600 while moving the vehicle 500, the image capturing operation is continuously performed using the image capture units 32b, 33b, 35b and 36b at a given pre-set sampling cycle and then the captured image data are stored in the HDD 114 (FIG. 4). Therefore, the process of interpolating the missing portion of image data captured by the image capture units 32b and 33b can be performed by performing the image processing to the stored image data such as the image data captured by the image capture units 35b and 36b.

Further, if the lighting areas 35a' and 36a' are respectively disposed at the same positions of the lighting areas 32a' and 33a' in the movement direction 501, the lighting areas 32a' and 33a' overlap with the lighting areas 35a' and 36a'. Therefore, in the second embodiment, the lighting areas 35a' and 36a' are respectively shifted from the lighting areas 32a' and 33a' with a shift amount "$S_2$" in the movement direction 501 as illustrated in FIG. 22. Then, the image capture units 35b and 36b capture images in the lighting areas 35a' and 36a' shifted with the shift amount "$S_2$" with respect to the lighting areas 32a' and 33a'. With this configuration, the overlapping of the lighting areas 32a' and 33a' with the lighting areas 35a' and 36a' can be prevented, and the lighting-imaging units 35 and 36 can capture images in the non-overlapped lighting area.

As described above, the second embodiment includes the first lighting-imaging unit group 301 and the second lighting-imaging unit group 302. The first lighting-imaging unit group 301 includes the lighting-imaging units 32 and 33, each captures images of different areas on the wall face of the tunnel 600 in the direction intersecting the movement direction 501. The second lighting-imaging unit group 302 includes the lighting-imaging unit 35 and 36, each captures images of different areas on the wall face of the tunnel 600 in the direction intersecting the movement direction 501.

Further, the lighting-imaging units 35 and 36 are shifted from the lighting-imaging units 32 and 33 with respect to the image capture areas on the wall face of the tunnel 600 in the direction intersecting the movement direction 501 while the image capture areas of the lighting-imaging units 35 and 36 partially overlap with the image capture areas of the lighting-imaging units 32 and 33 on the wall face of the tunnel 600, and the images of the image capture areas are captured using the lighting-imaging units 32 and 33 and the lighting-imaging units 35 and 36, respectively.

With this configuration, even if the non-overlapped lighting area that cannot be captured using the lighting-imaging units 32 and 33 exists, the image data of the non-overlapped lighting area can be captured by the lighting-imaging units 35 and 36 and used for interpolating the image data captured by the lighting-imaging units 32 and 33. Therefore, the image data of the entire wall face (inner periphery face) of the tunnel 600 can be captured without missing the image data of the tunnel 600.

FIG. 21 illustrates one example in which the second lighting-imaging unit group 302 displaced or shifted from the first lighting-imaging unit group 301 in the movement direction 501, but is not limited thereto. If the image capture area of the second lighting-imaging unit group 302 can be shifted from the image capture area of the first lighting-imaging unit group 301 in the movement direction 501 as above described, the position disposing the second lighting-imaging unit group 302 may not be shifted from the position disposing the first lighting-imaging unit group 301 in the movement direction 501.

Further, the effects other than those described above are the same as those described in the first embodiment.

Modification Example of Second Embodiment

Hereinafter, a description is given of an imaging apparatus 100c of modification example of the second embodiment with reference to FIGS. 23A and 23B. In the imaging apparatus 100c, the first lighting-imaging unit group 301 and the second lighting-imaging unit group 302 can be rotated together about an axis 101a along the vertical direction as an inversion axis to different positions.

Figure 23A:
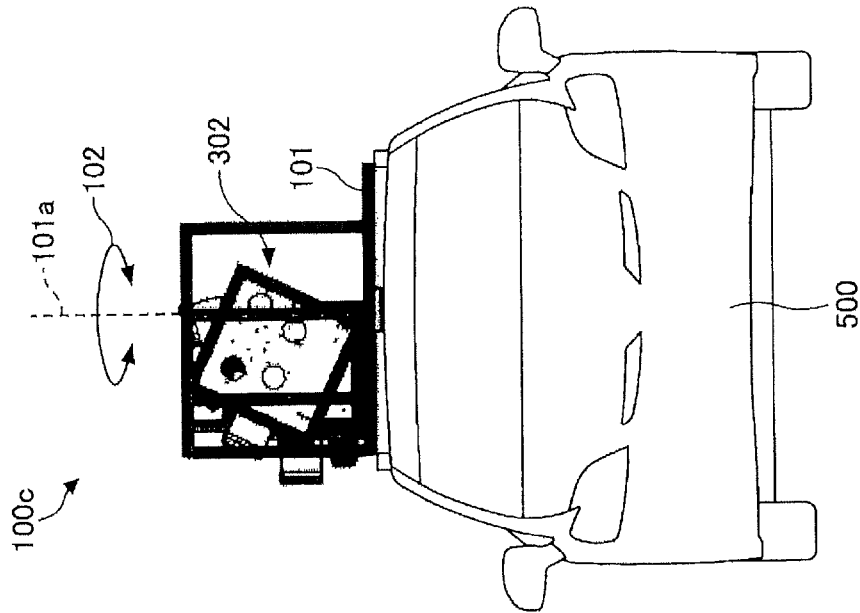
FIGS. 23A and 23B illustrate an example configuration of an imaging apparatus of modification example of the second embodiment, where
Figure 23B:
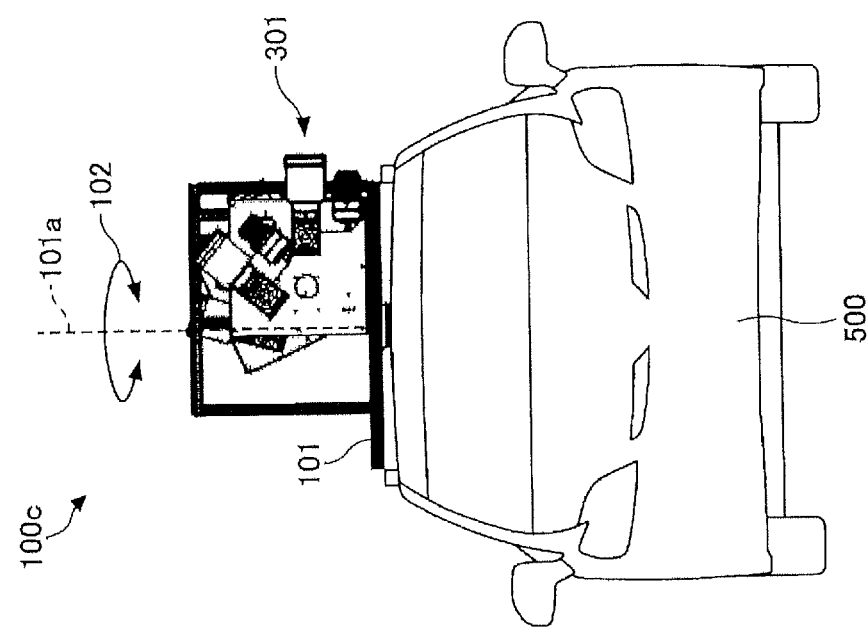

FIGS. 23A and 23B illustrate an example configuration of the imaging apparatus 100c of the modification example of the second embodiment. FIG. 23A illustrates an example configuration of the imaging apparatus 100c before the inversion. FIG. 23B illustrates an example configuration of the imaging apparatus 100c after the inversion. In FIGS. 23A and 23B, the vehicle 500 is viewed from the front side.

As illustrated in FIGS. 23A and 23B, the imaging apparatus 100c includes, for example, a turntable 101 that is rotatable in a direction indicated by an arrow 102 about the axis 101a that extends along the vertical direction used as the inversion axis, in which the turntable 101 is integrated with the first lighting-imaging unit group 301 and the second lighting-imaging unit group 302 together. The turntable 101 is an example of "vertical direction axis inversion mechanism." Further, the "inversion" means a rotation of about 180 degrees about the inversion axis In FIG. 23A, the first lighting-imaging unit group 301 and the second lighting-imaging unit group 302 included in the imaging apparatus 100c can capture images of the left-side direction of the vehicle 500.

On the other hand, FIG. 23B is a state that is inverted from the state of FIG. 23A. In the state of FIG. 23B, the first lighting-imaging unit group 301 and the second lighting-imaging unit group 302 can capture images of the right-side direction of the vehicle 500.

In the image capturing operation of the wall face of the tunnel 600, the imaging apparatus 100c firstly captures images of the left half of the wall face (inner periphery face) of the tunnel 600 while moving the vehicle 500 in the state illustrated in FIG. 23A. Then, the captured image data is stored in the HDD 114. When the vehicle 500 reaches the exit of the tunnel 600, the image capturing operation of the wall face of the tunnel 600 from the entrance to the exit is completed, and then the vehicle 500 is moved to the entrance of the tunnel 600 again, such as the exit side where the vehicle 500 has reached.

Then, the turntable 101 is inverted about the axis 101a to set the state illustrated in FIG. 23B. Thereafter, the imaging apparatus 100c captures images of the right half of the wall face (inner periphery face) of the tunnel 600 while moving the vehicle 500 in the state illustrated in FIG. 23B. Then, the captured image data is stored in the HDD 114. When the vehicle 500 reaches the exit of the tunnel 600, the image capturing operation of the wall face of the tunnel 600 from the entrance to the exit is completed.

Then, the image data of the entire wall face (inner periphery face) of the tunnel 600 can be acquired by combining or stitching the image data of the right half of the wall face (inner periphery face) of the tunnel 600 and the image data of the left half of the wall face (inner periphery face) of the tunnel 600 stored in the HDD 114.

As described above, there may be a case where the image data of the right half of the wall face (inner periphery face) of the tunnel 600 and the image data of the left half of the wall face (inner periphery face) of the tunnel 600 are captured by moving the vehicle 500 in the tunnel 600 for two times. In the modification example of the second embodiment, the image capture direction of the imaging apparatus 100c can be changed easily using the turntable 101.

In the above described example of FIGS. 23A and 23B, the imaging apparatus is rotated about the axis of the vertical direction, but an axis extending along the movement direction of the vehicle 500 can be used as the inversion axis.

Figure 24A:
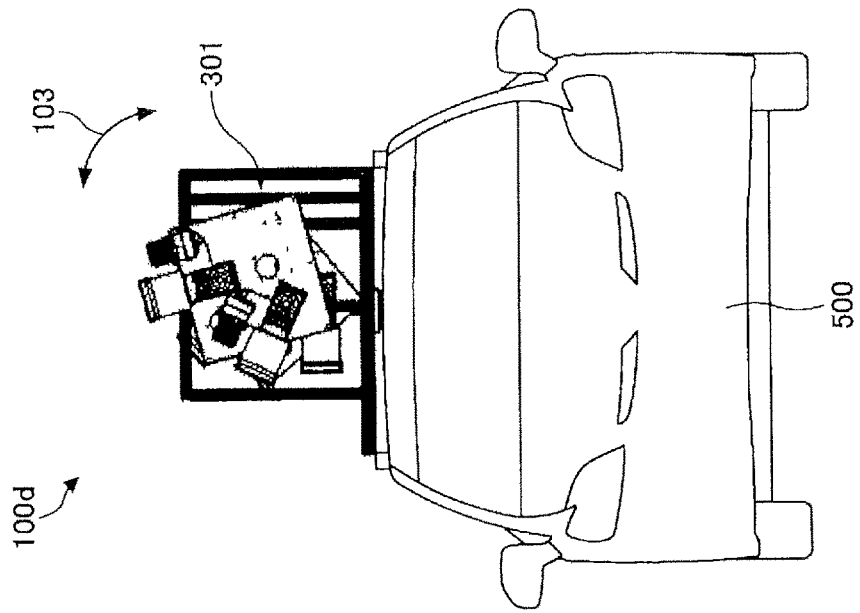
FIGS. 24A and 24B illustrate an example configuration of an imaging apparatus of modification example of the second embodiment, where
Figure 24B:
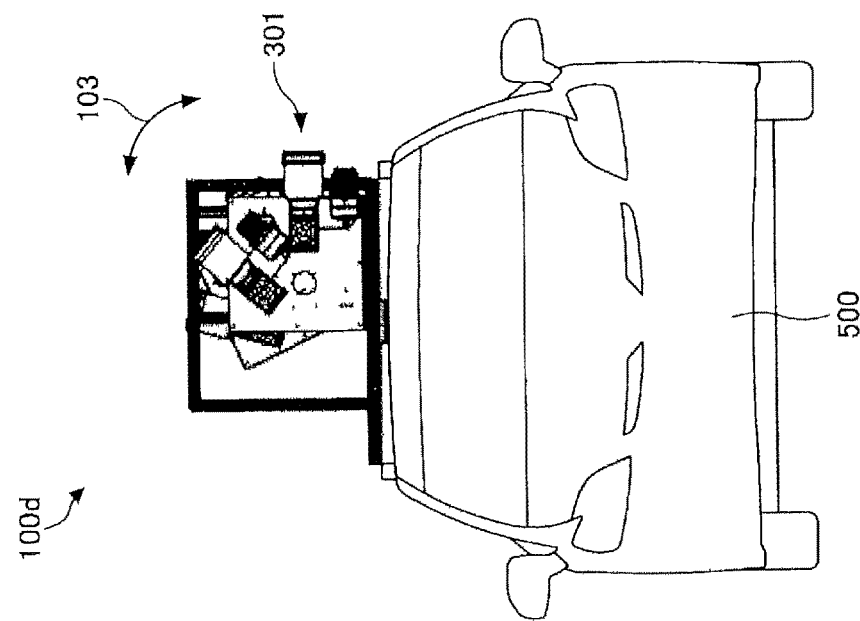

FIGS. 24A and 24B illustrate an example configuration of an imaging apparatus 100d of modification example of the second embodiment. FIG. 24A illustrates an example configuration of the imaging apparatus 100d before the inversion. FIG. 24B illustrates an example configuration of the imaging apparatus 100d after the inversion. In FIGS. 24A and 24B, the vehicle 500 is viewed from the front side as similar to FIGS. 23A and 23B.

As illustrated in FIGS. 24A and 24B, the imaging apparatus 100d includes, for example, a turntable that is rotatable in a direction indicated by an arrow 103 about an axis that extends along the movement direction of vehicle 500, in which the turntable is integrated with the first lighting-imaging unit group 301 and the second lighting-imaging unit group 302 together. This turntable is an example of "movement-direction axis inversion mechanism."

In FIG. 24A, the first lighting-imaging unit group 301 and the second lighting-imaging unit group 302 included in the imaging apparatus 100c can capture images of the left-side direction of the vehicle 500. On the other hand, FIG. 24B is a state inverted from the state of FIG. 24A. In the state of FIG. 24B, the first lighting-imaging unit group 301 and the second lighting-imaging unit group 302 can capture images of the right-side direction of the vehicle 500.

Since the operation and effect of the imaging apparatus 100d are the same as those described with reference to FIGS. 23A and 23B, the description thereof will be omitted.

Third Embodiment

Hereinafter, a description is given of an imaging apparatus 100e according to a third embodiment with reference to FIGS. 25 to 28.

In the above described second embodiment, when the non-overlapped lighting area exists between the lighting-imaging units 32 and 33, the area that cannot be captured by the lighting-imaging units 32 and 33 can be interpolated using the image data captured by the lighting-imaging units 35 and 36.

On the other hand, the imaging apparatus 100e according to the third embodiment includes a position changing unit that can change the image capture area on the wall face of the tunnel 600 to be captured by each of a plurality of lighting-imaging units in the direction intersecting the movement direction of vehicle 500. By changing the image capture area at least two times in the direction intersecting the movement direction of the vehicle 500, the image data of the non-overlapped lighting area can be interpolated without providing the second lighting-imaging unit group 302.

Figure 25:
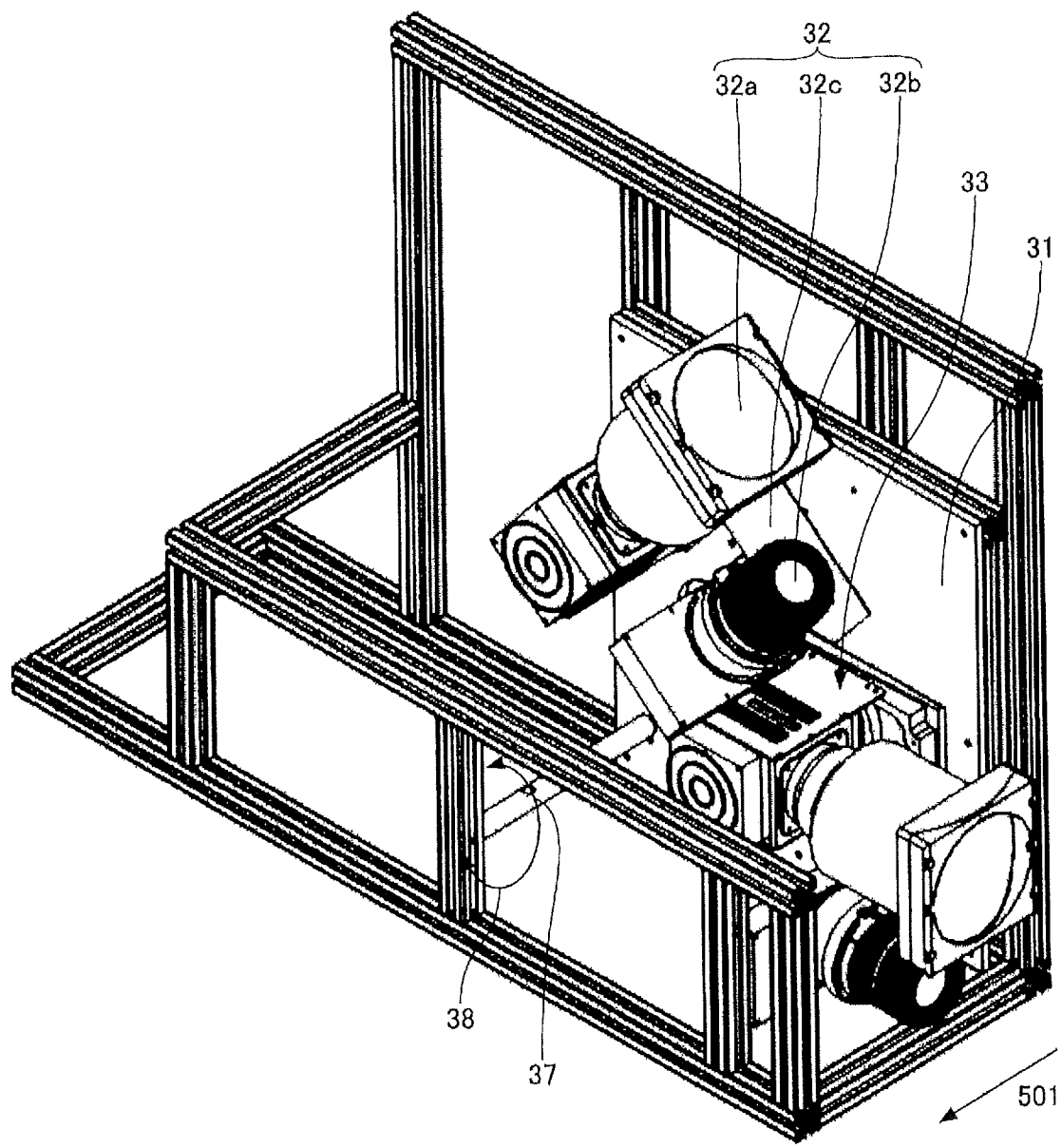
FIG. 25 is a perspective view of an example configuration of an imaging apparatus according to a third embodiment.

FIG. 25 is a perspective view of an example configuration of the imaging apparatus 100e according to the third embodiment. As illustrated in FIG. 25, the imaging apparatus 100e includes a rotation mechanism 37, which is an example of the position changing unit. The rotation mechanism 37 can rotate the base plate 31 fixing the lighting-imaging units 32 and 33 about an axis extending along the movement direction 501 of the vehicle 500, and maintain the base plate 31 at given positions. By rotating the rotation mechanism 37 in a direction indicated by an arrow 38, the projection direction and the image capture direction of the lighting-imaging units 32 and 33 can be changed in the direction intersecting the movement direction 501. The rotation by the rotation mechanism 37 may be performed by using a rotation motor, or may be rotated manually by a user. Further, a known locking mechanism is applicable for fixing the base plate 31 after the rotation.

Figure 26:
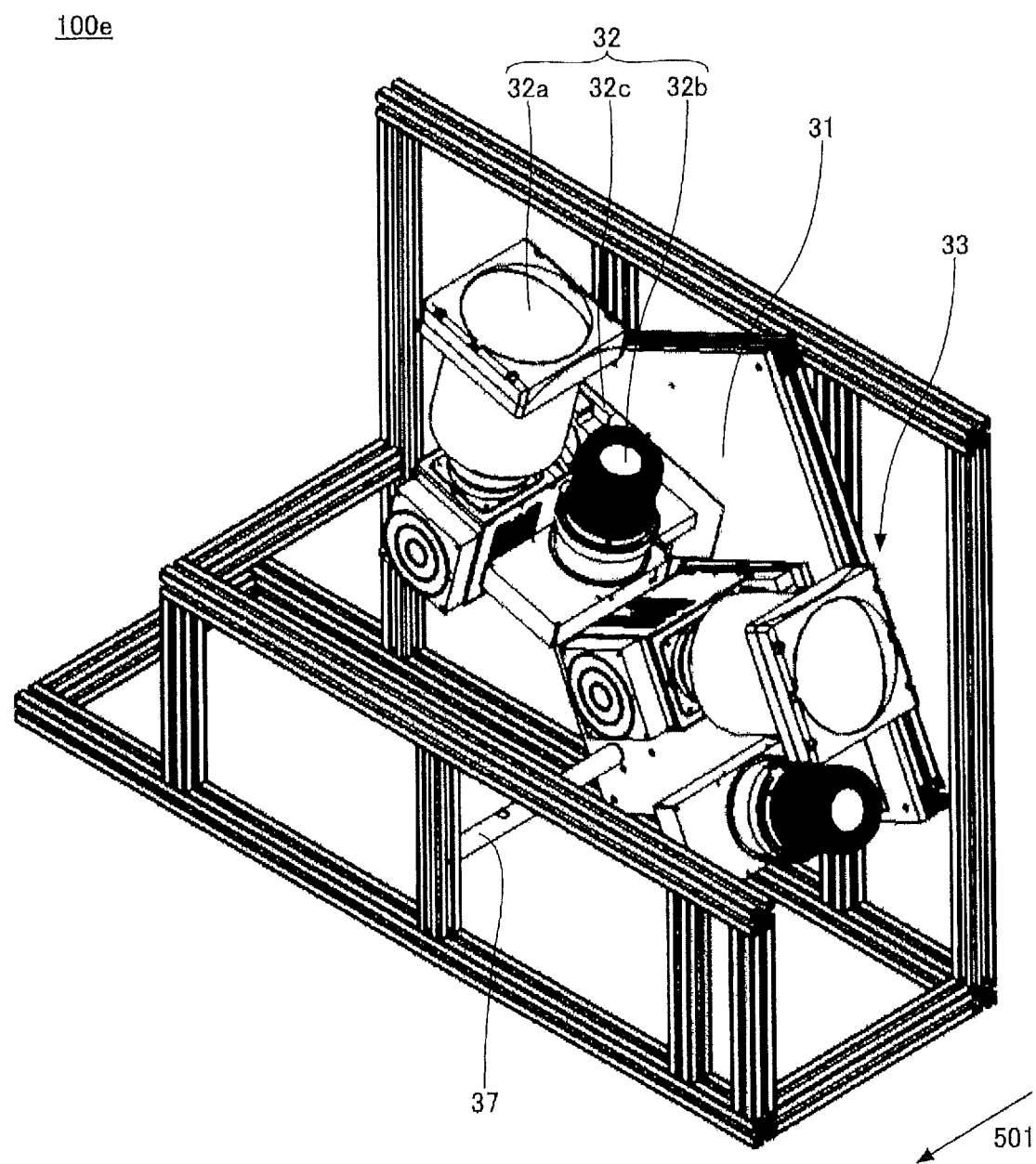
FIG. 26 illustrates an example configuration of the imaging apparatus after the rotation by a rotation mechanism by a given angle from a state illustrated in FIG. 25.

FIG. 26 illustrates an example configuration of the imaging apparatus 100e after the rotation by the rotation mechanism 37 by a given angle from the state illustrated in FIG. 25.

The rotation angle by the rotation mechanism 37 is preferably an angle satisfying a following formula (4).

$$R-(\theta_1+\theta_2)/2 < \Delta R < \theta_1/2 \qquad (4)$$

In the formula (4), $\Delta R$ represents a changed angle amount when the image capture direction of the lighting-imaging unit 33 is changed toward the lighting-imaging unit 32 adjacent to the lighting-imaging unit 33.

By rotating the rotation mechanism 37 while satisfying the condition of formula (4), even if the non-overlapped lighting area exists between the lighting-imaging units 32 and 33 before the rotation, the area that cannot be captured by the lighting-imaging units 32 and 33 before the rotation can be interpolated using the image data captured by the image capture units 32 and 33 after the rotation.

Figure 27:
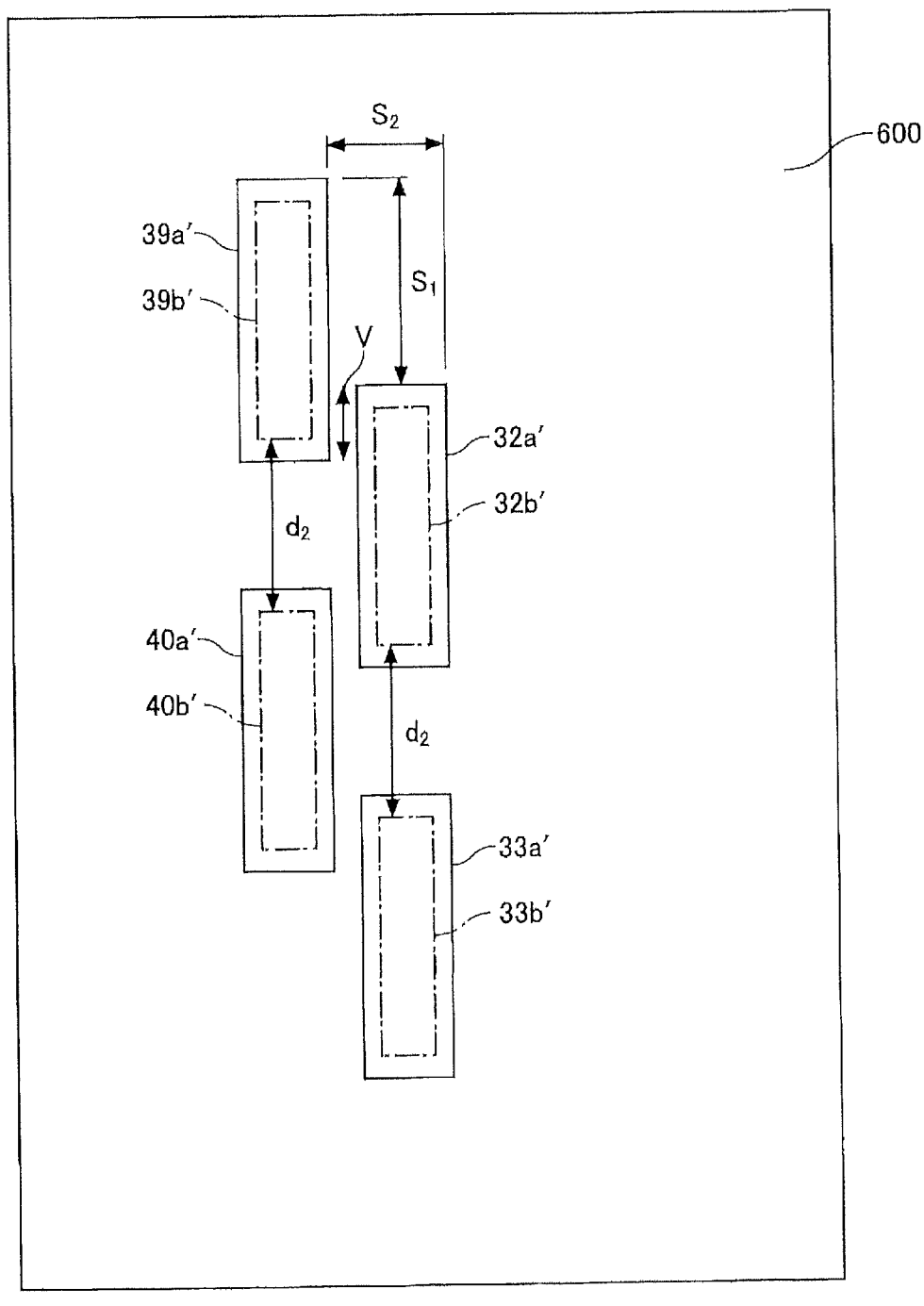
FIG. 27 illustrates an example relationship between lighting areas of lighting units and image capture areas of image capture units on a wall face of tunnel according to the third embodiment.

FIG. 27 illustrates an example relationship between the lighting areas of the lighting units and the image capture areas of the image capture units on the wall face of the tunnel 600 according to the third embodiment. The lighting areas 32a' and 33a' and the image capture areas 32b' and 33b' are in a state before rotating the imaging apparatus 100e (FIG. 25), that is the imaging apparatus 100e is at a position before the rotation by the rotation mechanism 37. On the other hand, the lighting areas 39a' and 40a' and the image capture area 39b' and 40b' are in a state after rotating the imaging apparatus 100e (FIG. 26), that is the imaging apparatus 100e is at a position after the rotation by the rotation mechanism 37.

Figure 28:
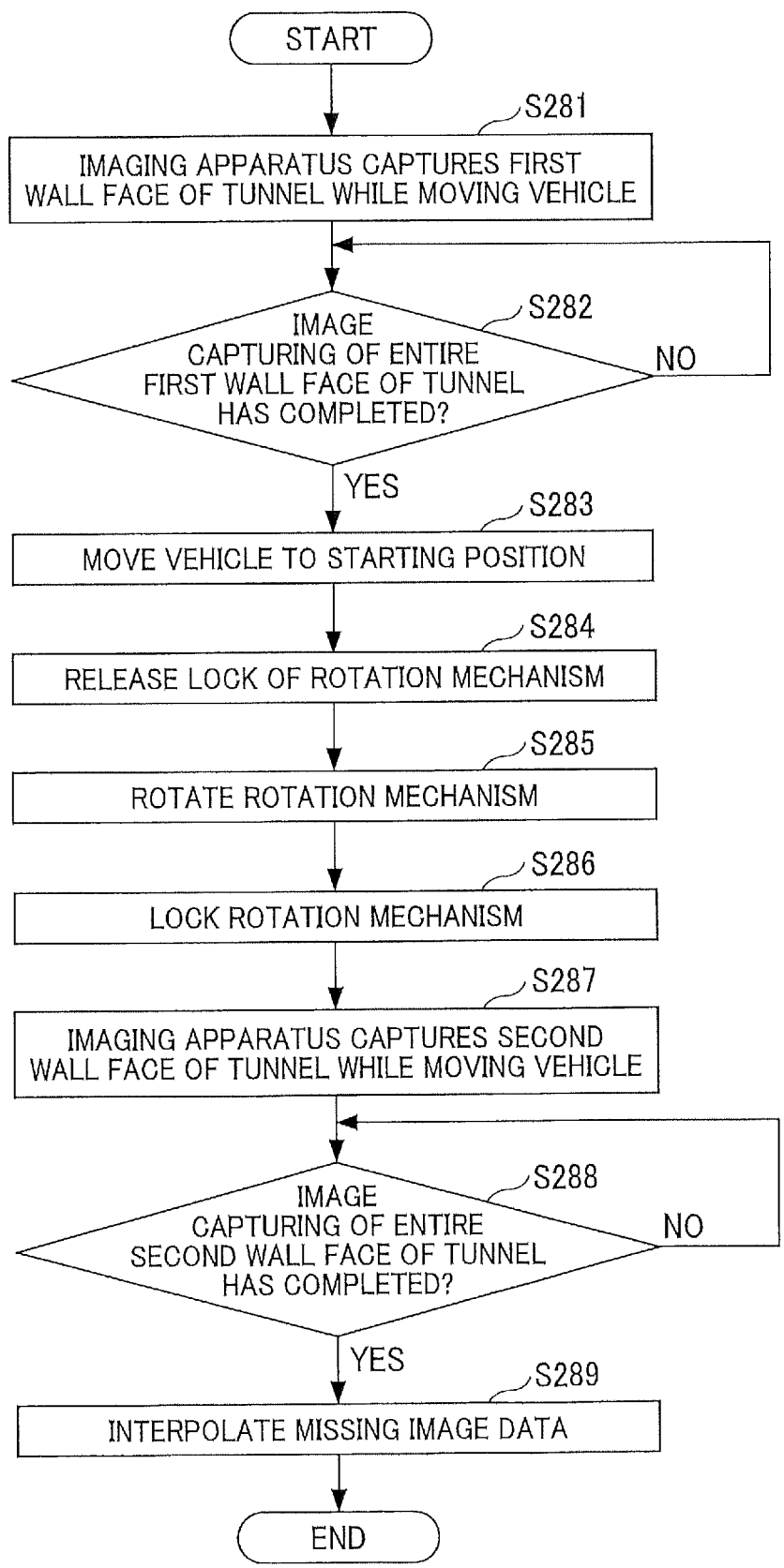
FIG. 28 is an example flowchart of image capture operation performable by the imaging apparatus according to the third embodiment.

FIG. 28 is an example flowchart of image capture operation performable by the imaging apparatus 100e according to the third embodiment.

At first, in step S281, the imaging apparatus 100e captures a first wall face (first area) of the tunnel 600 while moving the vehicle 500 from the entrance of the tunnel 600 set as a starting position of the vehicle 500. The imaging apparatus 100e stores the captured image data in, for example, the HDD 114.

Then, in step S282, a user of the vehicle 500 determines whether or not the vehicle 500 reaches the exit of the tunnel 600, and determines whether or not the image capturing operation of the entire first wall face of the tunnel 600 in the movement direction of the vehicle 500 has completed.

If it is determined in step S282 that the image capturing operation has been completed (step S282: Yes), the sequence proceeds to step S283. On the other hand, if it is determined in step S282 that the image capturing operation has not been completed (step S282: No), the operation in step S282 is performed until the image capturing operation is determined to be completed.

Then, in step S283, the user moves the vehicle 500 to the entrance of the tunnel 600 used as the starting position.

Then, in step S284, when the vehicle 500 reaches the entrance of the tunnel 600, the vehicle 500 is stopped, and the user releases a lock of the rotation mechanism 37 of the imaging apparatus 100e.

Then, in step S285, the user rotates the rotation mechanism 37 for a given angle.

Then, in step S286, the user locks the rotation mechanism 37 after rotating the rotation mechanism 37 for the given angle.

Then, in step S287, the imaging apparatus 100e captures a second wall face (second area) of the tunnel 600 while moving the vehicle 500 from the entrance of the tunnel 600 set as the starting position of the vehicle 500. Then, the imaging apparatus 100e stores the captured image data in, for example, the HDD 114.

Then, in step S288, the user of the vehicle 500 determines whether or not the vehicle 500 reaches the exit of the tunnel 600, and determines whether or not the image capturing operation of the entire second wall face of the tunnel 600 in the movement direction of the vehicle 500 has completed.

If it is determined in step S288 that the image capturing operation has been completed (step S288: Yes), the sequence proceeds to step S289. On the other hand, if it is determined in step S288 that the image capturing operation has not been completed (step S288: No), the operation in step S288 is performed until the image capturing operation is determined to be completed.

Then, in step S289, the imaging apparatus 100e reads out the image data stored in the HDD 114, and interpolates the missing image data of the non-overlapped lighting area, which might occur when the lighting-imaging units 32 and 33 has performed the image capturing operation.

With this configuration, the imaging apparatus 100e can perform the image capturing operation to obtain or acquire the image data of the entire wall face (inner periphery face) of the tunnel 600.

As described above, the third embodiment includes the rotation mechanism 37, with which the lighting area and the image capture area similar to that of FIG. 22 can be implemented by the rotation operation using the rotation mechanism 37, and the same effect as that of the second embodiment can be attained.

In the third embodiment, the lighting-imaging units 32 and 33 are rotated together using the rotation mechanism 37, but the lighting-imaging unit 32 and the lighting-imaging unit 33 can be rotated independently.

The effects other than those described above are the same as those described in the first embodiment.

As to the above described embodiments, images of an object can be captured with an appropriate brightness and appropriate resolution in the direction intersecting the movement direction of the moveable apparatus.

Although the embodiments of the embodiments of the present invention have been described above, the present invention is not limited to such a particular embodiment, and within the scope of the invention described in the claims, various modification examples and modification examples may be made.

Specifically, the vehicle mounted with the camera can be two-wheeled vehicles, four-wheeled vehicles, such as automobiles, construction vehicles, agriculture vehicles, industrial vehicles, railway cars, special vehicles, and flight vehicles, such as drones. These are collectively referred to as the movable apparatus.

In the above embodiments, the tunnel is described as an example of the structure, but the structure includes, for example, a pipe used for transporting gas, liquid, powder and particulate matter. Further, the structure also includes, for example, elevator shaft, such as a reinforced concrete structure having a vertical hole where an elevator moves through.

Further, the above embodiments may also include an image capturing method. For example, the method of capturing an image of an object using an imaging apparatus mountable on a moveable apparatus includes capturing an image of a different area on the object in a direction intersecting with a movement direction of the moveable apparatus using each of a plurality of lighting-imaging units, illuminating a partial area on the object as a lighting area using a light source unit disposed in each of the plurality of lighting-imaging units, capturing an image of an image capture area set within the lighting area using an image capture unit, and capturing an image of a non-overlapped lighting area where the lighting areas of the plurality of lighting-imaging units do not overlap with each other. With this image capturing method, the same effects as those of the above-described imaging apparatus can be attained.

Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

Each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

What is claimed is:
1. An imaging apparatus mountable on a moveable apparatus, comprising:
  a plurality of lighting-imaging units, each configured to capture an image of a different area on an object in a direction intersecting with a movement direction of the moveable apparatus;

wherein each of the plurality of lighting-imaging units includes a light source unit configured to illuminate a partial area on the object as a lighting area; and an image capture unit configured to capture an image of an image capture area set within the lighting area, wherein the plurality of lighting-imaging units captures an image of a non-overlapped lighting area on the object where the lighting areas of the plurality of lighting-imaging units do not overlap with each other, wherein the plurality of lighting-imaging units includes a first lighting-imaging unit group including a plurality of first lighting-imaging units, each capturing different areas on the object in the direction intersecting the movement direction, wherein the plurality of lighting-imaging units includes a second lighting-imaging unit group including a plurality of second lighting-imaging units, each capturing different areas on the object in the direction intersecting the movement direction, and wherein each of the second lighting-imaging units is shifted from each of the first lighting-imaging units in the direction intersecting the movement direction while partially overlapping image capture areas of the second lighting-imaging units with image capture areas of the first lighting-imaging units, and the second lighting-imaging units and the first lighting-imaging units capture images of the partially overlapping image capture areas.

2. The imaging apparatus according to claim 1, wherein each of the plurality of lighting-imaging units includes a plurality of light source units, and the plurality of light source units are adjusted to overlap the lighting areas of projection light emitted from the plurality of light source units or not to overlap the lighting areas of the projection light emitted from the plurality of light source units.

3. The imaging apparatus according to claim 1, wherein the plurality of lighting-imaging units are arranged by setting a given interval space between the lighting areas of adjacent lighting-imaging units of the plurality of lighting-imaging units on the object in the direction intersecting the movement direction of the moveable apparatus.

4. The imaging apparatus according to claim 1, wherein the plurality of lighting-imaging units satisfy a formula (1) in the direction intersecting the movement direction of the moveable apparatus, $$R \geq \theta_1/2 + \theta_2/2 \quad (1)$$

where R represents an angle between a first optical axis of a first imaging optical system included in a first lighting-imaging unit configuring the plurality of lighting-imaging units and a second optical axis of a second imaging optical system included in a second lighting-imaging unit configuring the plurality of lighting-imaging units, the second lighting-imaging unit being adjacent to the first lighting-imaging unit, $\theta_1$ represents an angle of view of the first imaging optical system included in the first lighting-imaging unit, and $\theta_2$ represents an angle of view of the second imaging optical system included in the second lighting-imaging unit being adjacent to the first lighting-imaging unit.

5. The imaging apparatus according to claim 1, wherein the plurality of lighting-imaging units satisfy formulas (2) or (3) in the direction intersecting the movement direction of the movable apparatus, $$L1 \times \tan \varphi1 < L2 \times \tan \varphi2 < L3 \times \tan \varphi3 \quad (2)$$

$$L1 \times \tan \varphi1 < L2 \times \tan \varphi2 \quad (3)$$

where $\varphi1$ represents an angle between a first optical axis of a first lighting optical system included in a first lighting-imaging unit configuring the plurality of lighting-imaging units, and one line connecting a lighting origin point of the first lighting optical system and one end point of a first image capture area on the object where an image is captured using a first image capture unit of the first lighting-imagine unit, $\varphi2$ represents a half value of angle of view of the first lighting optical system of the first lighting-imaging unit, $\varphi3$ represents an angle between the first optical axis of the first lighting optical system of the first lighting-imaging unit, and one line connecting the lighting origin point of the first lighting optical system of the first lighting-imaging unit and one end point of a second image capture area on the object where an image is captured using a second image capture unit of a second lighting-imaging unit being adjacent to the first lighting-imaging unit, L1 represents a distance from the lighting origin point to a first virtual plane, perpendicular to the first optical axis of the first lighting optical system of the first lighting-imaging unit and including one end point of the image capture area on the object where an image is captured using a first image capture unit of the first lighting-imaging unit, L2 represents a distance from the lighting origin point to a second virtual plane, perpendicular to the first optical axis of the first lighting optical system of the first lighting-imaging unit and including one end point of the lighting area of the first lighting-imaging unit, L3 represents a distance from the lighting origin point to a third virtual plane, perpendicular to the first optical axis of the first lighting optical system of the first lighting-imaging unit and including one end point of the image capture area on the object where an image is captured using the second image capture unit of the second lighting-imaging unit being adjacent to the first lighting-imaging unit, the formula (2) is used for one configuration when the second lighting-imaging unit exists adjacent to the first lighting-imaging unit and the lighting areas of the second lighting-imaging unit and the first lighting-imaging unit overlap with each other, and the formula (3) is used for another configuration when the second lighting-imaging unit does not exist adjacent to the first lighting-imaging unit.

6. The imaging apparatus according to claim 2, wherein the light source unit is disposed on each side of the image capture unit included in each of the lighting-imaging units in the movement direction, or at least one side of the image capture unit included in each of the lighting-imaging units in the direction intersecting the movement direction, wherein the image capture unit captures an image of an area on the object where the lighting areas of the light source unit overlaps with each other.

7. The imaging apparatus according to claim 2, wherein a positional relationship between the image capture unit and the light source unit in each of the plurality of lighting-imaging units is set the same.

8. The imaging apparatus according to claim 1,
wherein the respective light source units of the plurality of lighting-imaging units illuminate the lighting areas to partially overlap with each other on the object, and
wherein each of the image capture units of the plurality of lighting-imaging units captures an image of a non-overlapped lighting area on the object where the lighting areas of the plurality of lighting-imaging units do not overlap with each other.

9. The imaging apparatus according to claim 1,
wherein each of the second lighting-imaging units is positionally shifted with respect to each of the first lighting-imaging units in the movement direction so that the second lighting-imaging unit group and the first lighting-imaging unit group capture images on the object by shifting the image capture areas in the movement direction.

10. The imaging apparatus according to claim 1, further comprising:
a position changing unit configured to change positions of the plurality of lighting-imaging units in the direction intersecting with the movement direction to change the image capture area on the object to be captured by the plurality of lighting-imaging units in the direction intersecting with the movement direction.

11. The imaging apparatus according to claim 10,
wherein the position changing unit changes positions of plurality of lighting-imaging units integrally together in the direction intersecting the movement direction to change the image capture area on the object to be captured using the plurality of lighting-imaging units.

12. The imaging apparatus according to claim 10,
wherein the position changing unit changes an image capture direction used for an image capturing operation performed by the plurality of lighting-imaging units to satisfy a formula (4), $$R-(\theta_1+\theta_2)/2<\Delta R<\theta_1/2 \quad (4)$$

where $\theta_1$ represents an angle of view of a first imaging optical system included in a first lighting-imaging unit configuring the plurality of lighting-imaging units,
$\theta_2$ represents an angle of view of the second imaging optical system included in a second lighting-imaging unit being adjacent to the first lighting-imaging unit; and
$\Delta R$ represents a changed angle amount when an image capture direction of the first lighting-imaging unit is changed toward the second lighting-imaging unit being adjacent to the first lighting-imaging unit.

13. The imaging apparatus according to claim 1, further comprising:
a vertical direction axis inversion mechanism having an inversion axis extending along a vertical direction, configured to inverse the plurality of lighting-imaging units integrally together about the inversion axis.

14. The imaging apparatus according to claim 1, further comprising:
a movement-direction axis inversion mechanism having an inversion axis extending along the movement direction, configured to inverse the plurality of lighting-imaging units integrally together about the inversion axis.

15. The imaging apparatus according to claim 1, further comprising:
a horizontal shift mechanism configured to shift positions of the plurality of lighting-imaging units integrally together in a horizontal direction on a virtual plane perpendicular to the movement direction.

16. The imaging apparatus according to claim 15, further comprising:
a fixing unit configured to fix the plurality of lighting-imaging units at two positions in the horizontal direction.

17. A vehicle comprising the imaging apparatus according to claim 1, the vehicle being the moveable apparatus.

18. A method of capturing an image of an object using an imaging apparatus mountable on a moveable apparatus, the method comprising:
capturing an image of a different area on the object in a direction intersecting with a movement direction of the moveable apparatus using each of a plurality of lighting-imaging units;
illuminating a partial area on the object as a lighting area using a light source unit disposed in each of the plurality of lighting-imaging units;
capturing an image of an image capture area set within the lighting area using an image capture unit;
capturing an image of a non-overlapped lighting area where the lighting areas of the plurality of lighting-imaging units do not overlap with each other;
capturing different areas on the object in the direction intersecting the movement direction using a first lighting-imaging unit group including a plurality of first lighting-imaging units; and
capturing different areas on the object in the direction intersecting the movement direction using a second lighting-imaging unit group including a plurality of second lighting-imaging units,
wherein each of the second lighting-imaging units is shifted from each of the first lighting-imaging units in the direction intersecting the movement direction while partially overlapping image capture areas of the second lighting-imaging units with image capture areas of the first lighting-imaging units, and the second lighting-imaging units and the first lighting-imaging units capture images of the partially overlapping image capture areas.

19. The method according to claim 18, further comprising:
changing positions of the plurality of lighting-imaging units in the direction intersecting with the movement direction using a position changing unit to change the image capture area on the object to be captured by the plurality of lighting-imaging units in the direction intersecting with the movement direction;
capturing images of the object using the plurality of lighting-imaging units set at the respective positions changed by the position changing unit, from the moving moveable apparatus.

* * * * *